US010333341B2

(12) United States Patent
Catalano et al.

(10) Patent No.: US 10,333,341 B2
(45) Date of Patent: Jun. 25, 2019

(54) LED LIGHTING SYSTEM WITH BATTERY FOR DEMAND MANAGEMENT AND EMERGENCY LIGHTING

(71) Applicant: LEDVANCE LLC, Wilmington, MA (US)

(72) Inventors: Anthony W. Catalano, Boulder, CO (US); Steven S. Davis, Louisville, CO (US); Charles Teplin, Boulder, CO (US); Anthony N. McDougle, Lafayette, CO (US)

(73) Assignee: LEDVANCE LLC, Wilmington, MA (US)

( * ) Notice: Subject to any disclaimer, the term of this patent is extended or adjusted under 35 U.S.C. 154(b) by 83 days.

(21) Appl. No.: 15/453,772

(22) Filed: Mar. 8, 2017

(65) Prior Publication Data

US 2017/0279300 A1 Sep. 28, 2017

Related U.S. Application Data

(60) Provisional application No. 62/305,442, filed on Mar. 8, 2016.

(51) Int. Cl.
*H02J 9/00* (2006.01)
*H02J 9/06* (2006.01)
(Continued)

(52) U.S. Cl.
CPC ............ *H02J 9/061* (2013.01); *H02J 7/0068* (2013.01); *H02J 7/04* (2013.01); *H05B 33/0815* (2013.01);
(Continued)

(58) Field of Classification Search
CPC ................ H02J 9/00; H02J 7/00; H05B 37/00
(Continued)

(56) References Cited

U.S. PATENT DOCUMENTS 5,303,124 A 4/1994 Wrobel
5,646,502 A 7/1997 Johnson
(Continued)

OTHER PUBLICATIONS

Copenheaver, Blaine R., "International Search Report and Written Opinion Re Application No. PCT/US2017/021437", May 23, 2017, p. 10 Published in: US.
(Continued)

*Primary Examiner* — Rexford N Barnie
*Assistant Examiner* — Joseph N Inge

(57) ABSTRACT

This disclosure describes systems, methods, and apparatus for a combined LED driver and emergency backup battery system. The LED driver can include current regulation circuitry as well as a bus enabling charging and discharging of an energy storage device from and to the bus. A master controller can control charging and discharging of the energy storage device via a controller of an energy storage management system, and also communicate with the current regulation circuitry to control a balance of power between an AC mains, the energy storage device, and driving of an LED light source. Accessories may be coupled to the bus and receive low voltage power from the bus and optionally receive commands from the master controller and provide sensed data back to the controller. A wireless network interface to the master controller can enable system states based on electrical power company indications and instructions.

18 Claims, 42 Drawing Sheets

(51) Int. Cl.
*H02J 7/00* (2006.01)
*H02J 7/04* (2006.01)
*H05B 33/08* (2006.01)
*H05B 37/02* (2006.01)

(52) U.S. Cl.
CPC ..... *H05B 33/0851* (2013.01); *H05B 37/0272* (2013.01); *Y02B 20/347* (2013.01)

(58) Field of Classification Search
USPC .......................................................... 307/66
See application file for complete search history.

(56) References Cited

U.S. PATENT DOCUMENTS

| | | | |
|---|---|---|---|
| 6,487,620 B1 * | 11/2002 | Grosshog | G06F 13/4291 710/105 |
| 7,403,120 B2 | 7/2008 | Duron et al. | |
| 8,033,686 B2 | 10/2011 | Recker et al. | |
| 8,203,445 B2 | 6/2012 | Recker et al. | |
| 8,390,214 B2 | 3/2013 | Van Laanen et al. | |
| 8,415,901 B2 | 4/2013 | Recker et al. | |
| 8,853,965 B2 | 10/2014 | Bouws et al. | |
| 9,013,114 B2 | 4/2015 | Archenhold | |
| 9,030,122 B2 | 5/2015 | Yan et al. | |
| 9,066,393 B2 | 6/2015 | Recker et al. | |
| 9,078,313 B2 | 7/2015 | Recker et al. | |
| 9,247,623 B2 | 1/2016 | Recker et al. | |
| 9,338,839 B2 | 5/2016 | Recker et al. | |
| 2004/0160199 A1 | 8/2004 | Morgan et al. | |
| 2010/0148582 A1 | 6/2010 | Carter | |
| 2012/0013257 A1 | 1/2012 | Sibert | |
| 2012/0043889 A1 | 2/2012 | Recker et al. | |
| 2014/0244044 A1 | 8/2014 | Davis et al. | |
| 2015/0282261 A1 * | 10/2015 | Recker | H02J 9/02 315/121 |

OTHER PUBLICATIONS

Wireless Enviroment, "Patented Technology", Retrieved from http://wirelessenv.com/patented-technology/, Known to exist as early as Mar. 07, 2017, p. 3.

* cited by examiner

US 10,333,341 B2

LED LIGHTING SYSTEM WITH BATTERY FOR DEMAND MANAGEMENT AND EMERGENCY LIGHTING

CLAIM OF PRIORITY UNDER 35 U.S.C. § 119

The present application for patent claims priority to Provisional Application No. 62/305,442 entitled "LED LIGHTING SYSTEM WITH BATTERY FOR DEMAND MANAGEMENT AND EMERGENCY LIGHTING" filed Mar. 8, 2016, and assigned to the assignee hereof and hereby expressly incorporated by reference herein.

FIELD OF THE DISCLOSURE

The present disclosure relates generally to LED lighting. In particular, but not by way of limitation, the present disclosure relates to systems, methods and apparatuses for LED lighting having a backup battery.

DESCRIPTION OF RELATED TECHNOLOGIES

While the majority of light for commercial spaces are powered from mains power, it is a requirement to provide a certain portion of the lighting with battery backup. The battery serves as an alternate power supply in the event the mains supply of electrical utility power is interrupted. This allows sufficient lighting so the occupied space will allow the safe egress of people. The illumination level is ordinarily specified by building codes.

At present, the battery backup system and the LED driver, both of which are separately connected to the mains power, are usually also separately controlled relative to the LED light, and operate independently of each other.

Throughout the figures, lines with arrows represent control and feedback signals, while lines without arrows represent the transfer of electrical power.

FIG. 2 illustrates a circuit arrangement that represents the current state-of-the-art. A battery backup system 200 is arranged between an AC mains 202 and a set of one or more LEDs 204. Via a latching single or multi-pole relay 203 (or other means), the battery backup system 200 can be connected to or disconnected from the AC mains 202 and the one or more LEDs 204. The relay 203 also disconnects the battery backup system 200 from the one or more LEDs 204 during normal operation of the AC mains 205 so that the LEDs 204 are powered without interference. When a power outage occurs, or some other issue occurs with the AC mains 202, the backup system 200 is engaged. This means that it is disconnected from the AC mains 202, and at the same time the relay 203 connects a voltage to current converter 216 to the one or more LED lights 204 via the relay 203. The LED driver 218 then ceases to provide power to the one or more LEDs 204. Thus, the one or more LEDs 204 are prevented from simultaneously being driven by both the LED driver 218 and the battery backup system 200. Preferably, the AC mains 202 comes back online before the voltage across the battery 208 runs too low, and the LED driver 218 can resume providing power to the one or more LEDs 204 and the backup system 200 can replenish the charge on the battery 208.

Power from the AC mains 205 can be rectified and used to maintain a desired voltage on a battery 208 (e.g., voltage $V_1$). The battery backup system 200 can also include a battery management system 206 that regulates the charging of the battery 208 so that the battery 208 receives a small charging current when the AC mains 202 is on. The battery management system 206 can control charging current to the battery 208 based on a measured voltage across the battery 208 (e.g., $V_1$). During normal operation, the LED driver 218, is coupled to and receives AC power from the AC mains 202, and provides a regulated current to drive the one or more LEDs 204.

This system for providing battery backup to an LED is necessarily expensive owing to the separate control systems: one for the LED driver 218 and one for the battery backup system 200. The two separate systems must be carefully matched to the LED lights 204 so as to drive the LEDs 204 at the proper light levels to meet building code regulations and not overdrive the LEDs 204 which would shorten their lifetime.

The backup system 200 may include a control 210, but the control 210 only controls entities within the backup system 200 and does not have a connection or control over the LED driver 218.

Thus, the prior art battery backup systems either drive the LEDs 204 from the AC mains 202 through the LED driver 218 or via the battery backup system 200, but not both.

Because batteries have a limited lifetime, and must be replaced periodically, such battery backup systems ordinarily have a warning indicator when the batteries must be replaced or have a push button that performs a test on the battery indicating their condition. Unfortunately, because the lights may be located in an inaccessible location such as a ceiling, they often go neglected. Thus battery failure occurs, the warning light is ignored (or the system goes untested), and the emergency lighting system does not produce light when needed.

U.S. Pat. No. 9,338,839 illustrates one example of a lighting system for off-grid power failures. For instance, FIG. 23 illustrates a charging circuit 2320 that receives regulated power from the AC mains and discharges power to a power select/condition 2330. The power select/condition 2330 then provides power to a light source/load 2350. The system 2300 also includes a time of use/power source/charge controller 2340 that is separate from the charging circuit 2320. Further, the time of use/power source/charging controller 2340 does not have a data connection or any way to communicate with or control the regulator (part of 2310). Further, a switch is separate from the power select/condition 2330. What is more, the charging circuit 2320 has inputs and outputs where power is received from the regulator via inputs and power is sent to the power select/condition 2330 via the outputs, but not via the same leads. The charging circuit 2320 is also described as having a single non-variable output—that of the battery voltage (e.g., see MCP73838, which is a battery charger without any buck/boost capability for conversion of battery discharge).

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as an LED driver system having a backup energy source. The system can include a first AC mains input configured for coupling to an AC mains power source. The system can also include a voltage regulation circuit coupled to the AC mains input and receiving AC or rectified AC power, the voltage regulation circuit having one or more bus coupling I/Os. The system can further include a voltage to current converter circuit having one or more bus coupling I/Os and a regulated current output configured to drive a light source comprising one or more light emitting diodes. The system can yet further include an energy storage management system coupled to a removable energy storage device and having one or more bus coupling I/Os. The energy storage management system can include a converter controlling a voltage on the energy storage device and charging and discharging rates of the energy storage device. It can also include a controller controlling the converter, the controller also receiving feedback from the converter. The system can further include a bus having at least data and power channels, wherein the energy storage management system, the voltage regulator circuit, and the voltage to current converter circuit all coupled to the bus. The voltage regulation circuit or the voltage to current converter circuit comprises a master controller and the master controller controls the controller of the energy storage management system as well as a controller of whichever of the voltage regulation circuit or the voltage to current converter does not comprise the master controller. Further, the master controller can be programmed, coded, or wired to control: (1) driving the light source from a simultaneous combination of the energy storage device and the AC mains power source; (2) simultaneous charging the energy storage device and driving the light source from the AC mains power source; and (3) driving the light source from the energy storage device when the AC mains power source is not available.

Other embodiments of the disclosure may also be characterized as a method of operating a light emitting diode (LED) driver system. The method can include providing an LED driver generating a regulated LED current to a light source comprising one or more LEDs, where the LED driver includes an energy storage device, and a bus, the bus coupling a voltage regulator circuit, a voltage to current converter, and an energy storage management system, where a master controller of either the voltage regulator circuit or the voltage to current converter, controls (1) the bus, (2) the charging or discharging of the energy storage device, and (3) the regulated LED current. The method can further include monitoring power from an AC mains power source. The method can yet further include monitoring wireless signals from an electrical power company. The method can also include when the AC mains power source is available: (1) driving the light source with power simultaneously derived from the energy storage device and the AC mains power source; or (2) driving the light source and charging the energy storage device, both simultaneously derived from the AC mains power source. When the AC mains power source is not available, the method can include driving the light source with power derived entirely from the energy storage device.

Other embodiments of the disclosure can be characterized as a light emitting diode (LED) driver system having a backup energy source. The system can include a voltage regulation circuit configured to convert DC power to a regulated bus voltage and having one or more bus coupling I/Os. The system can include a voltage to current converter circuit having one or more bus coupling I/Os and a regulated current output, and configured to convert the bus voltage to a regulated current, the regulated current output configured to couple to a light source comprising one or more LEDs, the regulated current configured to drive the light source. The system can also include a master controller coupled to the voltage to current converter, the voltage regulation circuit, or both. The system can further include an energy storage management system coupled to a removable energy storage device and having one or more bus coupling I/Os. The energy storage management system can include a converter coupled between the one or more bus coupling I/Os of the energy storage management system and the energy storage device. It can also include a controller controlling the converter. The system can yet further include a bus having at least data and power channels, the energy storage management system, the voltage regulator circuit, and the voltage to current converter circuit all coupled to the bus. The master controller programmed, coded, or wired to control: (1) driving of the light source derived from a simultaneous combination of the energy storage device and the AC mains power source; (2) simultaneous charging of the energy storage device and driving of the light source from the AC mains power source; and (3) driving of the light source derived entirely from the energy storage device when the AC mains power source is not available.

Yet other embodiments of the disclosure can be characterized as an LED lighting system having a backup energy source, the system including: a first AC power input, a rectification stage, a voltage regulation circuit, a first control circuit, a light source, second a control circuit, a first current source, a second current source, and a controller. The first AC power input can be configured for coupling to an AC mains power source. The rectification stage can be coupled to the first AC power input. The voltage regulation circuit can couple to an output of the rectification stage, and can have an input to receive rectified power from the rectification stage. The voltage regulation circuit can have an output to provide power having a regulated voltage and a floating current. The control circuit can couple to an energy storage device, the control circuit having an input to receive the power from the voltage regulation circuit. The light source can include one or more light emitting diodes (LEDs). The first control circuit can couple between the AC power input and an energy storage device. The first control circuit can be configured to control a voltage stored on the energy storage device. The first current source can couple between the energy storage device and the LED lighting array. The first current source can be configured to selectively generate a first regulated LED current, $I_{LED}$, from the voltage stored on the energy storage device. The first regulated LED current, $I_{LED}$, when generated, can at least partially drive the light source. The second current source can have a second AC power input configured for coupling to the AC mains power source. The second current source can be coupled between the second AC power input and the light source in parallel to the first current source. The second current source can selectively generate a second regulated LED current, $I_{LED'}$, and the second regulated LED current, $I_{LED'}$, can at least partially drive the light source. The controller can be coupled to the charging controller, the first current source, and the second current source, and can be configured to control a ratio of the first and second regulated LED currents, $I_{LED}/I_{LED'}$.

The first control circuit can include a wireless radio or wired connection to the Internet, for instance, through a gateway. The first control circuit can be in communication with the charging circuit and the first and second current sources. The first control circuit can include a wired or wireless link to a utility provider (e.g., a power company), and wherein the first control circuit can adjust the ratio of regulated LED currents, $I_{LED}/I_{LED'}$, in response to data from the utility provider. In some instances, the data can be electricity pricing.

In some embodiments, the LED lighting system can include a light sensor arranged proximal to the light source and coupled to the controller so as to provide signals indicative of a light output of the light source to the control circuit.

In some embodiments, the first control circuit includes a non-transitory tangible computer readable medium comprising instructions for charging and discharging the energy storage device so as to improve a lifetime of the energy storage device while also reducing a current draw of the second current source when electricity pricing is above a threshold or above a running average.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 32 illustrates a variation of the converters within the control circuit, wherein both up and down conversion functionality is comprised within a single converter stage;

DETAILED DESCRIPTION

The word "exemplary" is used herein to mean "serving as an example, instance, or illustration." Any embodiment described herein as "exemplary" is not necessarily to be construed as preferred or advantageous over other embodiments.

For purposes of this disclosure, a "backup battery" is any battery or other storage device that can be electrically coupled to an LED driver and provide backup LED driving power in the event of a loss of primary power (e.g., AC mains power). Other terms for a backup battery include a ballast or emergency ballast.

Figure 1:
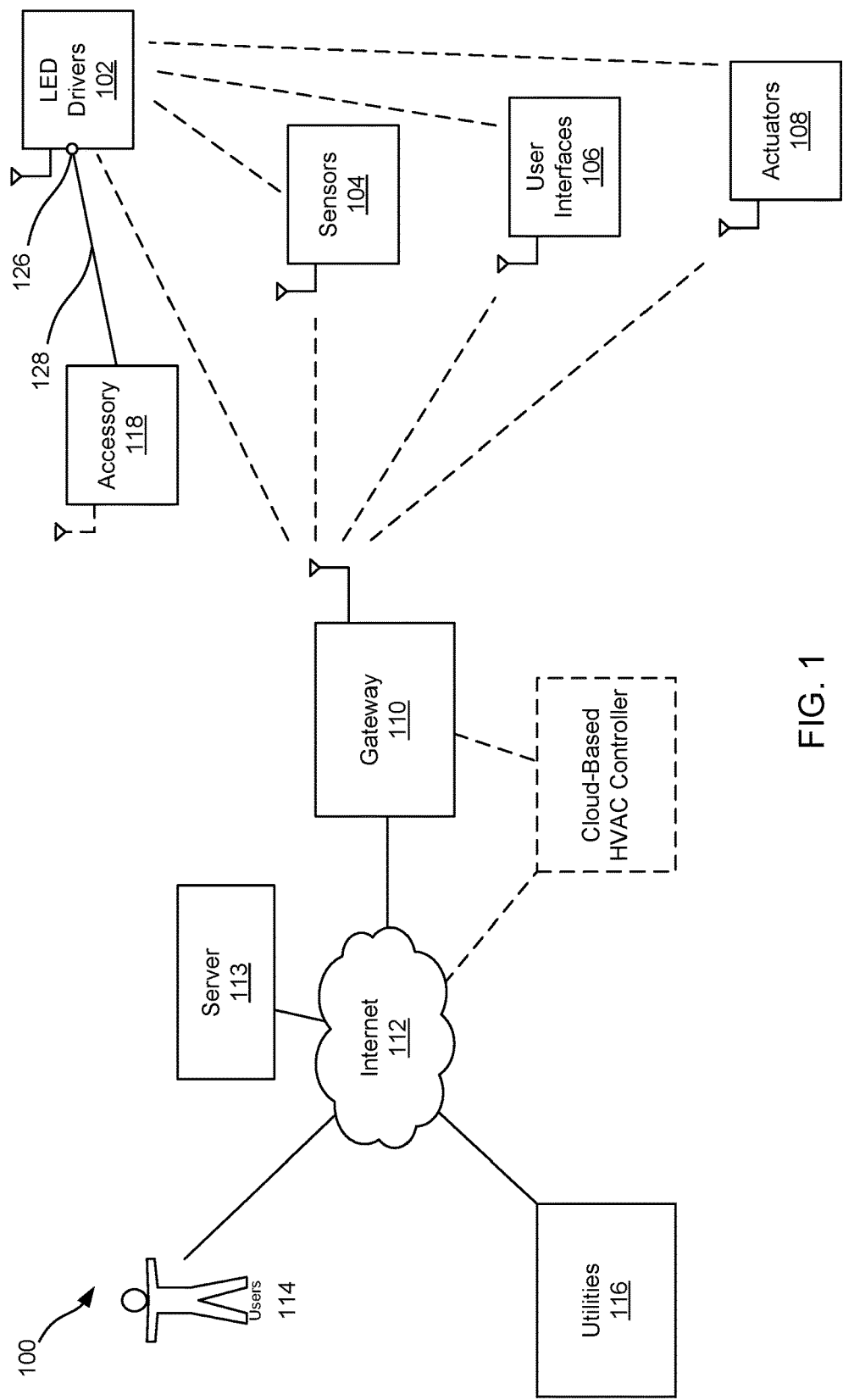
FIG. 1 illustrates a system where various devices, such as LED drivers, sensors, user interfaces, actuators, etc., can wirelessly interface with the Internet via a gateway and an internal network including the gateway.
Figure 2:
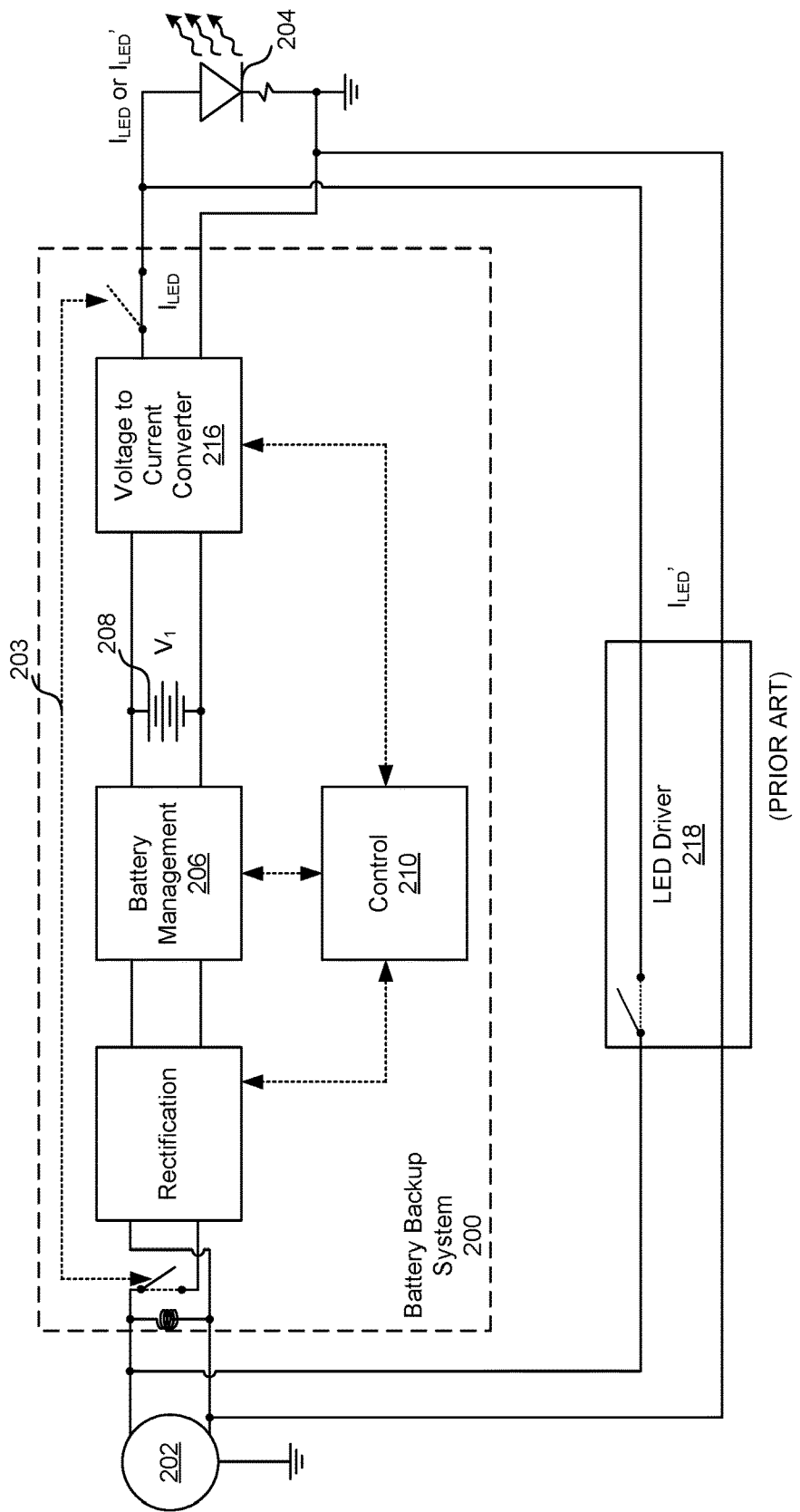
FIG. 2 illustrates a circuit arrangement that represents the current state-of-the-art.

For the purposes of this disclosure, a "bus" is any physical arrangement of data and/or power transmission components (e.g., electrical and/or optical) that transfer data to each component on the bus. Each device has a unique ID, and devices only pay attention to those signals that are addressed to them. As used herein, a bus carries both power and data, and powers at least some of the devices coupled to the bus. For instance, controllers on the bus receive and send data on the bus and in some cases also receive power from the bus. Buses can be parallel or serial. Data and power can be carried on separate physical lines in parallel or on the same line via multiplexing, signal modulation, and other methods well known to those of skill in the art. Thus, a bus may have one physical line for each "channel" or one physical line for two or more "channels." Buses can use both parallel and bit serial connections, and can be wired in either a multidrop (electrical parallel) or daisy chain topology, or connected by switched hubs, as in the case of USB FIG. 1 illustrates a system where various devices, such as LED drivers, sensors, user interfaces, actuators, etc., can wirelessly interface with the Internet via a gateway and an internal network including the gateway 110 and one or more of the devices 102, 104, 106, 108. In this way, users 114 can monitor and control light switches, motion sensors, powered window blinds, garage doors, door locks, cameras, etc. Similarly, utilities 116 (e.g., power, water, and gas companies) can monitor and control devices such as lights and HVAC controls or provide indicators/messages that can trigger control of devices.

Each of the devices 102, 104, 106, 108 can include a driver, where the drivers each include an integrated wireless radio. The gateway 110 can also include a wireless radio, and wireless communication connections can be made between a given device and the gateway 110. The gateway 110 is in communication with the Internet 112 either directly, or via one or more intermediary devices, such as switches, routers, modems, etc. The gateway 110 can interface between different communication protocols. For instance, the wireless signals may use ENOCEAN, ZIGBEE, Z-WAVE, BLUETOOTH, WIFI, and/or IR to name a few non-limiting examples. The Internet may use TCP/IP, to name one non-limiting example. Thus, the gateway 110 interfaces between the protocol used to communicate with the Internet, and the protocol used to wirelessly communicate with the devices 102, 104, 106, 108. In some cases, the gateway 110 may be able to handle more than one wireless protocol. For instance, LED drivers 102 may communicate via Z-WAVE, while the actuators 108 communicate via ENOCEAN. In another example, some actuators 108 may use ENOCEAN while others use WIFI. In an embodiment, each driver can include or have an attached accessory such as, but not limited to, a sensor 104, user interface 106, or actuator 108. In an embodiment, each LED driver 102, via power from a power supply, can supply power to accessories of the LED driver 102 such as, but not limited to, a sensor 104, user interface 106, or actuator 108. The LED driver 102 may also be able to power any controller or microprocessor of any of the sensors 104, user interfaces 106, actuators 108, or other accessories.

Power and data can be passed from the LED drivers 102 to accessories 118 via a bus 128 carrying data and power. The bus 128 can couple to each LED driver 102 via an I/O interface 126. Any number of accessories may be coupled to and draw power from, provide power to, or send and receive data on, the bus 128 (within the confines of available power from the corresponding LED driver 102).

The LED drivers 102 can each be coupled between the AC mains and one or more LED lights. Often, LED drivers and the lights they drive are manufactured and/or sold as a single hardware system, so those of skill in the art will appreciate that the illustrated and described LED drivers 102 may or may not include driven LED lights.

Figure 7:
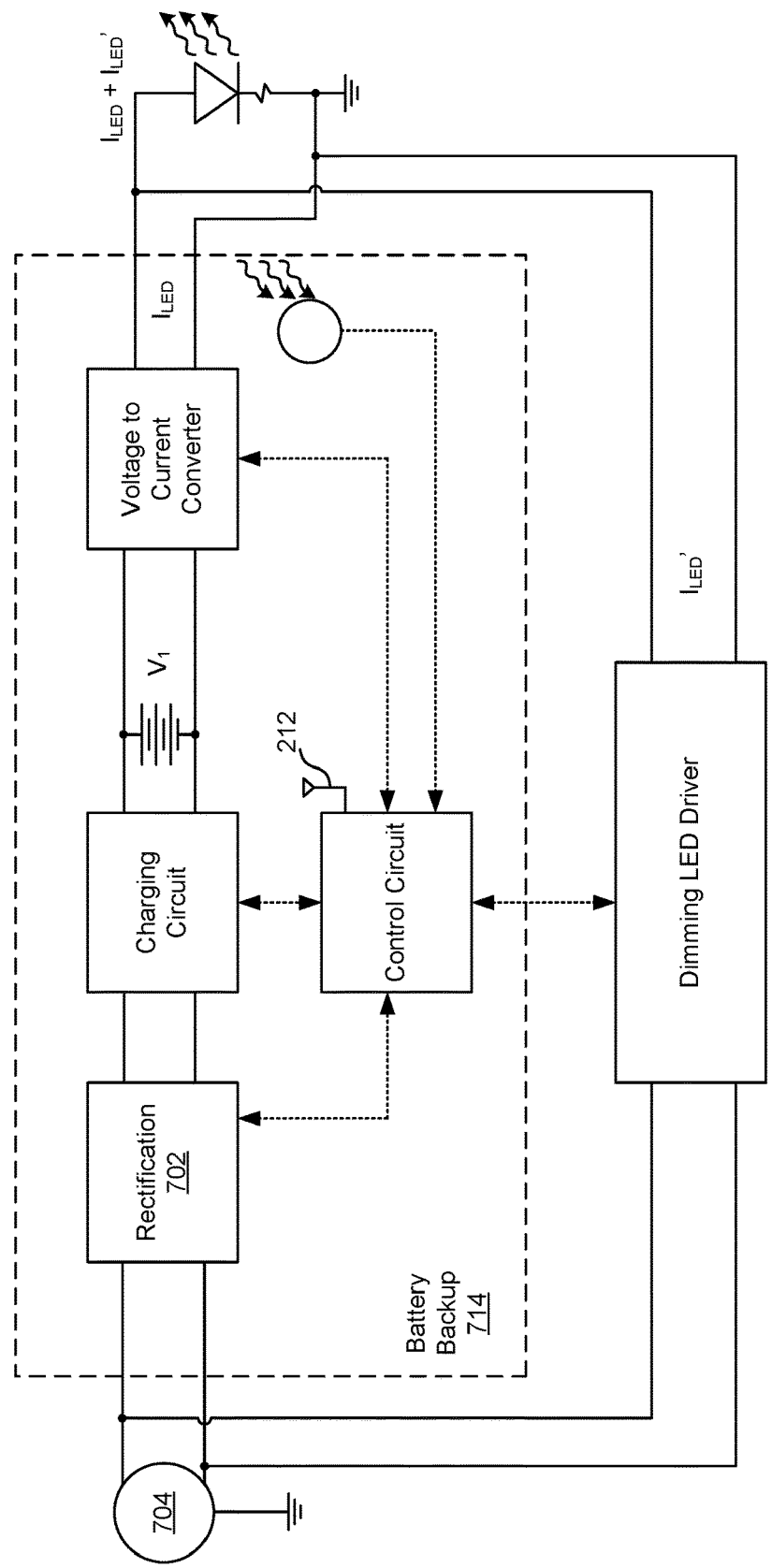
FIG. 7 illustrates another embodiment of a dimming LED driver and battery backup system in parallel between an AC mains and a set of one or more LED lights.
Figure 8:
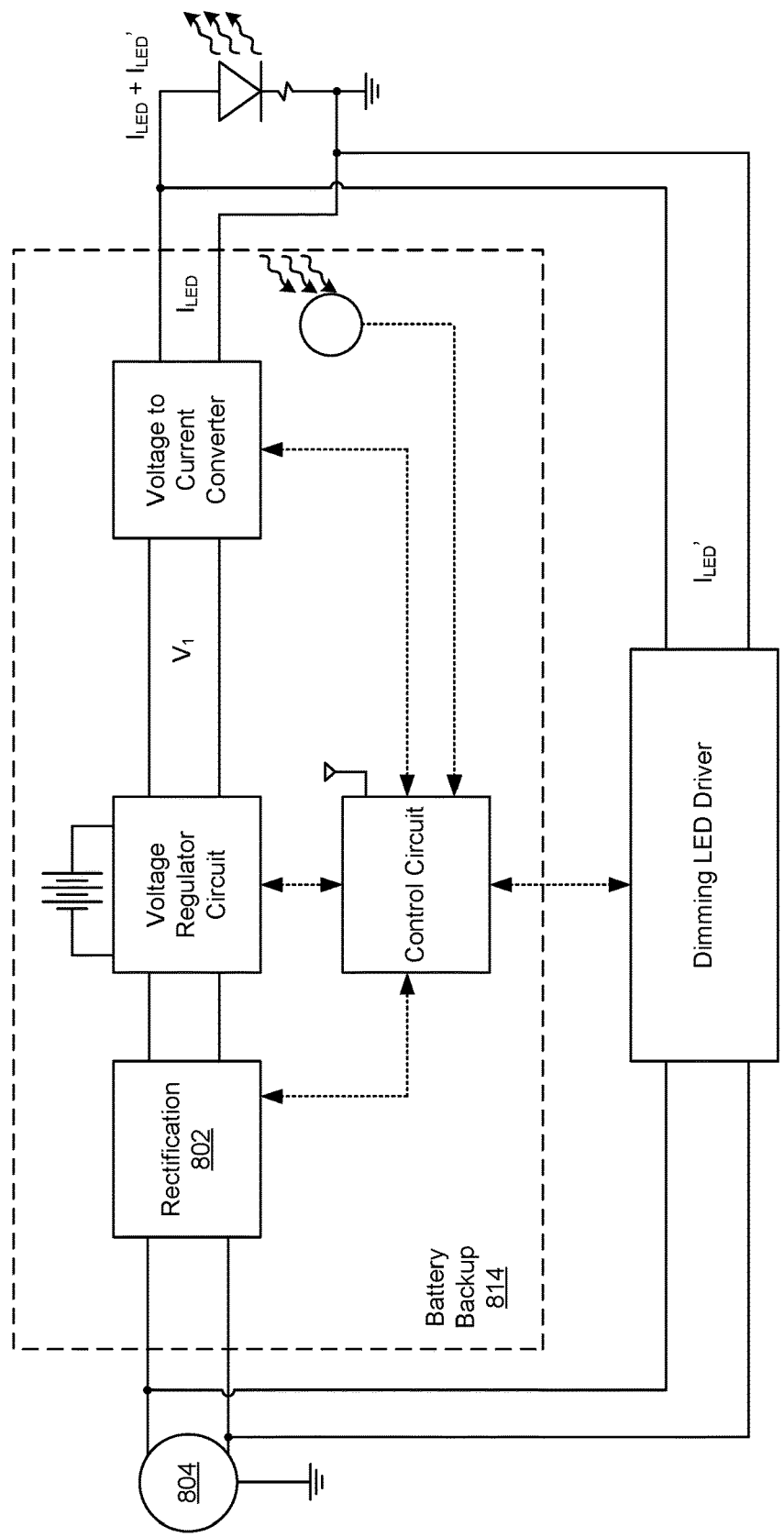
FIG. 8 illustrates another embodiment of a dimming LED driver and battery backup system in parallel between an AC mains and a set of one or more LED lights.
Figure 9:
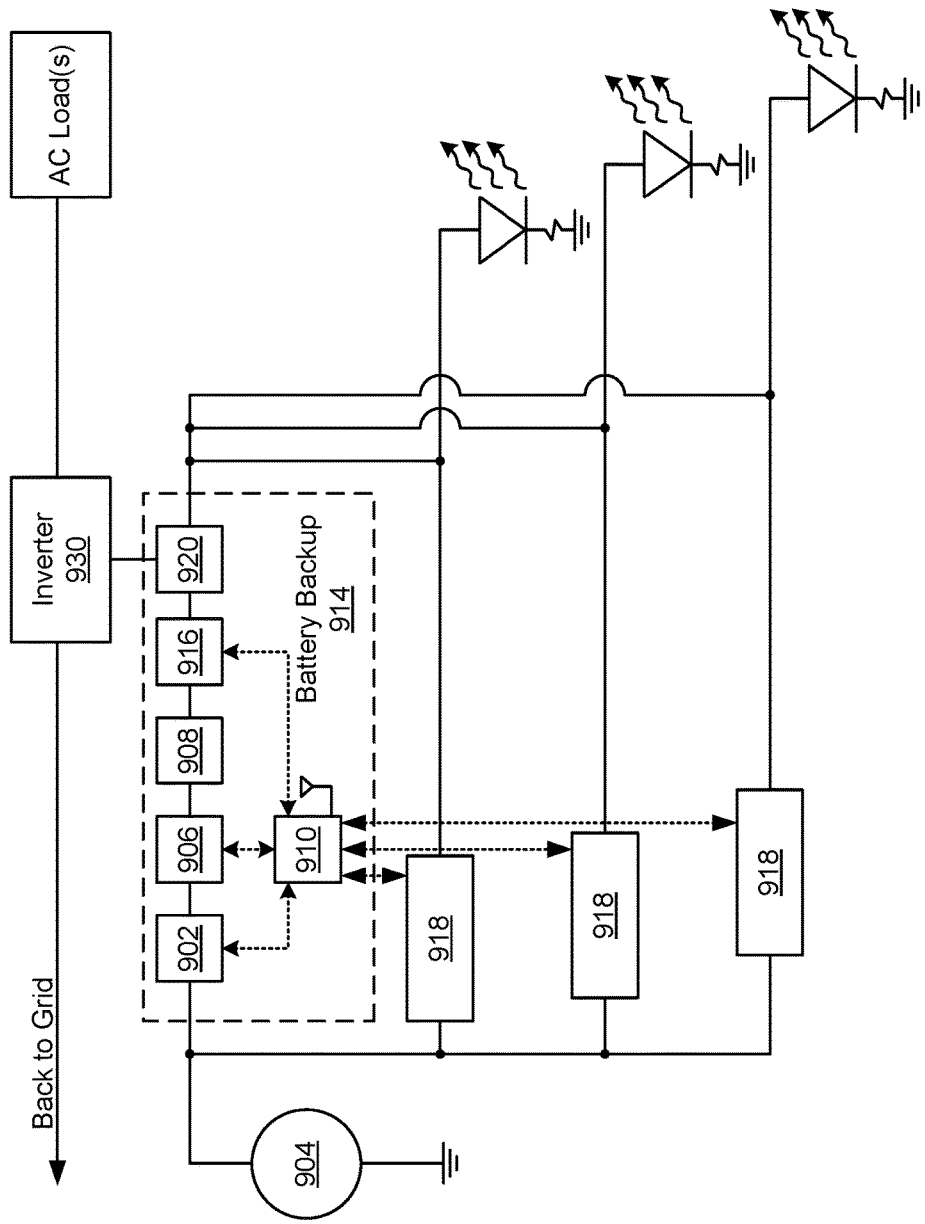
FIG. 9 illustrates a system of LED lights each powered by a separate LED driver, but all coupled to a single battery backup.
Figure 10:
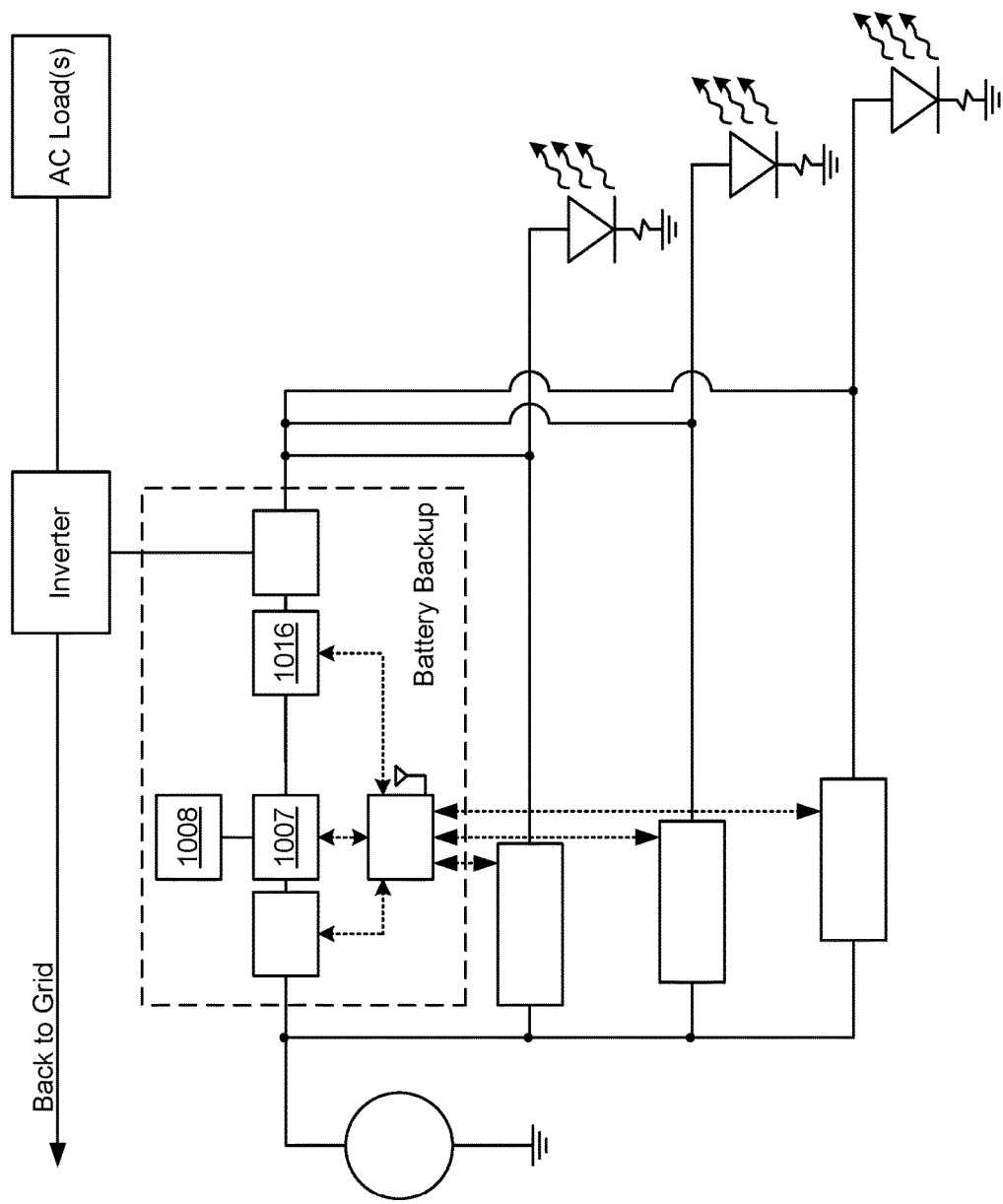
FIG. 10 illustrates a variation of FIG. 9 where the energy storage device is coupled to a regulating circuit.
Figure 11:
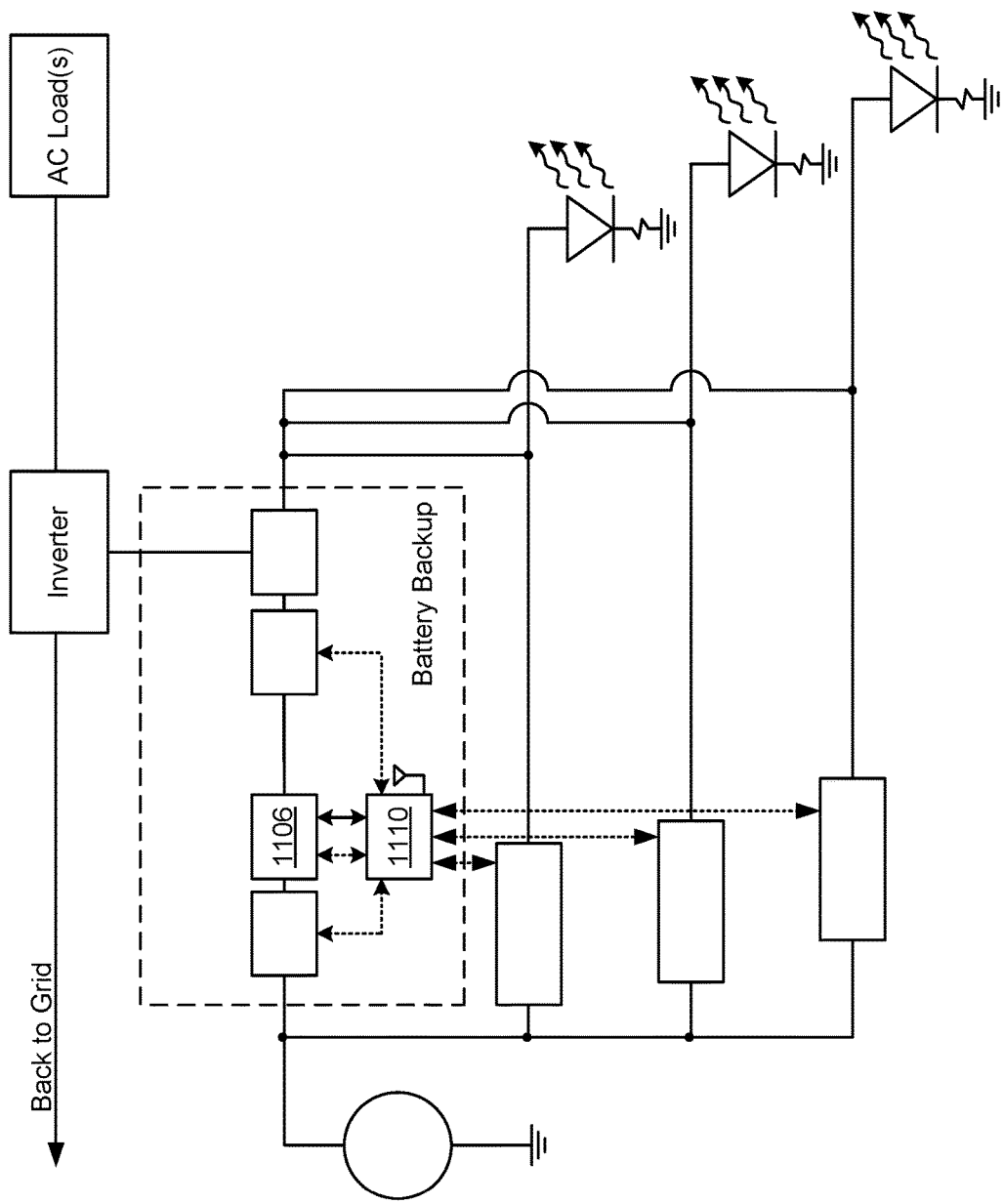
FIG. 11 illustrates a variation of FIGS. 9 and 10 where the control circuit is coupled to or includes an energy storage device.

FIGS. 3-10 show various embodiments of backup battery systems that can operate along with or parallel to the LED drivers 102 of FIG. 1. In particular, light sources, such as LEDs, can be driven via either or both of a battery (or other storage device such as a capacitor) and the LED driver, and both the battery and LED driver can provide a blend of simultaneous power the LEDs. Further, the LED driver is dimmable, whereas prior art LED drivers used with battery backups are not. What is more, the voltage to current converter can be controlled by a microprocessor such that the battery backup can controllably provide varying LED drive currents. Additionally, these embodiments show backup systems having a wireless radio connection to a controller and a controller in command of both the backup system and the LED driver, thereby enabling remote control of the battery backup, the LED driver, and the balance of power being driven through both entities. FIGS. 5-8 further show a control circuit of the battery backup having feedback from the LEDs to provide more than mere setpoint control of the LEDs; instead the feedback allows control of actual light output rather than mere electrical characteristics of the driving power. With a wireless radio and simultaneous output from the backup system and the LED driver, the system can now respond to requests from outside entities such as utilities to reduce power drawn from the AC mains. FIGS. 9-11 show embodiments where a single backup system can be used to support an array of LED drivers and LEDs rather than just a single LED driver and string of LEDs.

Figure 3:
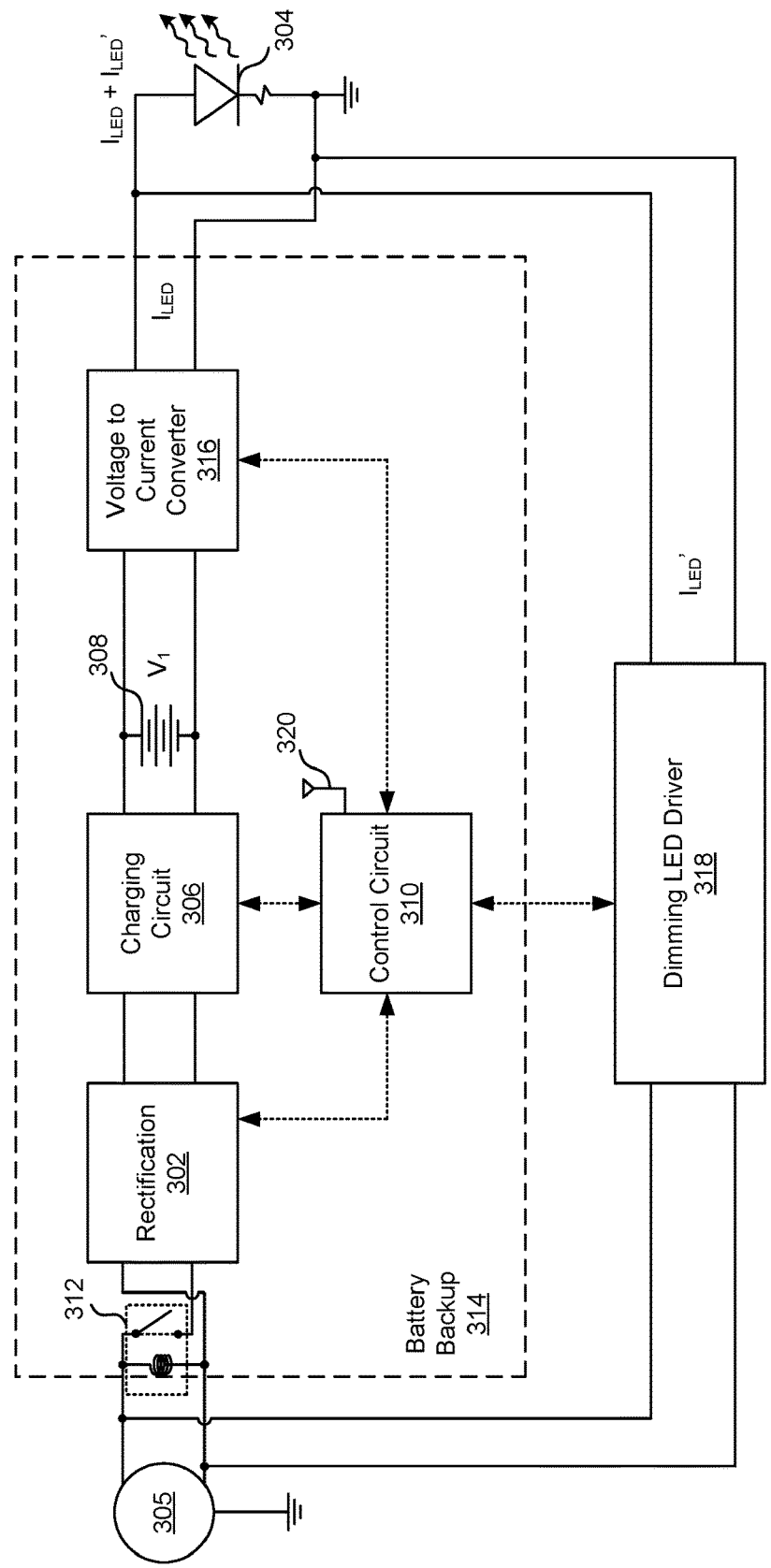
FIG. 3 illustrates a dimming LED driver and battery backup system in parallel between an AC mains and a set of one or more LED lights.

FIG. 3 illustrates a dimming LED driver and battery backup system in parallel between an AC mains and a set of one or more LED lights. The battery backup 314 receives AC power from an AC mains 305, rectifies the power via a rectification circuit 302, provides the rectified or DC power to a charging circuit 306, where the charging circuit 306 controls a trickle of current to an energy storage device 308, that charges the energy storage device 308 to or toward a desired voltage, $V_1$. A voltage to current converter 316 can then selectively discharge the energy storage device 308, converting the voltage across the energy storage device 308, $V_1$, to a first regulated LED current, $I_{LED}$, that can be used to drive the set of one or more LEDs 304. The voltage to current converter 316 not only can turn the first LED current, $I_{LED}$, on and off, but can also control the magnitude of the first LED current, $I_{LED}$. A control circuit 310 with a wireless radio 320 can be in communication with the rectification circuit 302, the charging circuit 306, and the voltage to current converter 316. The battery backup 314 may include an optional switch or relay 312 that can connect and disconnect an input of the battery backup 314 from the AC mains 305. In the illustrated embodiment, the switch or relay 312 is a magnetically-triggered relay, where current, or lack thereof, in an inductor, creates a magnetic field, or removes the magnetic field, such that a mechanical relay is pushed or pulled between two positions, thereby opening or closing a connection to the AC mains 305. However, this is just one example of the switch or relay 312 and is not intended to limit the means that can be used to connect and disconnect the AC mains 305 from the battery backup 314.

A dimming LED driver 318 can be arranged between the AC mains 305 and the set of one or more LEDs 304, in parallel to the battery backup 314. The control circuit 310 can be in communication with the dimming LED driver 318 such that the control circuit 310 can control an output of the dimming LED driver 318. The dimming LED driver 318 can produce a second regulated LED current, $I_{LED}'$.

During normal operation, the AC mains 305 can provide power to the dimming LED driver 318, and the dimming LED driver 318 can converter this power to a second regulated LED current, $I_{LED}$, used to power the set of one or more LEDs 304. During a power outage or other issue with the AC mains 305, the battery backup 314 can be engaged. This may involve disconnecting the battery backup 314 from the AC mains 305, via either a switch or relay of the rectification circuit 302, or via the optional switch or relay 312. Once disconnected from the AC mains 305, the voltage to current converter 316 can discharge the energy storage device 308 as the first LED current, $I_{LED}$, thereby power the one or more LEDs 304 for a time. The dimming LED driver 318 may include a switch at its input or output to disconnect the dimming LED driver 318 from the AC mains 305 during an outage or other problem with the AC mains 305. Alternatively, the dimming LED driver 318 can fully dim or turn off during an outage or other problem with the AC mains 305.

However, a particular advantage of this system is the ability perform demand-driven dimming of the LED driver 318, without a loss of light output. In particular, electrical utilities often charge different rates at different times of the day depending on demand. Thus, rates during the day and night are often different. By reducing the power drawn from the AC mains 305 during high demand (or high rate) periods, energy users can reduce expenses. Demand-driven dimming in and of itself is nothing new, and innovators have long proposed that battery power be called upon during periods of higher electrical rates. However, such batteries and the systems needed to switch between AC mains power and battery power are costly and only allow switching between AC mains power and the battery power. No means exists for a hybrid energy source, drawing a reduced load from the AC mains and compensating the rest of the power from an energy storage means. Further, no such hybrid approach has been proposed that makes use of existing energy storage means rather; most previous proposals require a separate and costly battery. Previous inventors have not recognized that the batteries within battery backup systems could be used as such an energy storage device.

This disclosure proposes a battery backup 314 and a dimming LED driver 318 that work together, often in a changing balance, to provide a constant LED light 304 output, but where the power drawn from the AC mains 305 varies depending on the cost of electricity. In one embodiment, the control circuit 310 can be in communication with the Internet via the wireless radio 320 (or a wired Internet connection), or in communication with an electrical utility via the wireless radio 320 (or a wired communication connection), and thereby have access to real-time electricity prices. Based on the changing electrical prices, the control circuit 310 can instruct the dimming LED driver 318 to increase or decrease its power draw from the AC mains 305 and at the same time decrease or increase the power drawn from the energy storage device 308 in order to compensate for the change in power drawn by the dimming LED driver 318. Said another way, the control circuit 310 can control the dimming LED driver 318 and the voltage to current converter 316 such that a sum of the first and second LED currents, $I_{LED}$ and $I_{LED}'$ remains constant. In this way, during periods of low electricity demand and low rates, the dimming LED driver 318 can be responsible for most of the current driving the one or more LEDs 304, while little to none of the energy storage device's 308 energy is used to power the one or more LEDs 304. During periods of high electricity demand and high rates, the energy storage device 308 can be called on to provide a greater portion of power to the one or more LEDs 304, thereby allowing the dimming LED driver 318 to reduce its consumption (i.e., the LEDs 304 can be partially driven via energy that was stored when electricity was being drawn at a lower rate into the energy storage device 308). Additionally, a charging rate of the energy storage device 308 can be reduced, or cut off entirely, during periods of high electrical rates.

Alternatively, the wireless radio 320 enables electrical utilities or users to remotely, and/or according to a schedule, adjust the ratio of energy provided by the energy storage device 308 versus the energy drawn and provided by the dimming LED driver 318. For instance, electrical utilities may want to decrease load on the grid during high demand periods, and may thereby provide data to the control circuit 310 or even control the control circuit 310 such that a greater portion of the LEDs 304 current comes from the battery backup 314 and less from the dimming LED driver 318 and hence from the grid.

This does not rule out the possibility that an output of the one or more LEDs 304 can be reduced for any of the reasons mentioned above. In some cases, it may be desirable to reduce the draw from the dimming LED driver 318 and supplement current to the one or more LEDs 304 via the battery backup 314, but where the total current through the one or more LEDs 304 is reduced (i.e., the LEDs 304 see some dimming, although not as much as they would without the current from the battery backup 314).

The control circuit 310 may also factor into its decisions regulatory concerns or programmed thresholds that require a certain charge to remain on the energy storage device 308. One can imagine situations where the current from the dimming LED driver is reduced so much that to compensate, the energy storage device 308 might have to be drawn down to levels where the battery backup 314 can no longer provide sufficient power during a power outage to meet regulatory or safety needs. Thus, the control circuit 310 may only increase the energy drawn from the energy storage device 308 to the extent that one or more thresholds of voltage, $V_1$, are maintained.

The control circuit 310 is also responsible for controlling charging of the energy storage device 308. To this end, the control circuit 310 may consider different rates of charging depending on the cost of electricity. For instance, during periods when electricity is expensive, the control circuit 310 may prevent charging of the energy storage device 308 or greatly reduce the rate of charging. During periods of low electricity cost, charging may be resumed or even increased to higher-than-normal rates in order to take advantage of the window of low electricity prices.

To these same ends, the control circuit 310 can simultaneously control a first rate of charging of the energy storage device 308 and a second rate of discharging of the energy storage device 308. When rates are high, this ratio will tend to favor discharging while the ratio will tend to favor charging while rates are low. At some times one or both of charging and discharging can be turned off. Said another way, the control circuit 310 may control one of three states of the energy storage device 308: charging only, discharging only, or charging and discharging simultaneously.

Charging can be controlled in one of three ways: (1) the optional switch or relay 312 can be opened/closed or adjusted; (2) the rectification circuit 302 can be opened or closed; and (3) the charging circuit can adjust a rate of charging. A rate of discharge can be controlled by the voltage to current converter 316. The control circuit 310 can control any one or more of these.

By providing control of the voltage to current converter 316 via the control circuit 310, and by providing a voltage to current converter 316 with an adjustable current output, the output relay 203 of the prior art can be eliminated.

Further, by controlling the dimming LED driver 318 and the voltage to current converter 316 via the control circuit 310, a current through the one or more LEDs 304, $I_{LED}+I_{LED}'$, can be controlled, and can equal a sum of both current from the battery backup 314 and the dimming LED driver 318. To maintain a constant light output from the one or more LEDs 304, the control circuit 310 can adjust $I_{LED}$ and $I_{LED}'$ inversely such that the total current ($I_{LED}$ and $I_{LED}'$) through the one or more LEDs 304 remains constant. Alternatively, the control circuit 310 can change $I_{LED}'$ and change $I_{LED}$, where a magnitude of the changes are not equal, and thus the light output changes (e.g., decreases). In some embodiments, wireless or wired commands or data provided to the control circuit 310 can be used to determine a proportion of current, $I_{LED}$, from the battery backup 314 versus current, $I_{LED}'$, from the dimming LED driver 318 to be used to power the one or more LEDs 304. For instance, a utility may provide data regarding electrical prices at different times of the day and the control circuit 310 can cause more current from the battery backup 314 to be used and less current from the dimming LED driver 318 during times of especially high prices, or when peak demand charges are being applied.

The battery backup 314 and the dimming LED driver 318 can each have their own connections to the AC mains 305 or can have a single connection to the AC mains 305.

The dimming LED driver 318 can be configured to produce a regulated, but selectable, current output $I_{LED}'$. Typical LED drivers that are paired with battery backup systems are incapable of dimming. Nor are existing LED drivers that are paired with battery backup systems configured to receive control or dimming signals from a control circuit within the battery backup. In other words, this disclosure newly presents the concept of causing the dimming LED driver 318 and the battery backup 314 to provide a joint and controllable current output.

The wireless radio 320 can use any wireless protocol known to those of skill in the art including, but not limited to ENOCEAN, WIFI, ZIGBEE, Z-WAVE, and BLUETOOTH to name a few. In some embodiments, the wireless radio 320 can be replaced by a wired connection to the Internet, or the control circuit 310 can include a wireless radio 320 and a wired Internet connection.

Because batteries have a limited lifetime, and must be replaced periodically, such battery backup systems ordinarily have a warning indicator when the batteries must be replaced or have a push button that performs a test on the battery indicating their condition. Unfortunately, because the lights may be located in an inaccessible location such as a ceiling, they often go neglected. Thus battery failure occurs, the warning light is ignored (or the system goes untested), and the emergency lighting system does not produce light during power outages. Because the control circuit 310 of this disclosure includes a wireless radio 320, the control circuit 310 can remotely alert a user or administrator when the energy storage device 308, or any other component of the battery backup 314, needs replacing or maintenance. Thus, the control circuit 310 also includes circuitry to monitor a health of the energy storage device 308 and report some or all of these results (e.g., condition and need for replacement) to a remote computing device or central control authority either within the building or at a separate location.

Although the output of the dimming LED driver 318 is illustrated as driving the one or more LEDs 304 directly, in other embodiments, the output, $I_{LED}'$, can be directed to the battery backup 314 and then combined with the output of the voltage to current converter 316, $I_{LED}$, and then this combined current, $I_{LED}+I_{LED}'$, can be an output of the battery backup 314. Also, while the energy storage device 308 is illustrated as being part of the battery backup 314, in some embodiments, the energy storage device 308 can be external to the battery backup 314.

The rectification circuit 302 can include circuits for, and/or a non-transitory tangible computer readable medium comprising instructions for, rectifying AC power from the AC mains 305. The rectification circuit 302 can be digital, analogue, or some combination of the two. In some cases its actions can be controlled by the control circuit 310 (as illustrated), while in others, the rectification circuit 302 can act independently of the control circuit 310. In some cases, the rectification circuit 302 may provide feedback to the control circuit 310, but may not be controlled by the control circuit 310.

The charging circuit 306 can include circuits for, and/or a non-transitory tangible computer readable medium comprising instructions for, monitoring a charge or voltage, $V_1$, on the energy storage device 308, and determining how much current to allow through to the energy storage device 308 so as to further charge the energy storage device 308. In other words, the charging circuit 306 can control a charging current provided to the energy storage device 308. The charging circuit 306 can be digital, analogue, or some combination of the two. In some cases its actions can be controlled by the control circuit 310 (as illustrated), while in others, the charging circuit 306 can act independently of the control circuit 310. In some cases, the charging circuit 306 may provide feedback to the control circuit 310, but may not be controlled by the control circuit 310. In an embodiment, the charging circuit 306 can include a timer that begins when charging of the energy storage device 308 begins, and cuts the charging off after a set period of time.

The control circuit 310 can include circuits for, and/or a non-transitory tangible computer readable medium comprising instructions for, monitoring and controlling various components of the illustrated system. The control circuit can include analogue circuits, digital circuits, or some combination of the two. It can include a network interface for communicating with various network protocols such as TCP/IP. Communication links to other components can be wired and/or optical. However, longer distance links, such as the link between the control circuit 310 and the dimming LED driver 318, can alternatively use wireless technologies. Although not illustrated, the control circuit 310 can also include connections and circuitry for monitoring the battery backup input from the AC mains 305, a capacity of the energy storage device 308, and/or current through the one or more LEDs 304.

The voltage to current converter 316 can include circuits for, and/or a non-transitory tangible computer readable medium comprising instructions for, selectively generating a first regulated LED current, $I_{LED}$, from a voltage, $V_1$, stored on the energy storage device 308. The voltage to current converter 316 can be digital, analogue, or some combination of the two. In some cases its actions can be controlled by the control circuit 310 (as illustrated), while in others, the voltage to current converter 316 can act independently of the control circuit 310. In some cases, the voltage to current converter 316 may provide feedback to the control circuit 310, but may not be controlled by the control circuit 310. The voltage to current converter 316 can be embodied in a buck or similar topology.

The dimming LED driver 318 can include circuits for, and/or a non-transitory tangible computer readable medium comprising instructions for, controlling a regulated LED current, $I_{LED}'$. The dimming LED driver 318 can be digital, analogue, or some combination of the two. In some cases its actions can be controlled by the control circuit 310 (as illustrated), while in others, the dimming LED driver 318 can act independently of the control circuit 310. In some cases, the dimming LED driver 318 may provide feedback to the control circuit 310, but may not be controlled by the control circuit 310.

For the purposes of this disclosure, an energy storage device (e.g., 308) can include a battery, capacitor, super capacitor, phase-change energy storage system, or any other means of storing energy, or a combination thereof. In some embodiments, an energy storage device may comprise multiple devices coupled in series, parallel, or a combination thereof.

One of skill in the art will recognize that the battery backup 314, and all system diagrams shown in this document, illustrates a functional view of the device and is not intended to be a complete circuit diagram showing all components and connections. The components illustrated therein may comprise multiple and discrete hardware components as well as various power and data connections. For instance, most battery backups include a power factor correction circuit, which is not illustrated in FIG. 3, but can be expected to be implemented in the battery backup 314 without undue experimentation by those of skill in the art. Further, while the control circuit 310 is illustrated as having direct and separate communication links with various components, in some embodiments, a local network can be created enabling communication between the control circuit 310 and the various illustrated components. While the energy storage device 308 is shown as being coupled in parallel between the charging circuit 306 and the voltage to current converter 316, any topology allowing the charging circuit 306 to control a rate of charging and a total charge on the energy storage device 308, and any topology allowing the voltage to current converter 316 to generate a regulated LED current, $I_{LED}$, from the voltage, $V_1$, across the energy storage device 308, can be implemented by those of skill in the art. As another example, the control circuit 310 can be a part of the charging circuit 306, or vice versa. Said another way, the charging circuit 306 and the control circuit 310 can be a unified component.

Also, while the one or more LEDs 304 have been described as series LEDs, in some embodiments, some or all of the LEDs 304 can be arranged in parallel.

The rectification circuit 302 can take a variety of forms including full-wave and half-wave bridge rectifiers.

Figure 12:
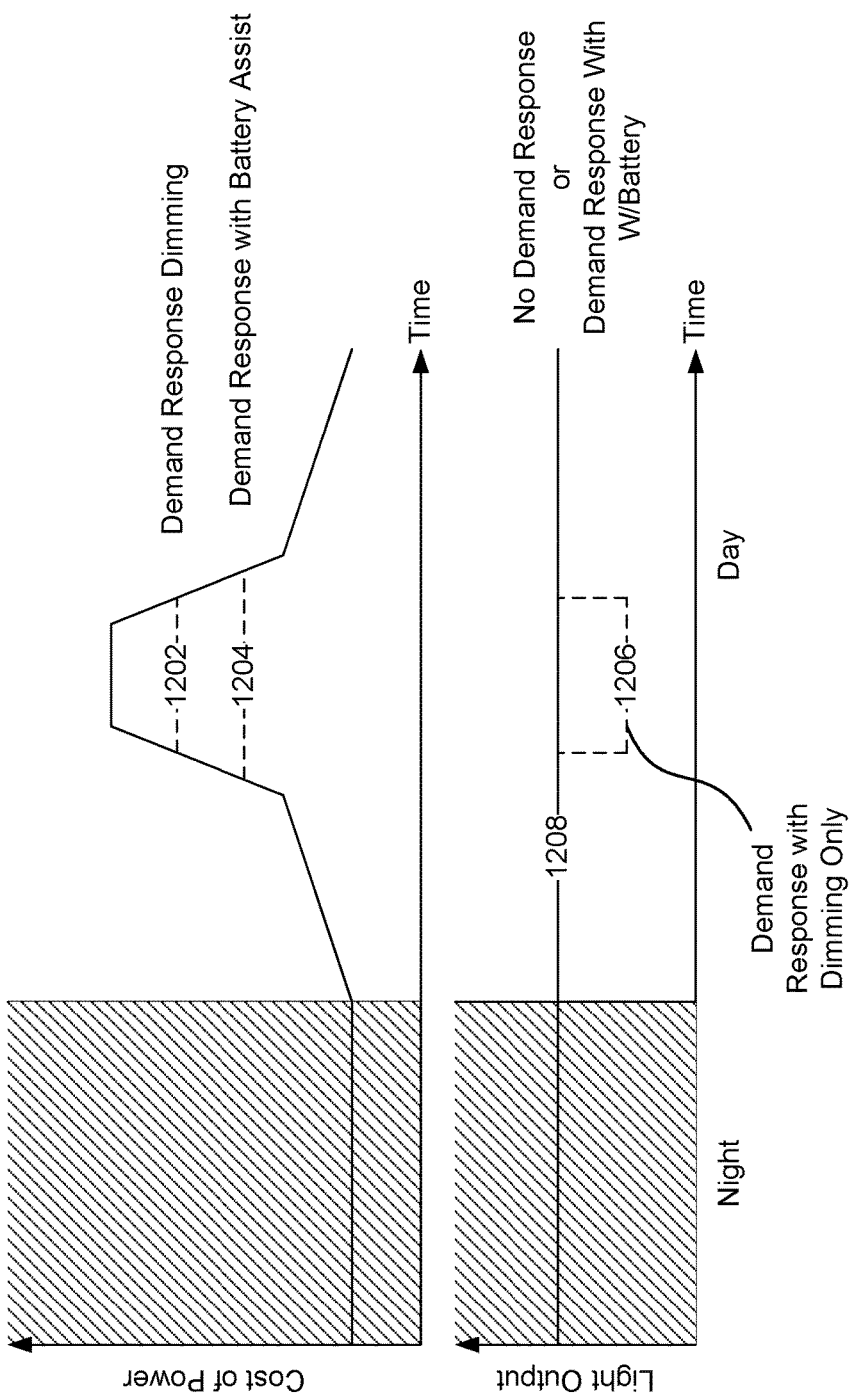
FIG. 12 illustrates demand response charts.

The opportunity for the herein-disclosed system to mitigate the time-varying cost of electrical power is further explained via reference to FIG. 12. The top of the chart illustrates an exemplary time-of-day cost of electricity from an electrical utility. At night the cost is relatively low owing to reduced demand, but increases during the day as the load on the electrical grid increases, reaching a peak in demand during the middle of the day. This peak owes to such factors as air conditioning. The battery backup system can reduce the cost to the consumer by offsetting power drawn from the power grid with power drawn from the backup battery. This may be accomplished in at least two ways. In the first case, the battery backup system can receive a command via its cloud connection from the electrical utility indicating a change in the cost of electricity, a required decrease in energy usage, or other information. In response, the system could provide a dimming signal to the separate driver reducing its light output. The response in terms of light output is shown in the lower part of the chart by the dashed line. The lower cost is indicated by the upper of the two dashed lines in the upper part of the chart. To compensate for the theoretical decrease in light output, a control circuit can instruct the battery backup to provide sufficient power to compensate for the reduction in power provided from the grid. Thus, the solid line in the lower chart also shows the light output when a combination of AC mains power and power from the battery backup are used to drive one or more LEDs. This feature can be referred to as "battery assist." Battery assist, in combination with a dimming of the LED driver and reduced power drawn from the AC mains, can either result in a constant light output, as seen by the solid line in the lower chart, or in an even greater reduction in the cost of power, where even greater dimming is used in combination with power from the backup battery (i.e., the dashed light output line in the lower chart is achieved via even greater dimming, but compensated for via power from the battery backup). The result of this latter approach is the dashed cost of power labeled "Demand Response with Battery Assist."

Figure 4:
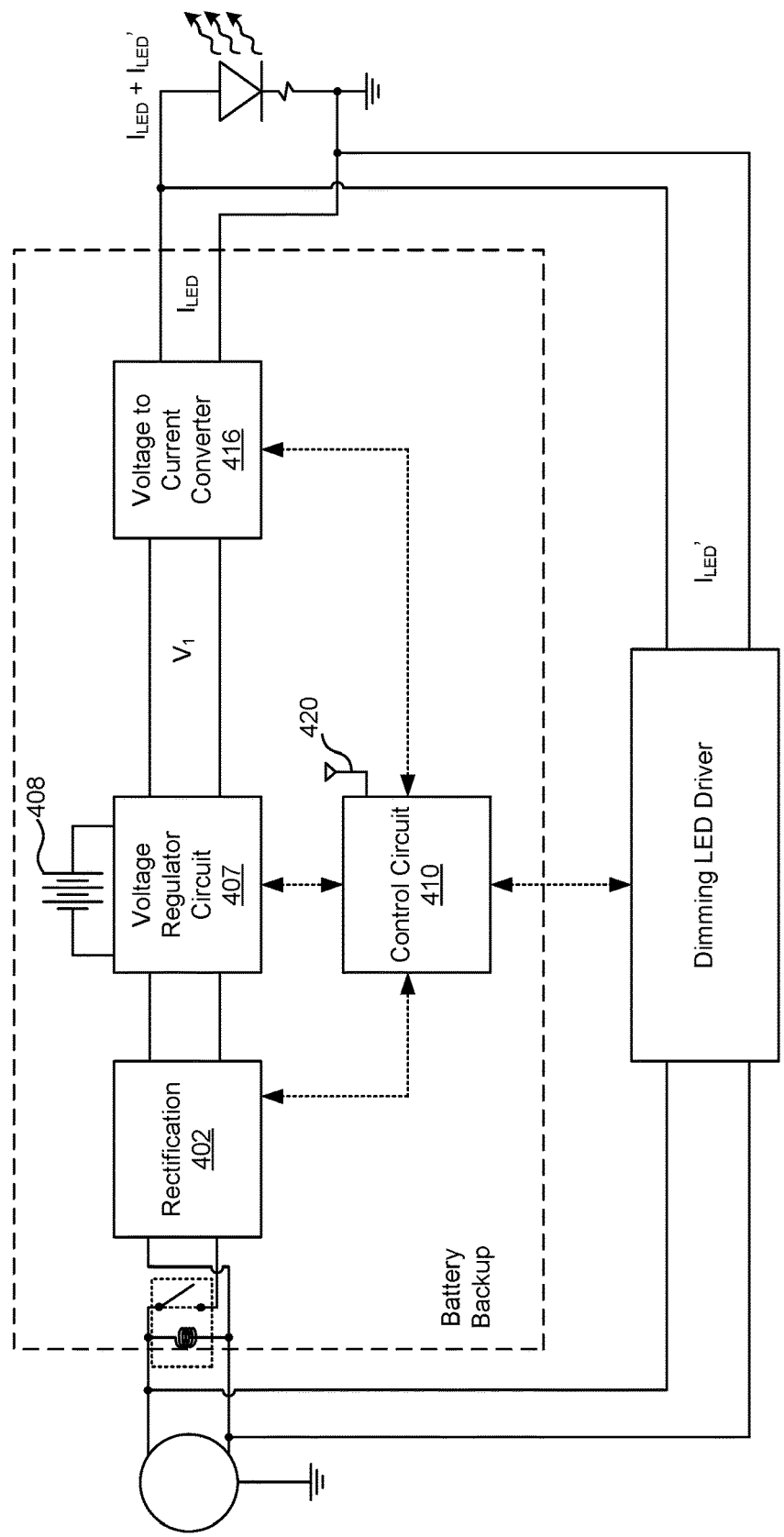
FIG. 4 shows a variation of FIG. 3 where an energy storage device is coupled to a voltage regulator circuit.

FIG. 4 shows a variation of FIG. 3 where an energy storage device 408 is coupled to a voltage regulator circuit 407. The voltage regulator circuit 407 includes circuits for not only charging and controlling a charge on the energy storage device 408 based on a voltage provided by a rectification circuit 408, but also controls and regulates a voltage output $V_1$ to the voltage to current converter 416. A control circuit 410 can control or provide instructions to the voltage regulator circuit 407 thereby controlling a charging and discharging of the energy storage device 408. Whereas, the energy storage device 308 of FIG. 3 has a charging voltage equal to its output voltage, and hence charging and discharging are linked, here, a charging voltage and output voltage, $V_1$, are controlled by the voltage regulator circuit 407 and can be different and thus unlinked.

In an embodiment, the rectification circuit 408 can include additional power leads or connections to the control circuit 410, the voltage to current converter 416, and the wireless radio. Although these connections are not illustrated, such an embodiment allows AC mains power to be partially diverted to these components, while a majority of the AC mains power is delivered by the rectification circuit 402 to the voltage regulator circuit 407. During periods of AC mains power failure, the energy storage device 408, via the voltage regulator circuit 407, can provide power to the rectification circuit 402, the control circuit 410, the wireless radio 420, and the voltage to current converter 416.

Figure 5:
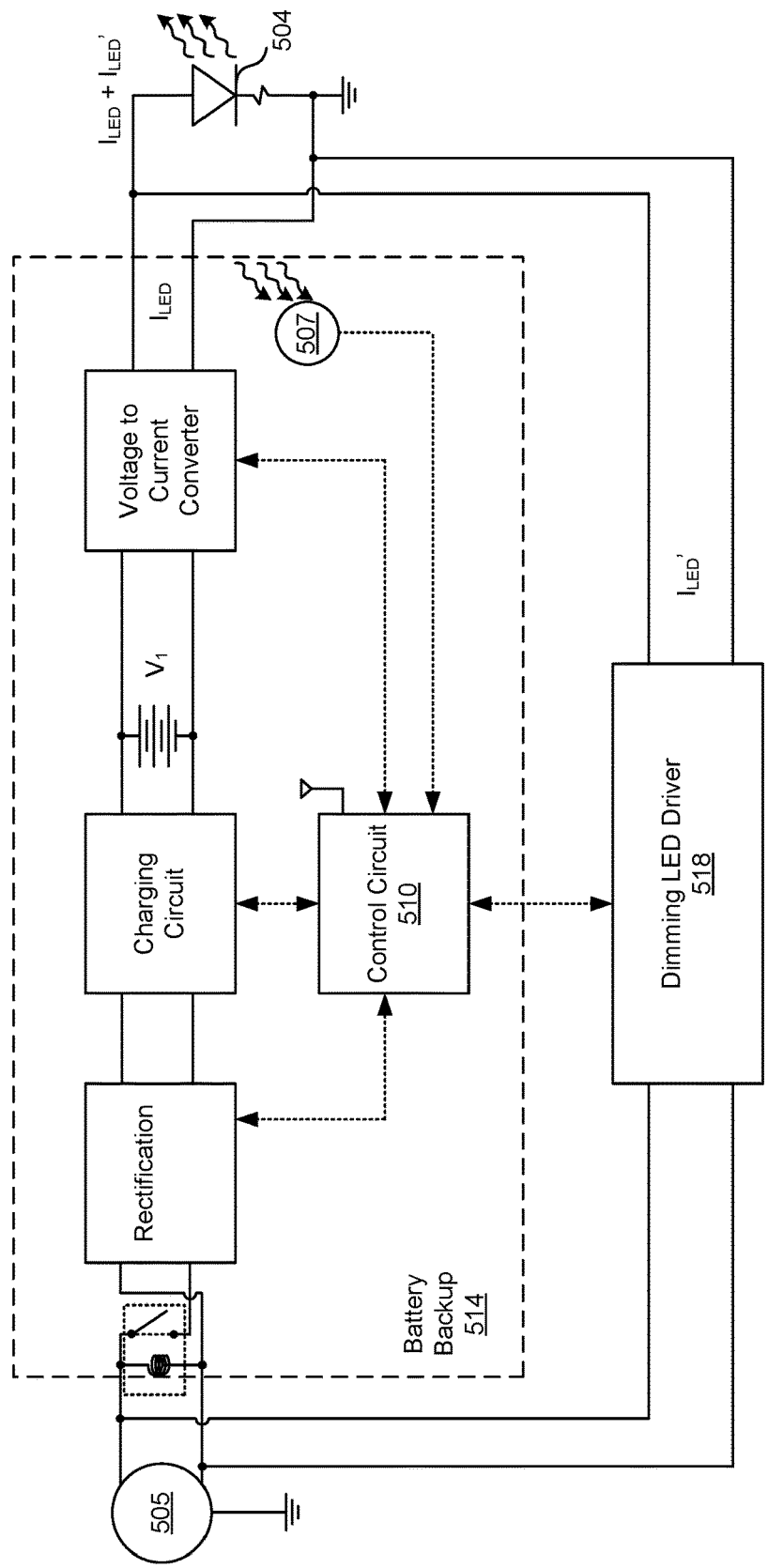
FIG. 5 illustrates a variation of FIG. 3 including a feedback sensor.

FIG. 5 illustrates a variation of FIG. 3 including a feedback sensor 507. The feedback sensor 507, such as a photo sensor, provides a signal to a control circuit 510 proportional to or indicative of a light output from one or more LEDs 504. In this way, the control circuit 510 can manage current outputs of the battery backup, $I_{LED}$, and the dimming LED driver, $I_{LED}'$, based on an actual light output of the one or more LEDs 504. Prior art battery backup systems typically rely on an electrical setpoint or measurements of output current for feedback, but such quantities are not necessarily accurate representations of LED light output. For instance, when dimming LED driver 518 output, $I_{LED}'$, output is reduced and a current output from the battery backup 514 is turned on or increased, in order to reduce the power draw from the AC mains 505 during high electrical pricing periods, the ratio of $I_{LED}$ to $I_{LED}'$ can be adjusted by the control circuit 510 based on feedback from the light sensor 505 in order to maintain a consistent light output from the one or more LEDs 504.

Figure 6:
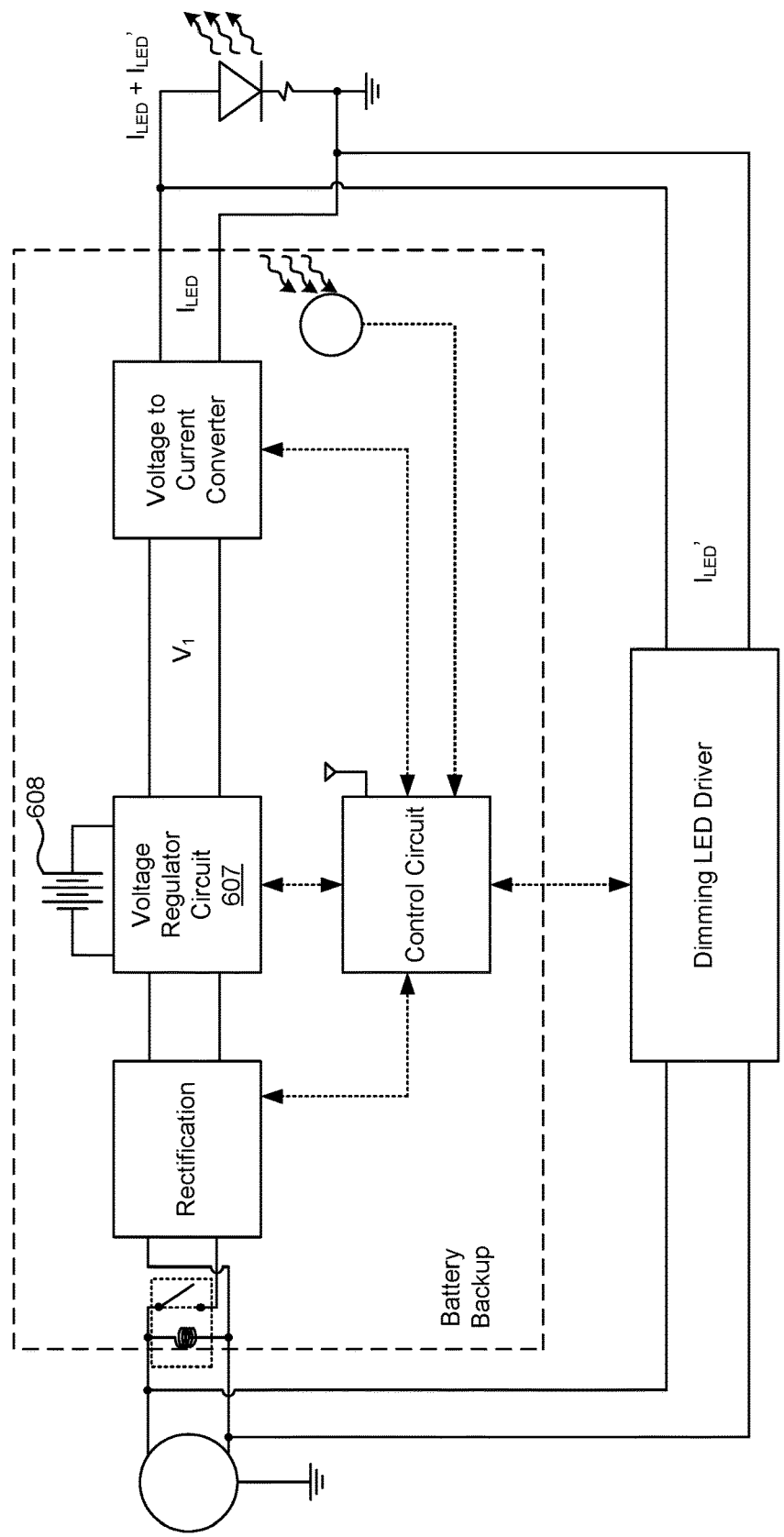
FIG. 6 illustrates a variation of FIG. 5 where the energy storage device is coupled to a voltage regulator circuit rather than between a charging circuit and a voltage to current converter, as in FIG. 5.

FIG. 6 illustrates a variation of FIG. 5 where the energy storage device 608 is coupled to a voltage regulator circuit 607 rather than between a charging circuit and a voltage to current converter, as in FIG. 5. The configuration of FIG. 6 enables the energy storage device 608 to be charged to a different voltage, $V_1$, than is being passed to the voltage to current converter 616.

In FIGS. 3-6, the optional relay and the optional inductor at the input of the battery backup are not required, and FIGS. 7 and 8 illustrate battery backups 714 and 814 where these components are not used. In these embodiments, the rectification circuit 702, 802 can include a switch or relay able to connect or disconnect the battery backup 714, 814 from the AC mains 704, 804.

FIG. 9 illustrates a system of LED lights each powered by a separate LED driver, but all coupled to a single battery backup 914. The LED drivers 918 are dimming LED drivers as described with reference to FIGS. 3-8, and each LED driver 918 in communication with and controlled by a control circuit 910 of the battery backup 914. The AC mains 904 provides power to the battery backup 914 as well as the plurality of dimming LED drivers 918. The dimming LED drivers 918 can use this power to generate one or more regulated currents that drive the plurality of LEDs. At the same time, a rectification circuit 902 of the battery backup 914 can convert the AC power from the AC mains 904 to DC power, which is then used to charge an energy storage device 908 via a charging circuit 906. A voltage to current converter 916 can then take voltage from the energy storage device 908 and produce a regulated current that can be used to supplement or replace current from the one or more LED drivers 918. The controller circuit 910, which can include a wireless radio or wired Internet connection, can control the rectification circuit 902, the charging circuit 908, and the voltage to current converter 916. The controller circuit 910 can thereby control a charging and discharging of the energy storage device 908. Along with its control of the plurality of dimming LED drivers 918, this enables the control circuit 910 to control a ratio of current from the LED drivers 918 and from the battery backup 918 that drives the plurality of LEDs. For instance, during periods of peak demand charges, energy can be drawn from the energy storage device 908 such that the LED outputs can be maintained while decreasing a current drawn by each of the plurality of LED drivers 918. In some cases, the LED drivers 918 may reduce their output more than can be compensated for by the energy storage device 908. However, the energy that is drawn from the energy storage device 908 can at least mitigate the decreased light output and thus reduce user perception of the drop in lighting.

The battery backup 914 can be coupled to an inverter 930 and an output of the inverter 930 can be sold back to the utility companies or provided to AC loads such as other areas of a house or commercial structure. A switch 920 can determine whether an output of the battery backup 914 is to be directed to the inverter 930 or to the plurality of LEDs. For instance, where a family goes on vacation from a residence or a company largely vacates a building for the holidays, the battery backup 914 can be charged during periods of low electrical pricing, and then the inverter 930 can sell the stored energy to the grid during periods of high electrical pricing, since the power may not be needed to power the LEDs. In an embodiment, the switch 920 can direct some power to the inverter 930 and some to the plurality of LEDs.

FIG. 10 illustrates a variation of FIG. 9 where the energy storage device 1008 is coupled to a regulating circuit 1007. Via this configuration, the energy storage device 1008 can be charged to a different voltage than a voltage provided by the regulating circuit 1007 to a voltage to current converter 1016.

FIG. 11 illustrates a variation of FIGS. 9 and 10 where the control circuit 1110 is coupled to or includes an energy storage device. In this embodiment, the control circuit 1110 may include regulating circuitry to control charging and health monitoring of the energy storage device. The control circuit 1110 may also include regulating circuitry to regulate voltage or current provided to the voltage regulator circuit 1107. The control circuit 1110 can include data/control as well as power transfer lines between it and the voltage regulator circuit 1107. While only a single data/control channel and a single power transfer line are shown, those of skill in the art will recognize that each of these can represent one or more channels or one or more physical lines. For instance, the power transfer line may be embodied by a low voltage (e.g., 5V) line and a high voltage (e.g., 5-50V) line.

Figure 13:
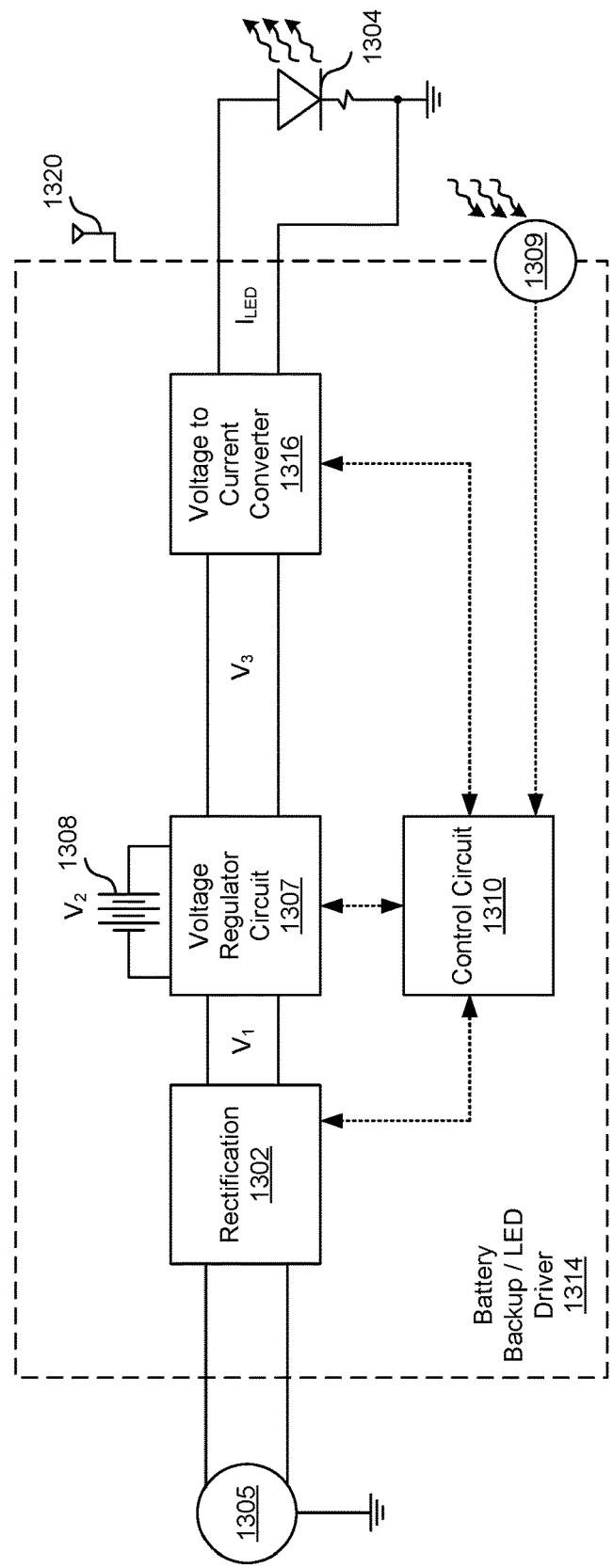
FIG. 13 illustrates an integrated dimming LED driver and battery backup system between an AC mains and a set of one or more LED lights.

FIG. 13 illustrates an integrated dimming LED driver and battery backup system (hereafter referred to as an "LED driver system" or "system") between an AC mains and a set of one or more LED lights. The system 1314, as compared to those described with reference to FIGS. 3-10, does not have a dimming LED driver separate from the battery backup. In this case, the driver that draws directly from an AC mains 1305, and the driver that uses stored energy, are one and the same. In particular, the system 1314 receives AC power from the AC mains 1305, rectifies the power via a rectification circuit 1302, provides the rectified or DC power to a voltage regulator circuit 1307 (at a voltage $V_1$), where the voltage regulator circuit 1307 controls a trickle of current to an energy storage device 1308, that charges the energy storage device 1308 to or toward a desired voltage, $V_2$. The voltage regulator circuit 1307 can also provide voltage, $V_3$, to a voltage to current converter 1316. The voltage, $V_3$, can be generated from the voltage $V_2$, across the battery, from the voltage, $V_1$, from the rectification circuit 1302, or from a combination of the two. In other words, the voltage regulated circuit 1307 determines whether to direct power from the AC mains 1305 to the energy storage device 1308, to one or more LEDs 1304 via the voltage to current converter 1316, or whether to direct power to both. Alternatively, the voltage regulator circuit 1307 can also drain the energy storage device 1308 while pulling power from the AC mains 1305, and use both of these sources to drive the one or more LEDs 1304 through the voltage to current converter 1316. The voltage to current converter 1316 can then convert the voltage, $V_3$, to a regulated LED current, $I_{LED}$, used to drive the one or more LEDs 1304. In some cases the voltage to current converter 1316 receives the voltage, $V_3$, and selectively generates the regulated LED current, $I_{LED}$, therefrom, while in others the voltage regulator circuit 1307 selectively generates the voltage, $V_3$. The voltage to current converter 1316 not only can turn the first LED current, $I_{LED}$, on and off, but can also control the magnitude of the first LED current, $I_{LED}$. A control circuit 1310 can be in communication with the rectification circuit 1302, the voltage regulator circuit 1307, and the voltage to current converter 1316. The control circuit 1310 can include a connection to a wireless radio 1320, where the wireless radio 1320 can be part of the battery backup/LED driver 1314 (as illustrated) or included as part of the control circuit 1310 (not illustrated).

During normal operation, the system 1314 can use power from the AC mains 1305 to drive the one or more LEDs 1304 via the rectification circuit 1302, the voltage regulator circuit 1307, and the voltage to current converter 1316. The voltage regulator circuit 1307 may or may not use some of the power to charge the energy storage device 1308. At the same time, the voltage regulator circuit 1307 may use some of the charge on the energy storage device 1308 to supplement power from the AC mains 1305, for instance by reducing a current draw from the AC mains 1305 and supplementing this decreased power draw with power from the energy storage device 1308. This is equivalent to the battery backup and the dimming LED drivers of FIGS. 3-10 both delivering current to the one or more LEDs at the same time, except here, both sources of power are integrated. One can see that this reduces the complexity and cost of the system, for instance by reducing the number of drivers from two to one. During a power outage or other issue with the AC mains 1305, the system 1314 can disconnect from the AC mains 1305, and power to the one or more LEDs 1304 can be provided from the energy storage device 1308.

This system 1314 has especial usefulness where a remote signal or data instructs or is used by the control circuit 1310 to adjust a ratio of the voltages $V_1$ and $V_2$ used to generate the voltage $V_3$. In other words, the control circuit 1310 can balance power drawn from the AC mains 1305 versus power drawn from the energy storage device 1308 based on factors such as electricity pricing, health of the energy storage device 1308, and light output of the one or more LEDs 1304 (e.g., via feedback from the feedback sensor 1309).

The system can include a control circuit 1310, a wireless radio 1320, and a feedback sensor 1309, all as described above relative to FIGS. 3-10. In an embodiment, the control circuit 1310 can have a wired connection to the Internet that supplements or replaces the wireless radio 1320.

In an embodiment, the rectification circuit 1302 can include additional power leads or connections to one or more of: the control circuit 1310, the voltage regulator circuit 1307, the voltage to current converter 1316, the feedback sensor 1309, and the wireless radio 1320. Although these connections are not illustrated, such an embodiment allows AC mains 1305 power to be partially diverted to these components, while a majority of the AC mains 1305 power is delivered by the rectification circuit 1302 to the voltage regulator circuit 1307. During periods of AC mains 1305 power failure, the energy storage device 1308, via the voltage regulator circuit 1307, can provide power to one or more of: the rectification circuit 1302, the control circuit 1310, the wireless radio 1320, and the voltage to current converter 1316.

Figure 14:
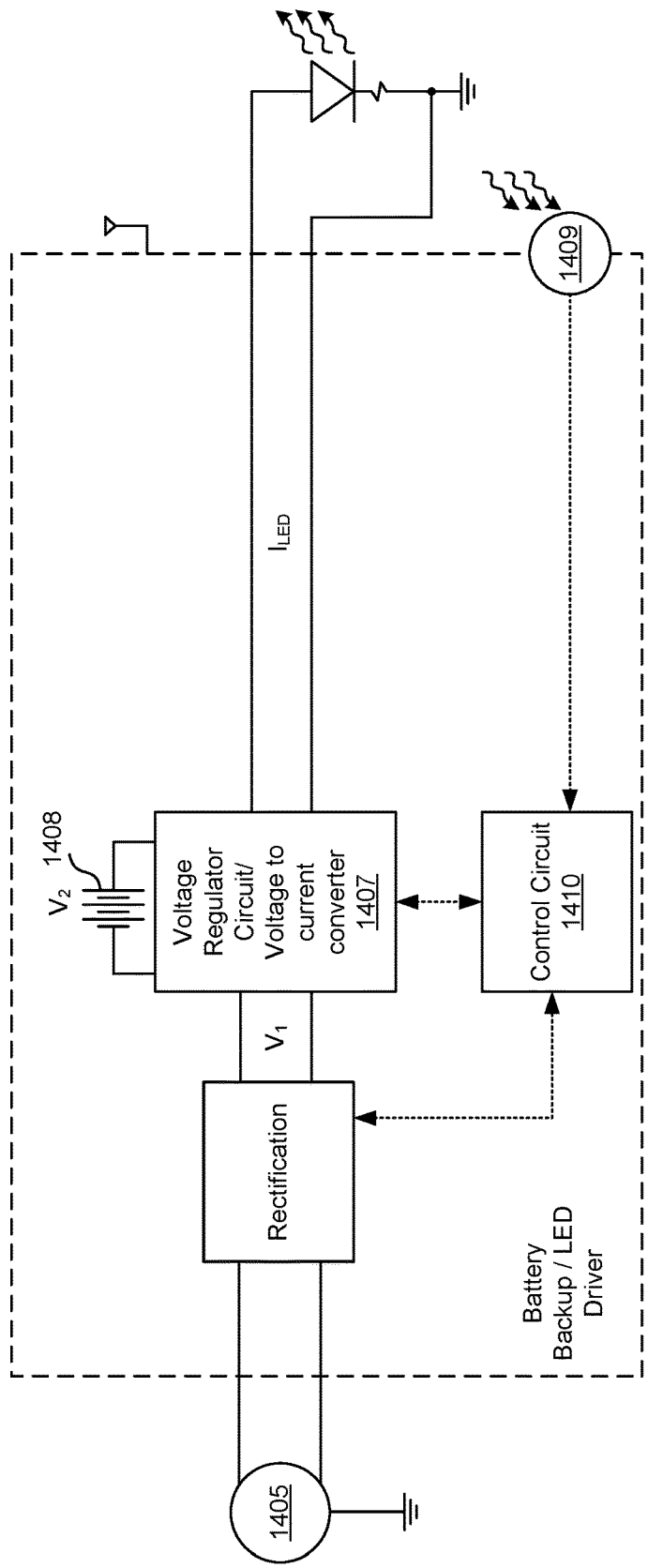
FIG. 14 illustrates another integrated dimming LED driver and battery backup system between an AC mains and a set of one or more LED lights.
Figure 15:
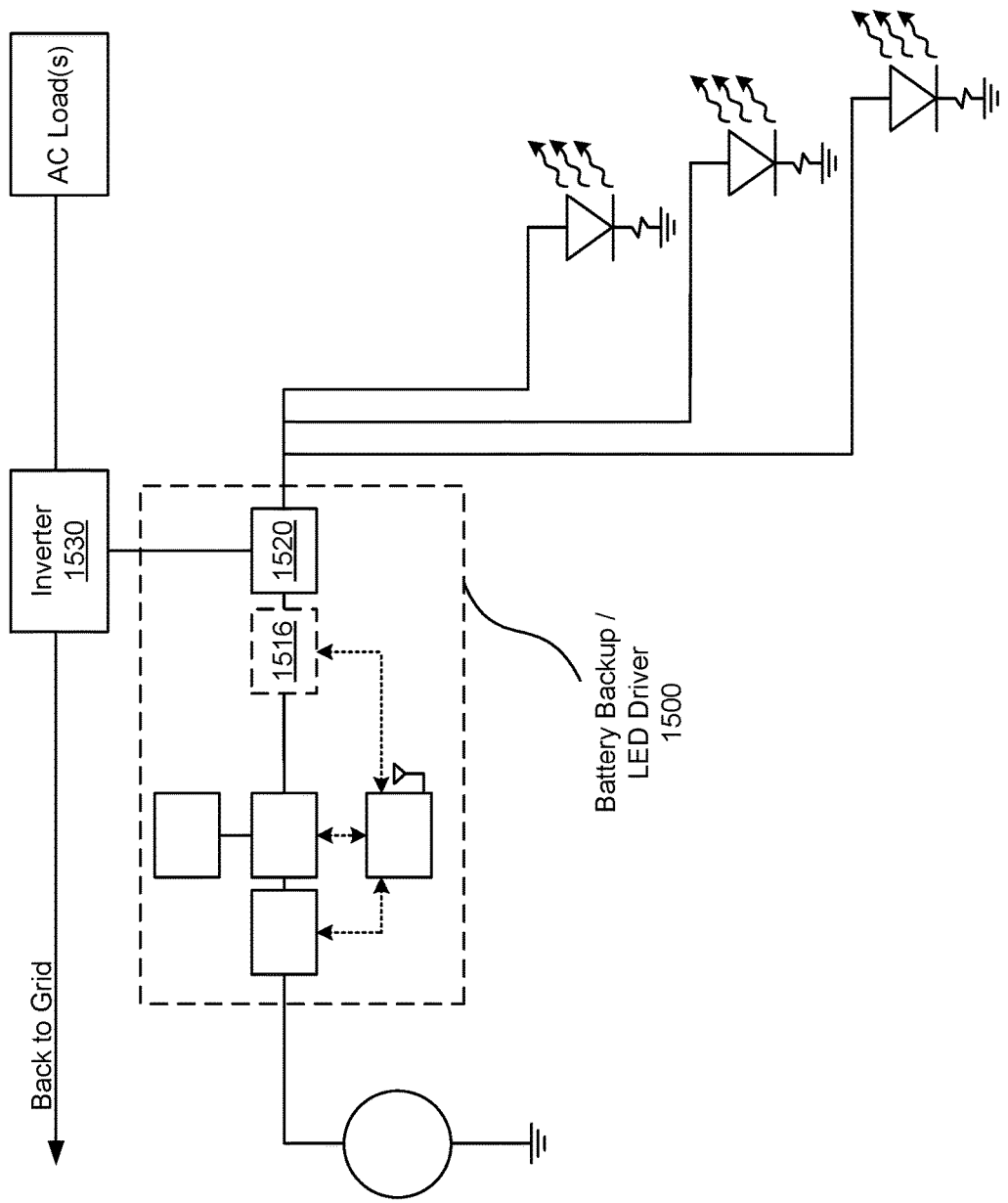
FIG. 15 illustrates a system of LED lights each powered by a single battery backup/LED driver system.

FIG. 15 illustrates a system of LED lights each powered by a single battery backup/LED driver system 1500. The battery backup/LED driver 1500 is as described in FIGS. 13 and 14, but now with an output that couples to a plurality of LED fixtures, each having one or more LEDs. Further, the battery backup/LED driver 1500 includes a switch 1520 that determines whether an output of the battery backup/LED driver 1500 is sent to the plurality of LED fixtures, to an inverter 1530, or is split between both destinations. The presence or absence of voltage to current converter 1516 distinguishes the dual stage (e.g., FIG. 13) from the single stage (e.g., FIG. 14) variation.

Figure 16:
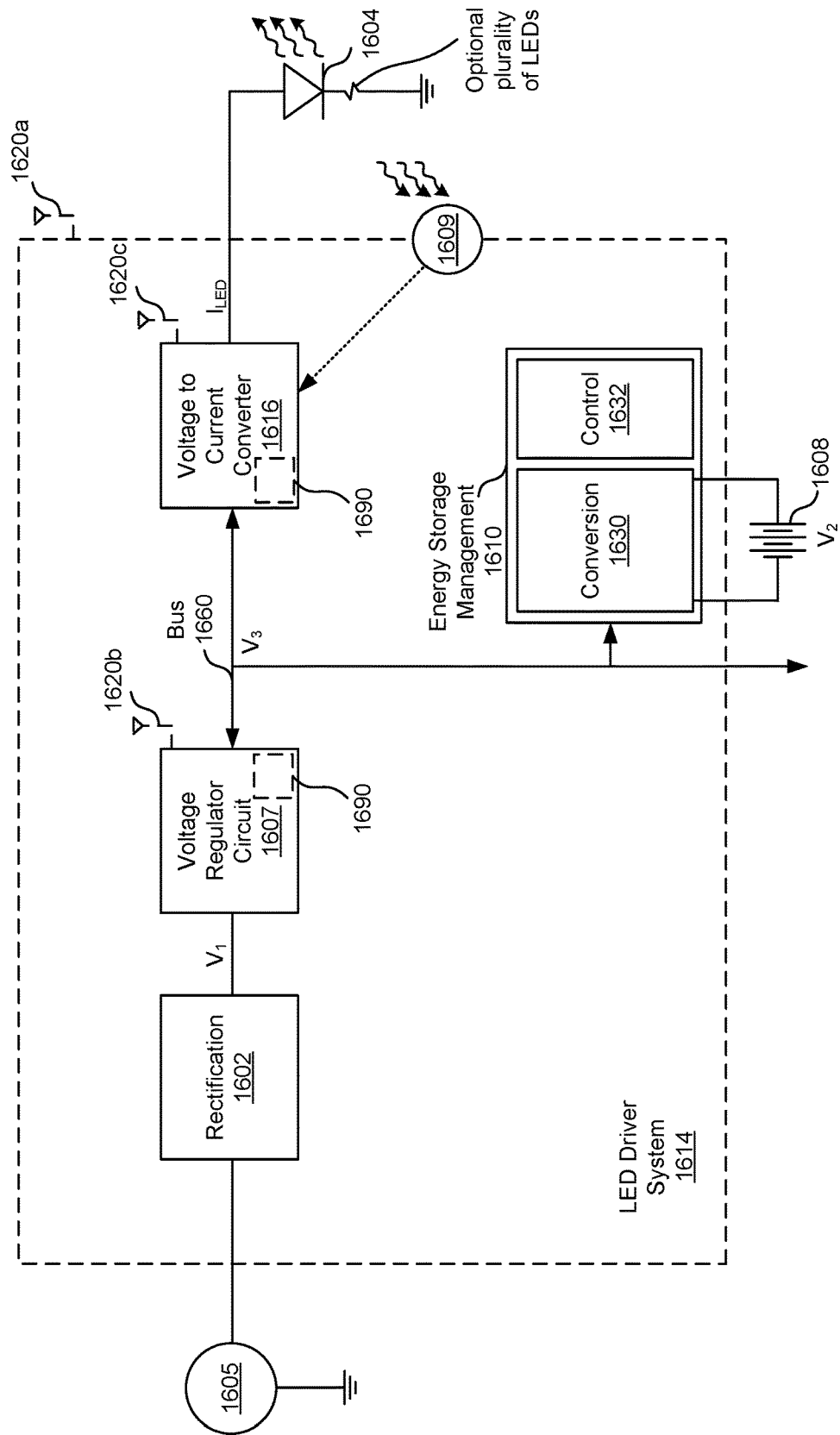
FIG. 16 illustrates an integrated dimming LED driver and battery backup system between an AC mains and a set of one or more LED lights.
Figure 36:
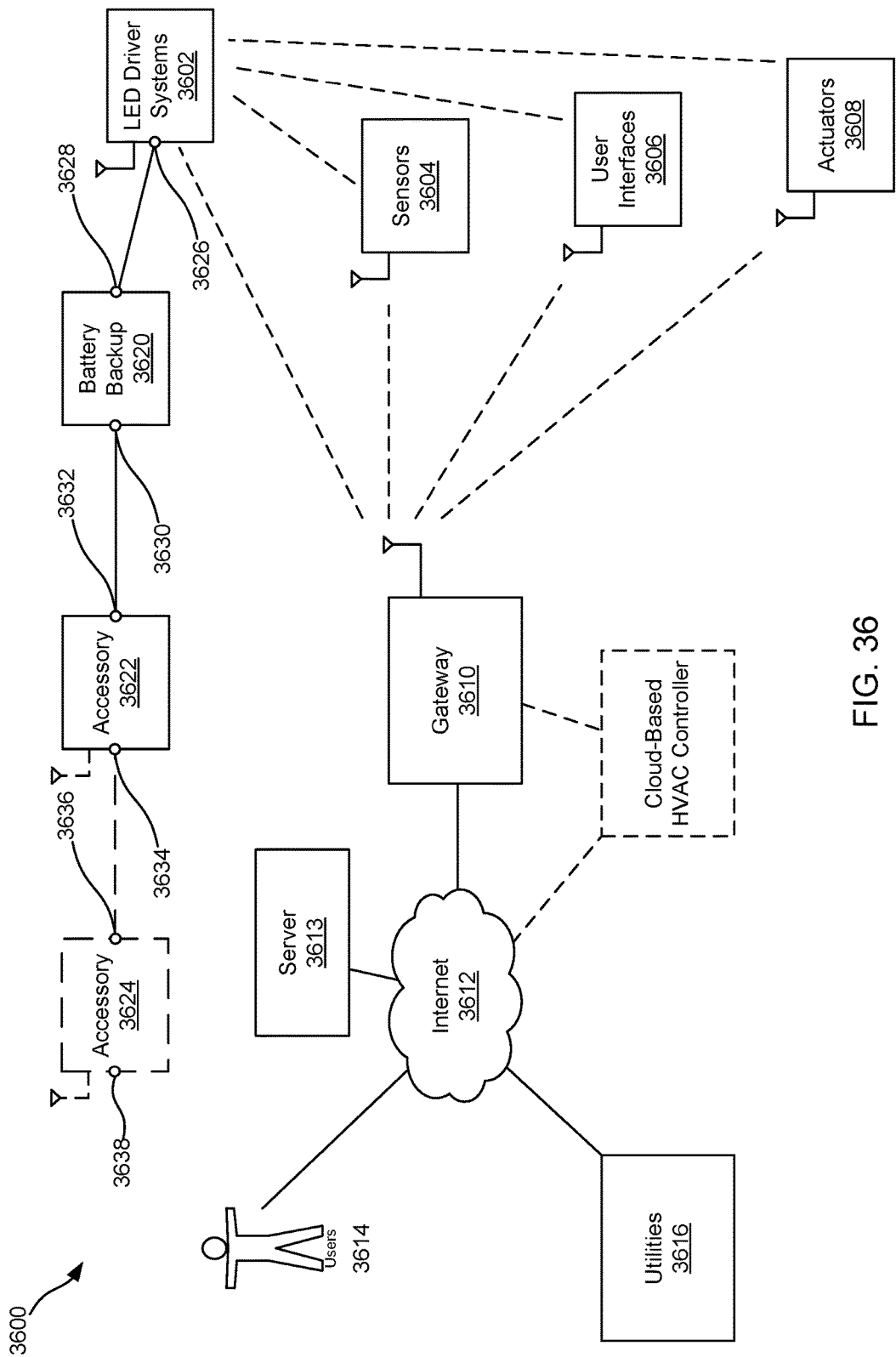
FIG. 36 illustrates another system where an LED driver system is coupled to a battery backup and one or more accessories via a bus.

FIG. 16 illustrates an integrated dimming LED driver and battery backup system between an AC mains and a set of one or more LED lights. Unlike FIGS. 3-10, the integrated dimming LED driver 1600 incorporates the dimming functionality of the separate LED driver and its ability to drive the LEDs based directly on AC mains power, into the backup battery system. Here, the LED driver that draws directly from an AC mains 1605, and the LED driver that uses stored energy, are one and the same. In particular, the system 1614 receives AC power from the AC mains 1605, rectifies the power via a rectification circuit 1602, provides the rectified or DC power to a voltage regulator circuit 1607 (at a voltage $V_1$), where the voltage regulator circuit 1607 provides a regulated bus voltage, $V_3$, to a bus 1660. The bus voltage, $V_3$, can be regulated to always be equal to or greater than a voltage needed to maintain the one or more LEDs 1604 in an on-state. The bus 1660 is coupled to a voltage to current converter 1616 and an energy storage management system 1610. The voltage to current converter 1616 turns the voltage $V_3$ on the bus into a regulated current, $I_{LED}$, that drives one or more LEDs 1604. The bus 1660 is also coupled to the energy storage management system 1610 and any number of accessories (e.g., see FIG. 36). The energy storage management system 1610 can be coupled to, or can include, an energy storage device 1608 (e.g., a battery), that is charged to a voltage, $V_2$, that may or may not be different than $V_3$. The energy storage management system 1610 includes a control 1632 configured to monitor and control charging of the energy storage device 1608 as well as to monitor and control provisioning of power from the energy storage device 1608 back to the bus 1660. A master controller 1690 can be arranged in either the voltage regulator circuit 1607 or the voltage to current converter 1616, and this master controller 1690 can monitor the system 1614 and provide instructions to the energy storage management system 1610 to charge, discharge, or maintain the energy storage device 1608.

The bus 1660 can include both data and power channels such that the voltage regulator circuit 1607, the voltage to current converter 1616 and the energy storage management system 1610 can communicate data and instructions to each other. Similarly, both the voltage regulator circuit 1607 and the energy storage management system 1610 can provide power to the bus 1660. However, the energy storage management system 1610 can also absorb power from the bus 1660. The master controller 1690 can pass instructions to the voltage regulator circuit 1607 and the voltage to current converter 1616 through a data channel of the bus 1660. In addition to a data channel, the bus 1660 may include one or more power channels. For instance, the bus 1660 may include a low voltage channel (e.g., 5V) for powering accessories and the controller of the energy storage management system 1610, and a high voltage channel (e.g., 30-50V) that passes power to and from the energy storage device 1608. The high voltage channel may also provide or receive high voltage to/from one or more accessories on the bus 1660. Accessories need not be lighting related. For instance, environmental sensors and wireless access points are two other examples of accessories. The bus 1660 is only functionally illustrated, and that physical implementations of the wires and connections making up the bus are not necessarily shown. For instance, the bus 1660 could pass through the voltage to current converter 1616 and/or through the energy storage management system 1610. Some non-limiting examples of the bus 1660 include $I^2C$, UARP, USB, encoding data on a power delivery channel (e.g., amplitude modulation, frequency modulation, or pulse-width modulation), analogue signals, radio, or optical.

In some embodiments, the master controller 1690 can monitor whether the AC mains 1605 is providing power to the system 1614 and adjust the distribution of power from the voltage regulator circuit 1607 and the energy storage device 1608 accordingly. Such distribution can be carried out via instructions passed within or to the voltage regulator circuit 1607 and to the control 1632 of the energy storage management system 1610. For instance, where power from the AC mains 1605 is lost, the master controller 1690 may instruct the control 1632 to instruct the conversion subsystem 1630 to draw power from the energy storage device 1608 and provide it to the bus 1660 at the voltage $V_3$, or at a lower voltage (accounting for the fact that dimmed lighting is often acceptable in emergency situations—where AC mains power has been lost).

The master controller 1690 can include circuits for, and/or a non-transitory tangible computer readable medium comprising instructions for, monitoring and controlling various components of the illustrated system. The master controller 1690 can include analogue circuits, digital circuits, or some combination of the two. The master controller 1690 can be part of or coupled to either the voltage regulator circuit 1607 or the voltage to current converter 1616. In some embodiments, these converters 1607, 1616 include a controller responsible for controlling an output of the voltage regulator circuit 1607 and the voltage to current converter 1616, sometimes based on feedback from the system 1614. The master controller 1690 can be embodied as one of these controllers or as a separate controller. In other words, the voltage regulator circuit 1607 can include a controller and the master controller or a single controller having both functionality of a controller for controlling the output and a master controller configured to control the voltage regulator circuit 1607, the voltage to current converter 1616, and the energy storage management system 1610. Alternatively, the voltage to current converter 1616 can include a controller and the master controller or a single controller having both functionality of a controller for controlling the output and a master controller configured to control the voltage regulator circuit 1607, the voltage to current converter 1616, and the energy storage management system 1610. In some instances, functionality of the master controller 1690 can be distributed between both the voltage regulator circuit 1607 and the voltage to current converter 1616. The energy storage management system 1610 is shown as being part of or within the LED driver system 1614. In some embodiments, the energy storage management system 1610 may be removably coupled to the bus 1660, for instance, via an auxiliary port. Further, the energy storage management system 1610 may include a second auxiliary port whereby other accessories can be coupled to the bus 1660 via physical connection to the energy storage management system 1610.

The master controller 1690 can include a connection to a wireless network interface 1620b, 1620c for communicating with various network protocols such as TCP/IP. Communication links to other components can be wired and/or optical, and in some cases are made via the bus 1660. Via the wireless network interface 1620b, 1620c, the master controller 1690 can receive indications and triggers, including those from remote users and remote electricity production companies or other utilities. For instance, the master controller 1690 may receive indications of electrical price changes, or instructions from utilities to reduce the power driving the one or more LEDs 1604.

In an embodiment, the master controller 1690 can monitor the bus voltage, $V_3$, the voltage on the energy storage device 1608, $V_2$ (through the control 1632), and the voltage draw form the voltage to current converter 1616, and instruct the control 1632 and thereby a conversion subsystem 1630 of the energy storage management system 1610 to charge or discharge the energy storage device 1608 in response to this monitoring. Additionally, the master controller 1690 can instruct the voltage regulator circuit 1607 to increase or decrease the bus voltage $V_3$ in response to this monitoring. The master controller 1690 can balance power drawn from the AC mains 1605 versus power drawn from the energy storage device 1608 based on factors such as electricity pricing, health of the energy storage device 1608, and light output of the one or more LEDs 1604 (e.g., via feedback from the feedback sensor 1609).

The control 1632 can include circuits for, and/or a non-transitory tangible computer readable medium comprising instructions for, monitoring a charge or voltage, $V_2$, on the energy storage device 1608, and determining how much (and at what rate) current, voltage, or power to allow through to the energy storage device 1608 so as to charge the energy storage device 1608. The control 1632 can be digital, analogue, or some combination of the two. In an embodiment, the control 1632 includes a timer that begins when charging of the energy storage device 1608 begins, and cuts the charging off after a set period of time. Although not illustrated, the control 1632 can also include connections and circuitry for monitoring the rectified voltage, $V_1$, a capacity of the energy storage device 1608, and/or current through the one or more LEDs 1604. All of this can be controlled by sending instructions to the conversion subsystem 1630. In some embodiments, one or more of these functions can be controlled by the master controller 1690.

In some embodiments, the energy storage management system 1610 can be a separate module from the LED driver system 1614 (e.g., see FIGS. 30-32), and thereby coupled to the LED driver system 1614 via the bus 1660. Although the energy storage device 1608 is illustrated as being outside the energy storage management system 1610, in some embodiments the energy storage device 1608 can be part of the energy storage management system 1610.

The conversion subsystem 1630 can include one or more power conversion circuits (e.g., buck, boost, or buck-boost converters). In other words, the conversion subsystem 1630 can include circuitry to control a voltage, current, or power drawn from the bus 1630 and used to charge the energy storage device 1608. At the same time, the conversion subsystem 1630, at the instruction of the control 1632, can adjust a rate of charging of the energy storage device 1608, and can even change the type of charging (e.g., current regulated to voltage regulated) or the rate of charging, during charging. Such an ability may be useful to accommodate different battery types, where the conversion subsystem 1630 is configured to couple to different energy storage device types 1608 without changes to the system 1614 or human interaction. For instance, a nickel metal hydride battery may be used for some period of time and may then be switched out for a lithium ion battery without any changes to the system 1614 and without any human interaction with the system 1614 other than the changing of the battery. The conversion subsystem 1630 can also include circuitry to control a voltage, current, or power delivered back to the bus 1660. In some instances, current, voltage, or power delivered to the bus 1660 may depend on a voltage, current, or power demand from a downstream accessory, or the combination of demands from the voltage to current converter 1616 and a downstream accessory, although the master controller 1690 typically governs the current, voltage, or power delivered to the bus 1660. Further details of the conversion subsystem 1630 can be seen and are discussed with reference to FIGS. 31 and 32.

A wireless radio or wireless network interface 1620 can be coupled to any of the sub circuits within the system 1614 or the wireless network interface 1620 can be accessed by any of these sub circuits. For instance, the wireless network interface 1620 can be accessed by the master controller 1690 (e.g., for sending and receiving messages). Data indicating that electricity prices are changing during the day can be relayed from a utility to the master controller 1690 via the wireless network interface 1620. Given certain data, messages, or instructions through the wireless network interface 1620, the master controller 1690 may provide instructions to one or more of the voltage regulator circuit 1607, the voltage to current converter 1616, and the energy storage management system 1610, in combination with feedback from the monitoring described above.

The voltage regulator circuit 1607 can include circuits for, and/or a non-transitory tangible computer readable medium comprising instructions for, generating the bus voltage, $V_3$, from the rectified voltage, $V_1$. In some embodiments, the voltage regulator circuit 1607 can include a rectification component (e.g., on a secondary side of an isolation boundary) and thus the rectification circuit 1602 upstream of the voltage regulator circuit 1607 is not needed. The voltage regulator circuit 1607 can include a controller for monitoring one or more voltages, currents, and or powers at different points within the system 1614 or at the one or more LEDs 1604 and regulating the bus voltage, $V_3$, in response. Such a controller could monitor the bus voltage, $V_3$, and in response, adjust a duty cycle of a switch within the voltage regulator circuit 1607 to regulate the bus voltage, $V_3$. This controller can be the master controller 1690 or a separate controller. Where this controller is the master controller 1690, this controller can also be responsible for controlling the voltage to current converter 1616 and the energy storage management system 1610.

Although not shown, the system 1614 may include an isolation boundary to provide galvanic isolation between a primary and secondary side of the system 1614. In other words, UL requirements specify that a "hot" or high voltage portion of a device should not have any electrically conductive connections to a secondary side that is accessible to human touch. Thus, isolation boundaries often use a transformer to bridge the boundary and prevent users from touching the primary side of the device, or any portions of the device that are high voltage. This application uses the terms high and low voltage relative to the bus 1660, but it should be understood that "high voltage" in context of the bus 1660 is different than the "high voltage" used in the UL context. In other words, the primary side includes high voltage that is typically the AC mains voltage (e.g., 120V or 240V), whereas the secondary side typically includes a downconverted 'high voltage' that is typically between 5V and 50V. The isolation boundary may pass through the voltage regulator circuit 1607, although in some cases it passes through the voltage to current converter 1616. If the isolation boundary passes through the voltage regulator circuit 1607, then the energy storage management system 1610 can be arranged on the secondary side of the isolation boundary. This means the bus 1660 can be on the secondary side. If the isolation boundary passes through the voltage to current converter 1616, then the energy storage management system 1610 can be arranged on the primary side of the isolation boundary. This means that the bus 1660 will also be the primary side.

The voltage regulator circuit 1607 can be digital, analogue, or some combination of the two. The master controller 1690, whether arranged within the voltage regulator circuit 1607 or in the voltage to current converter 1616, controls the voltage regulator circuit 1607. Where the master controller 1690 is arranged in the voltage to current converter 1616, instructions from the master controller 1690 to the voltage regulator circuit 1607 can be passed via the data channel of the bus 1660. In other cases, the voltage regulator circuit 1607 can act independently of the master controller 1690, although the master controller 1690 may still monitor an output of the voltage regulator circuit 1607 (the bus voltage, $V_3$). In some cases, the voltage regulator circuit 1607 may provide feedback to the master controller 1690, if the master controller 1690 is in the voltage to current converter 1616, via the bus 1660, or provided via internal channels if the master controller 1690 is arranged in the voltage regulator circuit 1607.

The voltage regulator circuit 1607 can be embodied in a buck or similar topology. In some embodiments, the voltage regulator circuit 1607 can include a switch mode power supply. In some embodiments, it can include at least one switch, e.g., a MOSFET switch, having a duty cycle selected to produce the desired bus voltage, $V_3$. A MOSFET switch can be part of a buck topology. A sensor can be coupled to bus 1660, and this sensor can provide feedback to the voltage regulator circuit 1607 used to control the bus voltage, $V_3$ (e.g., controlling the duty cycle of a MOSFET switch within the voltage regulator circuit 1607). The voltage regulator circuit 1607 can be a voltage source (i.e., generating a regulated voltage and a non-regulated current). When a balance of power drawn from the AC mains 1605 and the energy storage device 1608 is to be altered, either the voltage regulator circuit 1607 can alter its power output (e.g., adjust its voltage output), the energy storage management system 1610 can alter the discharge from the energy storage device 1608, or both. The master controller 1690 can control this balance. The voltage regulator circuit 1607 may include power factor correction (PFC) circuitry or the controller (or master controller 1690) can be configured to optimize or increase PFC as compared to a non-PFCoptimized system. Further details of the voltage regulator circuit 1607 can be seen and are described with reference to FIG. 30.

The voltage to current converter 1616 can include circuits for, and/or a non-transitory tangible computer readable medium comprising instructions for, generating a first regulated LED current, $I_{LED}$, from the bus voltage, $V_3$. For instance, the voltage to current converter 1616 can include a controller for monitoring one or more voltages, currents, and or powers at different points within the system 1614 or at the one or more LEDs 1604 and regulating the first regulated LED current, $I_{LED}$, in response. Such a controller could monitor a voltage across the one or more LEDs, and in response, adjust a duty cycle of a switch within the voltage to current converter 1616 in order to regulate the first LED current, $I_{LED}$. Where the master controller 1690 is part of or coupled to the voltage to current converter 1616, the voltage to current converter's 1616 internal controller could be the master controller 1690, although a separate master controller 1690 is also possible.

The voltage to current converter 1616 can be digital, analogue, or some combination of the two. In some cases its actions can be controlled by the master controller 1690 via data or instructions passed on the data channel of the bus 1660, where the master controller 1690 is part of the voltage regulator circuit 1607. If the master controller 1690 is part of the voltage to current converter 1616, then such instructions can be sent via internal channels of the voltage to current converter 1616. In other cases, the voltage to current converter 1616 can act independently of the master controller 1690. In some cases, the voltage to current converter 1616 may provide feedback to the master controller 1690 via internal channels or the bus 1660. The voltage to current converter 1616 can be embodied in a buck, boost, buck-boost, or similar topology. In some embodiments, the voltage to current converter 1616 is a buck converter and receives a bus voltage, $V_3$, that is equal to or greater than a voltage across the one or more LEDs 1604. In some embodiments, the voltage to current converter 1616 can include a switch mode power supply. In some embodiments, it can include at least one switch, e.g., a MOSFET switch, having a duty cycle selected to produce the desired first regulated LED current, $I_{LED}$. A MOSFET switch can be part of a buck topology. A sensor can be coupled to the channel that leads to, from, or between the one or more LEDs 1604 (e.g., a voltage sensor measuring voltage across a resistor in series with the one or more LEDs 1604), and this sensor can provide feedback to the voltage to current converter 1616 used to control the first regulated LED current, $I_{LED}$ (e.g., controlling the duty cycle of a MOSFET switch). The voltage to current converter 1616 can be a current source (i.e., generating a regulated current and a non-regulated voltage). Further details of the voltage to current converter 1616 can be seen and are described with reference to FIG. 30.

Any of the voltage regulator circuit 1607, the voltage to current converter 1616, and the energy storage management system 1610 can monitor feedback to adjust and achieve a desired input or output as instructed by the master controller 1690.

The energy storage device 1608 can include any one or more batteries, capacitors, etc. arranged in series, parallel, or some combination thereof. The energy storage device 1608 can be removably coupled to the conversion subsystem 1630. Because of this removable coupling, the energy storage device 1608 can be arranged inside or outside the LED driver system 1614.

The system 1614 can optionally include a feedback sensor 1609 (e.g., a photo sensor) as described above relative to FIGS. 3-10. The feedback sensor 1609 can be arranged inside or outside the system 1614. The feedback sensor 1609 can provide feedback to the master controller 1690, directly if arranged within the voltage to current converter 1616, or via the voltage to current converter 1616 and the bus 1660 if arranged within the voltage regulator circuit 1607. The feedback may be used to control either or both the bus voltage, $V_3$, and the first regulated LED current, $I_{LED}$, to maintain a relatively constant LED luminosity output. In some cases, a LEDs output is not linearly related to current through the LEDs and thus halving the driving current may not achieve a desired halving of the LED output. Thus, the feedback can be used to tailor the driving current to achieve a desired luminous output. The feedback sensor 1609 can be an optical sensor.

Although emergency backup situations may call for dimming of the one or more LEDs 1604, there may also be other impetuses for dimming (e.g., a dimming signal from a user dimmer switch). Although not illustrated, the system 1614 may include a dimming input, such as from a wall-mounted dimmer switch or a wireless dimming input (e.g., smart home input). For instance, a 0-10V dimming channel may couple to the voltage to current converter 1616. The voltage to current converter 1616 may therefore see instructions from the master controller 1690 and the 0-10V dimming signal, and may have to prioritize between these two sources of instructions. Typically, instructions from the master controller 1690 take precedence. For phase dimming, the power on the line between rectification circuit 1602 could include the phase-cut signal, and the voltage regulator circuit 1607 could include circuitry to analyze and interpret this phase-cut signal. The voltage regulator 1607 can then pass information regarding the desired dimming to the voltage to current converter 1616 via the bus 1660 and the voltage to current converter 1616 can determine how to regulate its output in response. In some embodiments, the master controller 1690 may be involved in analyzing the dimming signal and determining whether to pass the dimming information to the voltage to current converter 1616, or determining whether the dimming signal should take precedence over any other controls of the regulated LED current, $I_{LED}$.

An advantage of the bus 1660 is that the energy storage management system 1610 and accessories can be plugged into the bus 1660 with off-the shelf adapters (e.g., RJ45, USB, etc.). In contrast, where an energy storage device is tied into a battery backup system via separate input and output channels rather than a bus (e.g., see U.S. Pat. No. 9,338,839), power is much more complicated to siphon off for accessory use. For instance, in U.S. Pat. No. 9,338,839, if accessories are coupled to the input side of the energy storage device, then the accessories cannot be powered from the energy storage device. Thus, demand response triggers to decrease AC mains usage could result in decreased or no power being transferred to accessories. Further, where AC mains power is lost and lights are powered by the energy storage device, accessories would also lose power. On the other hand, if accessories are coupled into the output side of the energy storage device, then inefficiencies are seen since all power to the accessories has to pass through a power converter that is used to charge and discharge the energy storage device. For instance, the output of the energy storage device is typically at a lower voltage than the input, and thus accessories coupled to the output will always receive power that has been stepped-down by the power converter coupled to the energy storage device. Further, accessories coupled to the output of the energy storage device cannot also tap into AC mains power, and thus are incapable of receiving a blend of power from the AC mains and the energy storage device.

In contrast, the herein disclosed systems, including, the system 1614 enable accessories to be powered without power first passing through any conversion stages of the energy storage management system 1610 (i.e., avoiding inefficiencies of passing through unneeded converters), and via the same blend of AC mains 1605 and energy storage device 1608 power as the rest of the bus 1608. In other words, while the energy storage management system 1610 is on the bus 1660, power and data channels on the bus 1660 need not pass through the conversion subsystem 1630 where the bus 1660 passes through the energy storage management system 1610. Thus use of a bus 1660 allows accessories to draw power from the energy storage device 1608 when AC mains 1605 power is lost. Further, use of a bus 1660 provides faster response, lower cost, and greater flexibility (e.g., since the bus 1660 can be used by accessories and provides the same function to those accessories as is provided to the energy storage management system 1610) than the separate input/output configuration of U.S. Pat. No. 9,338,839. Further, the prior art's use of separate input and output channels to the energy storage device means that when battery voltage drops below what is needed to keep the light source/load on, the charging circuit of the art would need to boost or upconvert its output. Yet, the prior art neither describes this functionality nor appreciates this challenge, and is therefore inoperable for lower states of battery charging. The instant system 1614 in contrast, is provided with circuitry to boost output from the energy storage device 1608, in the form of the conversion subsystem 1630, and therefore allows the energy storage device 1608 power to be used even when the charge has fallen below a voltage needed to maintain the one or more LEDs 1604 in an on-state.

Figure 17:
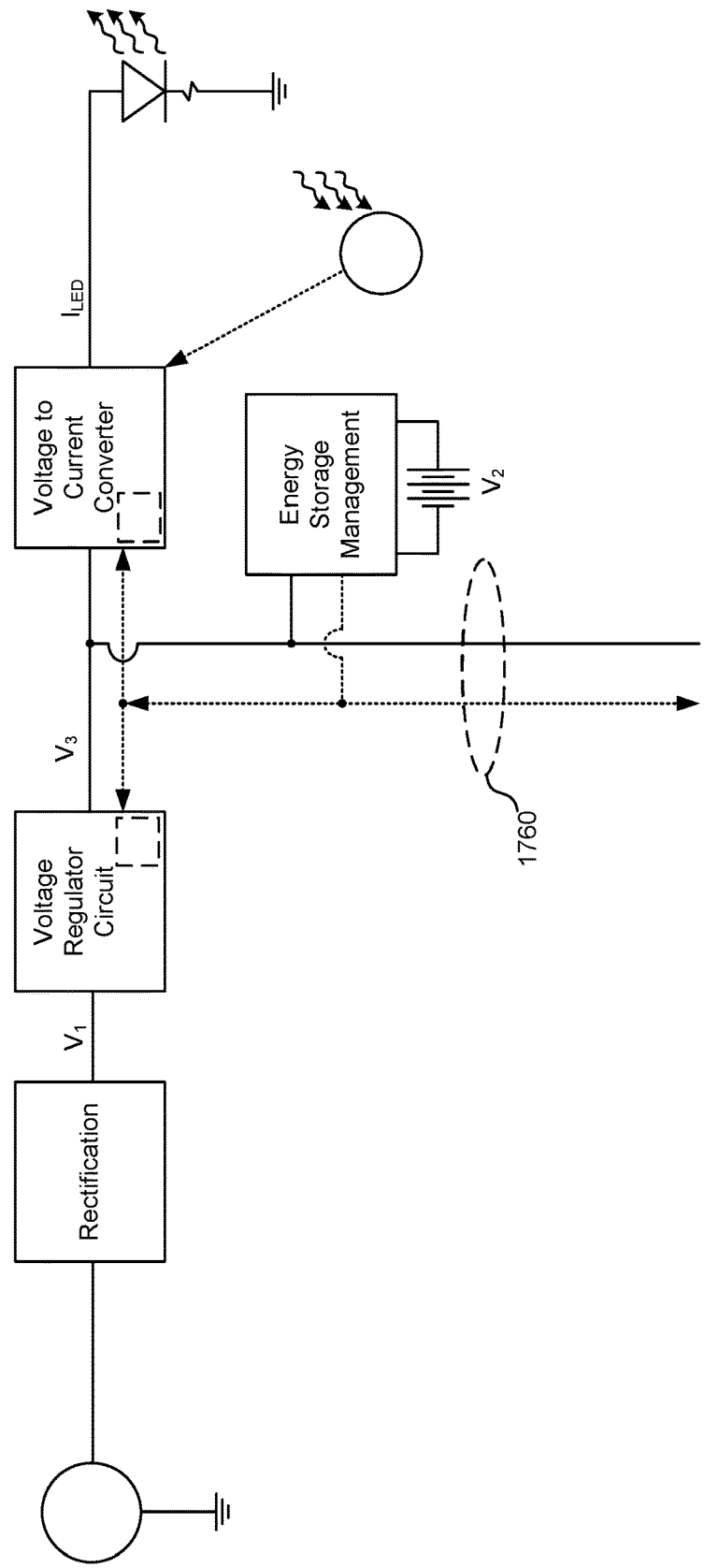
FIG. 17 illustrates another embodiment of an integrated dimming LED driver and battery backup system between an AC mains and a set of one or more LED lights.

FIG. 17 illustrates another embodiment of an integrated dimming LED driver and battery backup system between an AC mains and a set of one or more LED lights. FIG. 17 illustrates how the bus 1760 may include a data channel (dashed) and a power channel (solid), where either or both channels can carry one or more signals. For instance, the power channel can include a high and low voltage signal (e.g., via separate physical lines).

Figure 18:
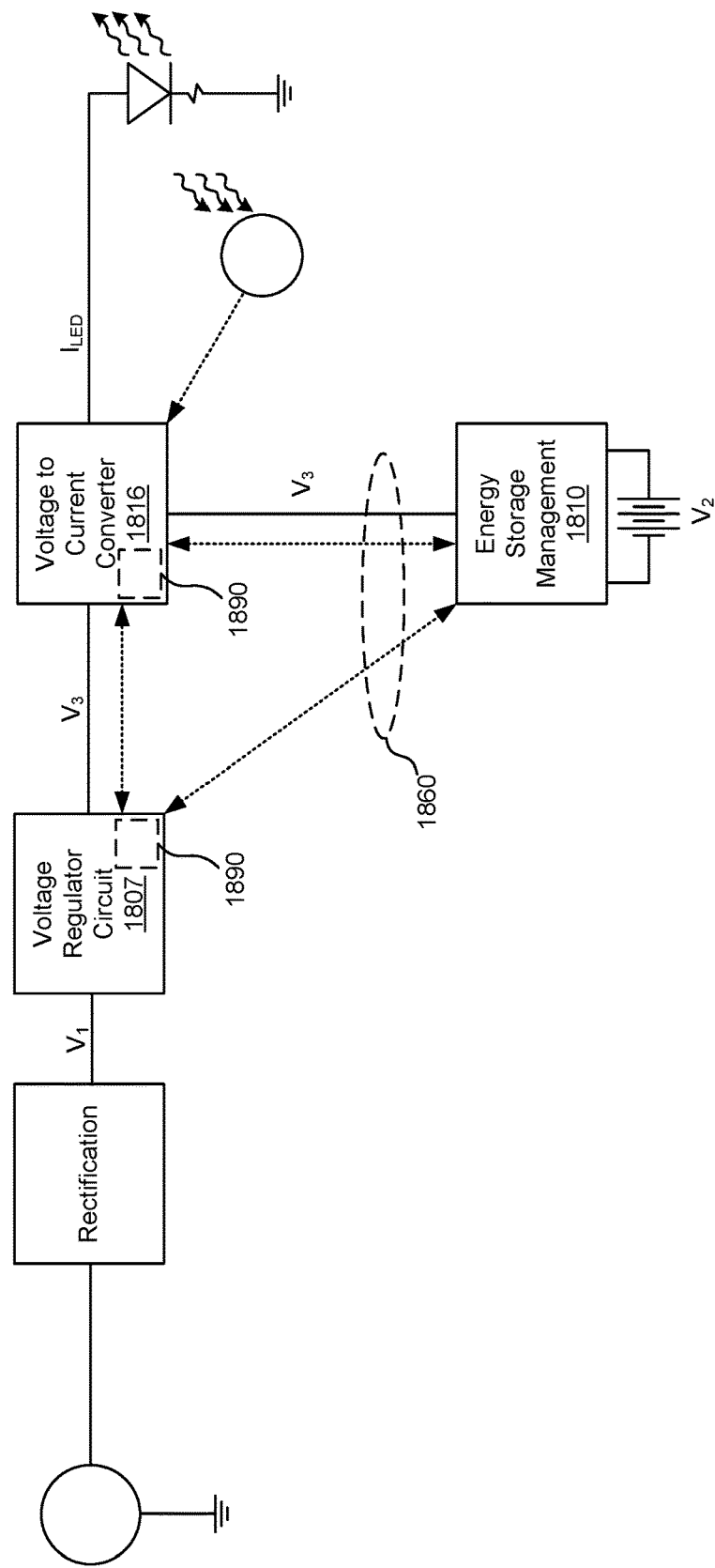
FIG. 18 illustrates another embodiment of an integrated dimming LED driver and battery backup system between an AC mains and a set of one or more LED lights.

FIG. 18 illustrates another embodiment of an integrated dimming LED driver and battery backup system between an AC mains and a set of one or more LED lights. In this illustration, each of the voltage regulator circuit 1807, the voltage to current converter 1816, and the energy storage management system 1810 can have direct communication or data channels between each of these three components. This is another way to implement a bus 1860. Compare this with FIG. 19, where the communication or data channels pass through the voltage to current converter 1916. For instance, an instruction from the master controller 1990, if arranged in the voltage regulator circuit 1990, passes along the bus 1960 and through the voltage to current converter 1916 to reach the energy storage management system 1910.

Figure 19:
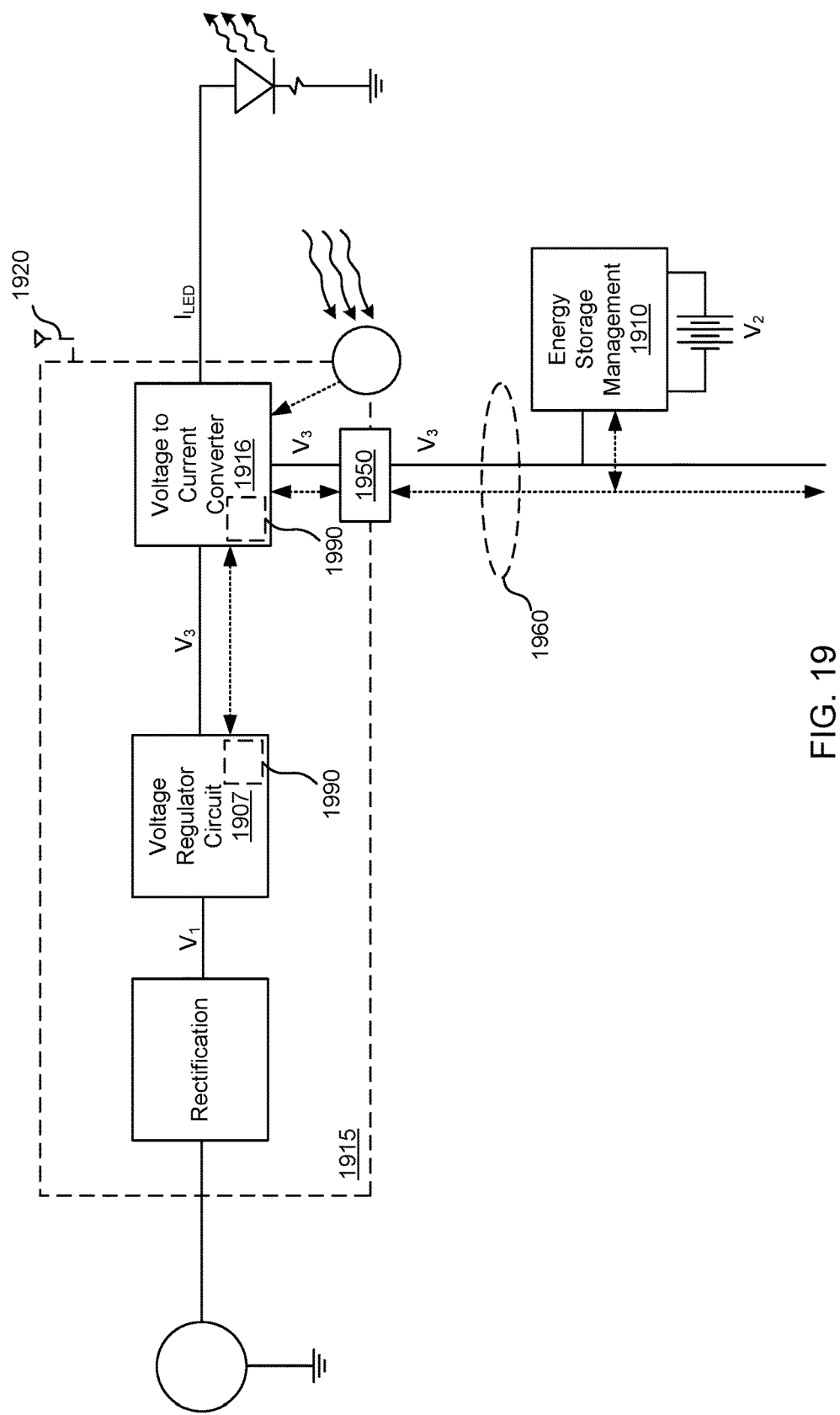
FIG. 19 illustrates another embodiment of an integrated dimming LED driver and battery backup system, but with the bus routed through the voltage to current converter, and optionally through a port.

FIG. 19 illustrates another embodiment of an integrated dimming LED driver and battery backup system, but with the bus 1960 routed through the voltage to current converter 1916, and optionally through a port 1950. The port 1950 can be arranged on an outside of an optional driver system 1915, although other packaging arrangements are also possible. The port 1950 enables the system 1915 to be modular—exchangeable with or coupled to a number of other modules having a port interface or an interface for the bus 1960. Here, the energy storage management system 1910 is one module that can be coupled to the port 1950. Other accessories can also couple to the port 1950, or can be daisy chained on the bus 1960 by coupling one to each other and through the energy storage management system 1910 to the system 1915. In this way, multiple accessories can have access to the bus 1960 and therefore access to the data and power channels therein as well as to a wireless network interface 1920. For instance, a wireless access point device could be coupled to an output port (not shown) of the energy storage management system 1910, where the energy storage management system 1910 is coupled to port 1950, and the wireless access point device can then be powered from a low voltage channel of the bus 1960 without being directly coupled to the system 1915. Details of the promulgation of the bus 1960 through the voltage to current converter 1916 can be seen in FIG. 30.

Figure 20:
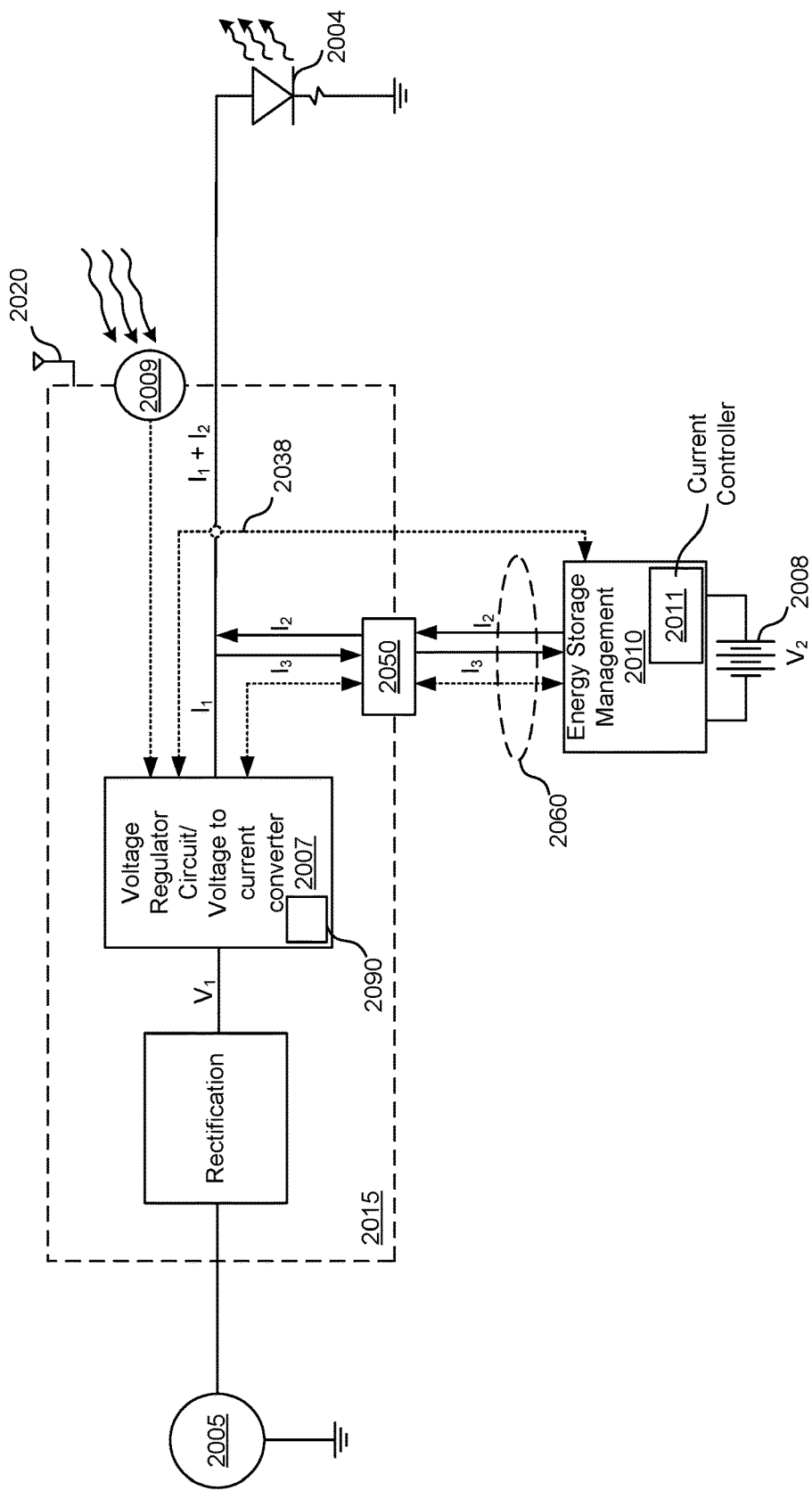
FIG. 20 illustrates another embodiment of an integrated dimming LED driver and battery backup system, but in a single-stage variation.

FIG. 20 illustrates another embodiment of an integrated dimming LED driver and battery backup system, but in a single-stage variation (a single regulator stage rather than voltage and then current regulating stages). Here, a voltage regulator circuit/voltage to current converter 2007, with a master controller 2090, converts a rectified DC voltage, $V_1$, to a regulated LED current, $I_1$. The regulated LED current, $I_1$, can either be directed entirely to the one or more LEDs 2004, or can be partially directed to the one or more LEDs 2004, and partially directed to the energy storage management system 2010. The master controller 2090 can monitor and control this balance. In another embodiment, the regulated LED current, $I_1$, can be entirely directed to the energy storage management system 2010. The energy storage management system 2010 can absorb charging current, $I_3$, if available, and charge an energy storage device 2008. The energy storage management system 2010 can also provide power from the energy storage device 2008 to the one or more LEDs 2004 via current, $I_2$, at the behest of the master controller 2090. As such, a first regulated LED current, $I_1$, from the AC mains 2005 can be combined with the second regulated LED current, $I_2$, from the energy storage device 2008 to form a combined regulated LED current, $I_1+I_2$, that drives the one or more LEDs 2004. In some instances, the voltage regulator circuit/voltage to current converter 2007, via instruction from the master controller 2090, can adjust the balance between $I_2$ and $I_1$. In yet other instances, both the energy storage management system 2010 and the voltage regulator circuit/voltage to current converter 2007 can work in combination, via instruction from the master controller 2090, to adjust the balance between $I_2$ and $I_1$.

The energy storage management system 2010 can include a current controller 2011 having circuitry to draw power from the energy storage device 2008 and generate regulated current $I_2$. A wireless network interface 2020 can be coupled to any portion of the system 2015, for instance, the voltage regulator circuit/voltage to current converter 2007.

An optional current sensor 2038 can provide feedback to the energy storage management system 2010 and the current controller 2011 such that the energy storage management system 2010 can adjust the current, $I_2$, so that combined regulated LED current, $I_1+I_2$, is a value corresponding to a desired output of the one or more LEDs 2004. Alternatively, this feedback can pass to the master controller 2090 that can then instruct the energy storage management system 2010 to adjust the current, $I_2$. In some instances, an optional optical sensor 2009 can be used to monitor the luminous output of the one or more LEDs 2004 and provide feedback to the master controller 2090 to control the combined regulated LED current, $I_1+I_2$, or the current $I_2$.

In a non-illustrated embodiment, the voltage regulator circuit/voltage to current converter 2007 could generate a regulated voltage rather than a regulated current. In such an instance, the energy storage management system 2010 could monitor current from the optional current sensor 2038 and absorb or generate a regulated current $I_3$ or $I_2$ in order to achieve a desired current at the current sensor 2038.

Data and instructions can be passed between the energy storage management system 2010 and the voltage regulator circuit/voltage to current converter 2007. The combination of data and power going to and from the energy storage management system 2010 can be via a bus 2060. Although currents $I_3$ and $I_2$ are shown as separate lines in the figure, in practice these currents could pass along the same bidirectional physical line. In other cases, the bus 2060 can include additional power channels to carry other currents or voltages, such as a low voltage channel (e.g., 5V). The energy storage management system 2010 can connect to the bus 2060 via the port 2050. Additional accessories can also couple to the bus 2060 via a port of the energy storage management system 2010 (not shown) or other means of connection to the energy storage management system 2010. The voltage regulator circuit/voltage to current converter 2007 may have circuitry to enable power factor correction. Advantages of the single-stage system 2015 include fewer components, lower cost, and smaller packaging.

Figure 21:
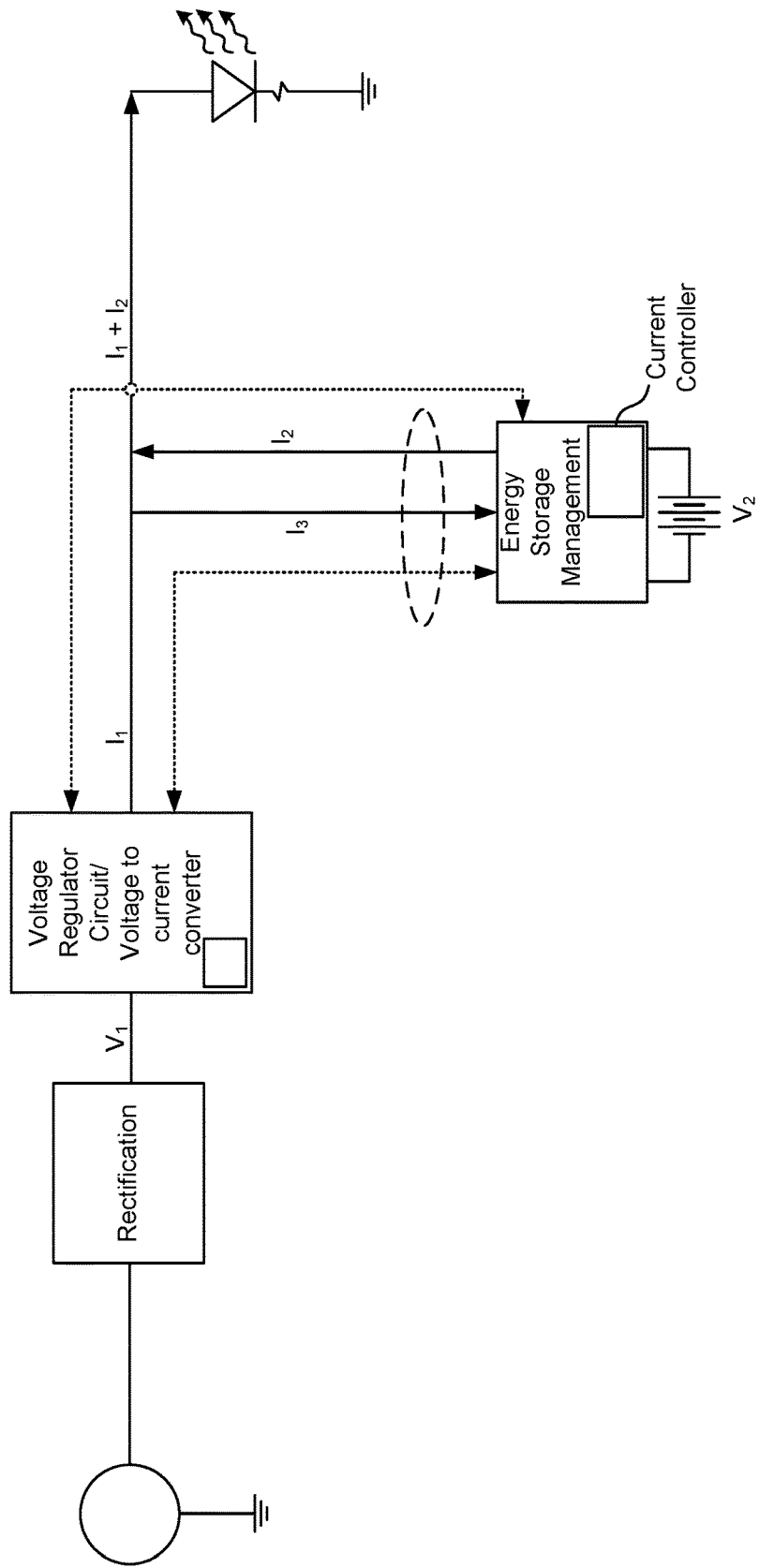
FIG. 21 illustrates another embodiment of an integrated dimming LED driver and battery backup system, but in a single-stage variation.

FIG. 21 illustrates another embodiment of an integrated dimming LED driver and battery backup system, but in a single-stage variation. This figure shows a variation of FIG. 20 without the port 2050.

Figure 22:
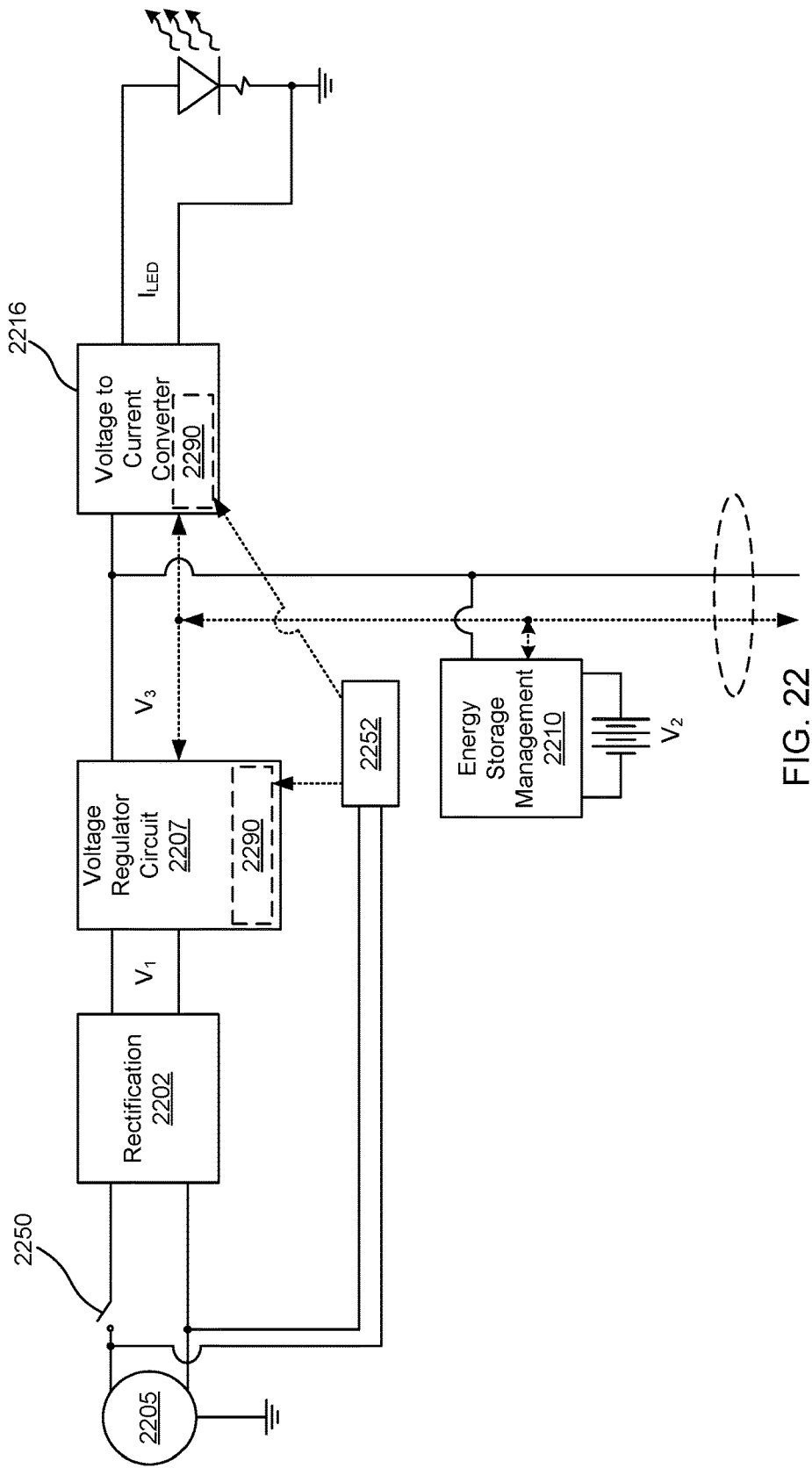
FIG. 22 illustrates another embodiment of a two-stage integrated dimming LED driver and battery backup system.

FIG. 22 illustrates another embodiment of a two-stage integrated dimming LED driver and battery backup system. If there is a desire to know when AC mains 2205 power has been lost, indications of such an event can be confused with switching of a switch 2250 (e.g., a light switch) arranged between the AC mains 2205 and the rectification 2202. To overcome the unknown source of power loss where a switch 2250 is implemented, the energy storage management system 2210 can monitor power between the AC mains 2205 and the switch 2250, for instance via a power sensor 2252. The power sensor 2252 may be coupled to or part of the master controller 2090, or may reside near leads between the AC mains 2205 and the switch 2250. The power sensor 2252 can include a large input impedance so that only a small current is drawn from the AC mains 2205. Alternatively, the power sensor 2252 can use non-contact methods (e.g., inductive or capacitive) to monitor power on the line to the switch 2250. In this way, the power sensor 2252 can tell the master controller 2090 whether AC mains 2205 power has been lost regardless of the state of the switch 2250. The master controller 2090 can be arranged in a voltage regulator circuit 2207 or a voltage to current converter 2216.

Figure 23:
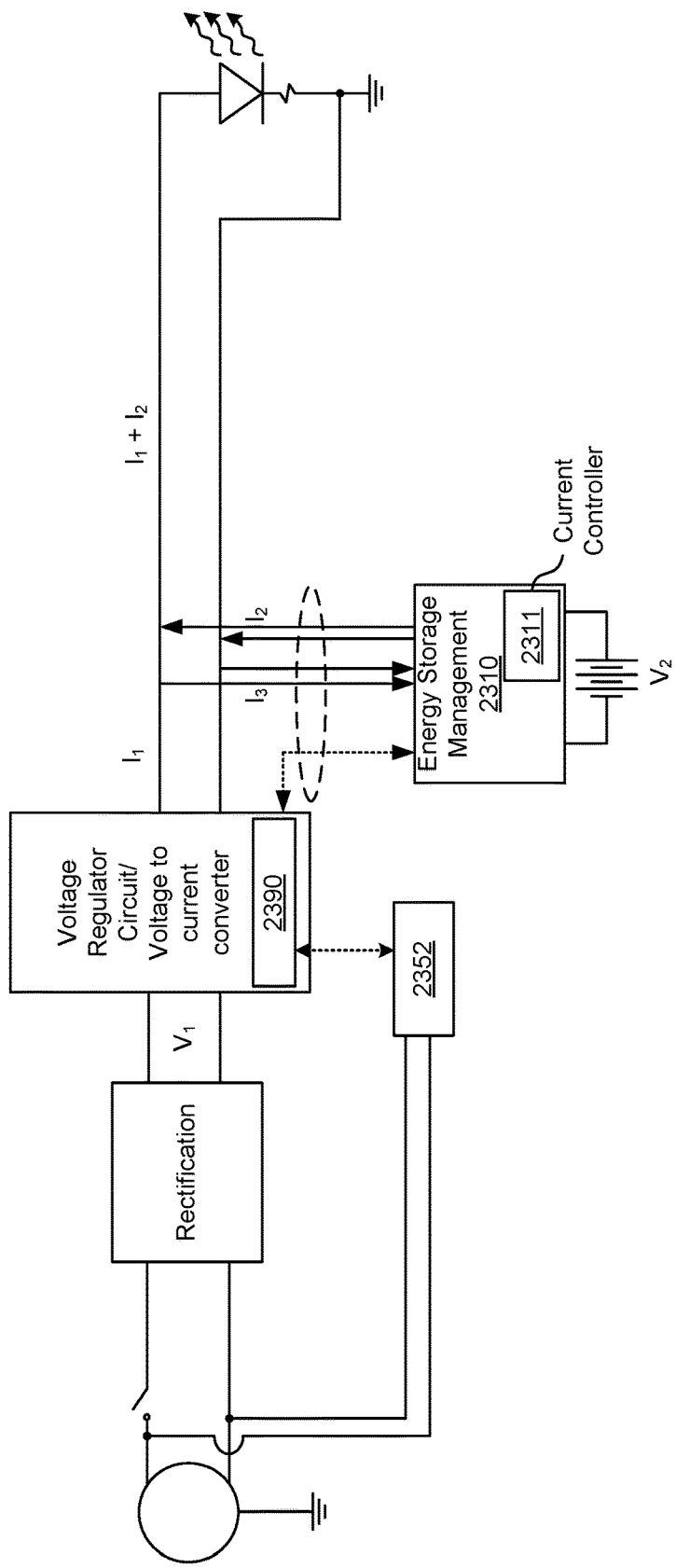
FIG. 23 illustrates another embodiment of a single-stage integrated dimming LED driver and battery backup system.

FIG. 23 illustrates another embodiment of a single-stage integrated dimming LED driver and battery backup system. This is a single-stage variation of FIG. 22, where the energy storage management system 2310 includes a current controller 2311 to generate a regulated current $I_2$.

Figure 24:
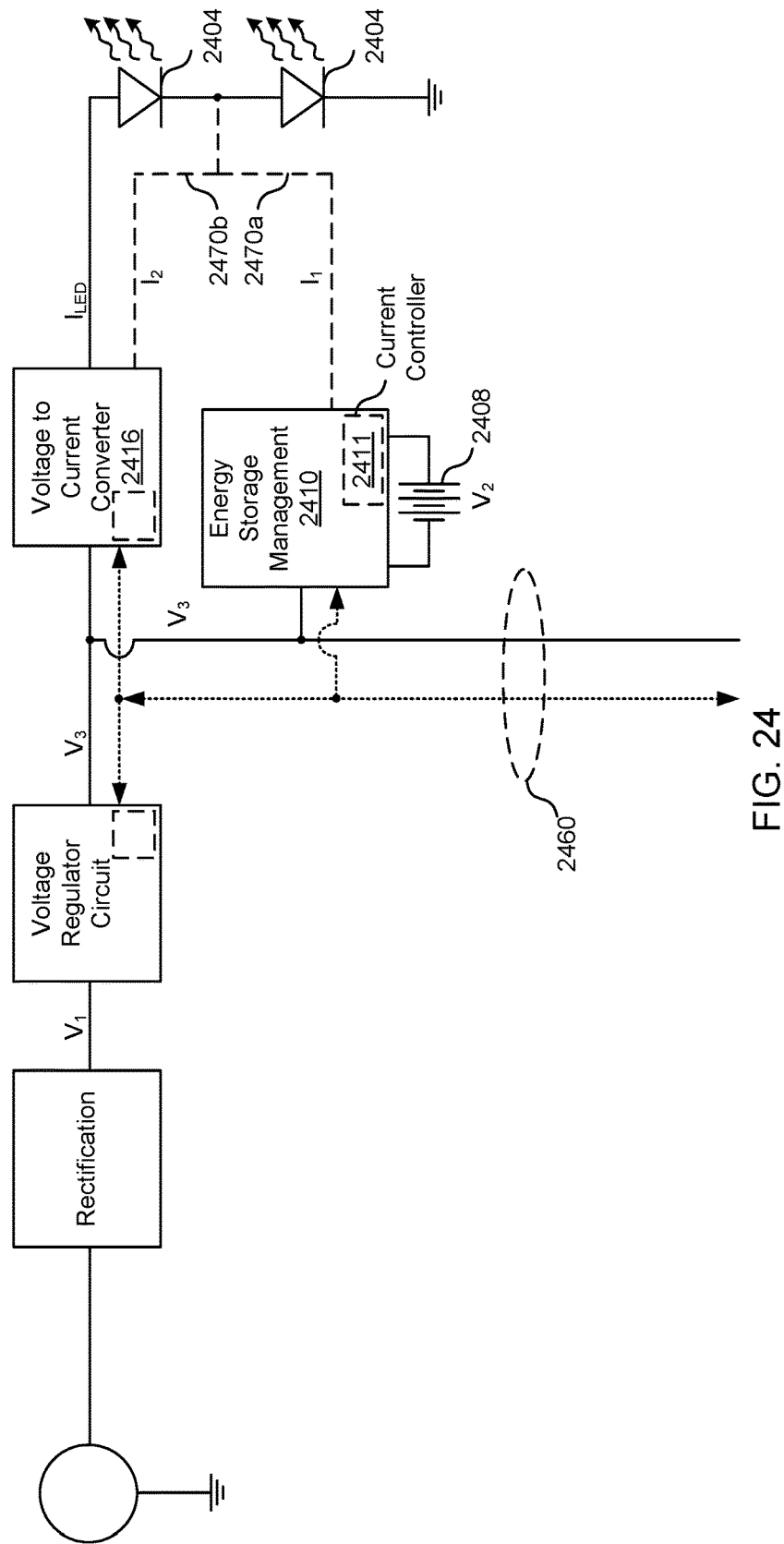
FIG. 24 illustrates another embodiment of a two-stage integrated dimming LED driver and battery backup system.

FIG. 24 illustrates another embodiment of a two-stage integrated dimming LED driver and battery backup system. In some instances, where emergency backup power is in use, system requirements may allow dimming of the LEDs in order to conserve backup power. This can either occur via reduction of the regulated LED current, $I_{LED}$, or via an optional secondary LED driving path 2470 that can power less than all of one or more LEDs 2404. For instance, where AC mains 2405 power is lost, the master controller 2490 may determine that fewer LEDs 2404 should be powered, thereby allowing the energy storage device 2408 charge to last longer, while providing dimmed, but acceptable lighting. As such, a secondary LED driving path 2470 may be routed in between two of the LEDs 2404. The illustration provides two alternative variations on the secondary LED driving path 2470. A first secondary LED driving path 2470a passes between the energy storage management system 2410 and a node between two of the LEDs 2404. A second secondary LED driving path 2470b passes from the voltage to current converter 2416 to the node between two of the LEDs 2404. Where the first secondary LED driving path 2470a is used, the energy storage management system 2410 can include a current controller 2411 for converting stored energy in the energy storage device 2408 into a first regulated current, $I_1$. Where the second secondary LED driving path 2470b is used, the energy storage management system voltage to current converter 2416 can include two outputs: a first regulated LED current output providing $I_{LED}$, and a second regulated current output providing $I_2$. Where the second secondary LED driving path 2470b is used, the energy storage management system 2410 can be implemented as described relative to earlier figures. Where the first secondary LED driving path 2470a is used, the energy storage management system 2410 can absorb energy from the bus 2460 and provide the first regulated current, $I_1$, via path 2470a, rather than provide output power back to the bus 2460. In other cases, the master controller 2090 may instruct the energy storage management system 2410 to provide output power via the path 2470a or the bus 2460 or a combination of the two.

Figure 25:
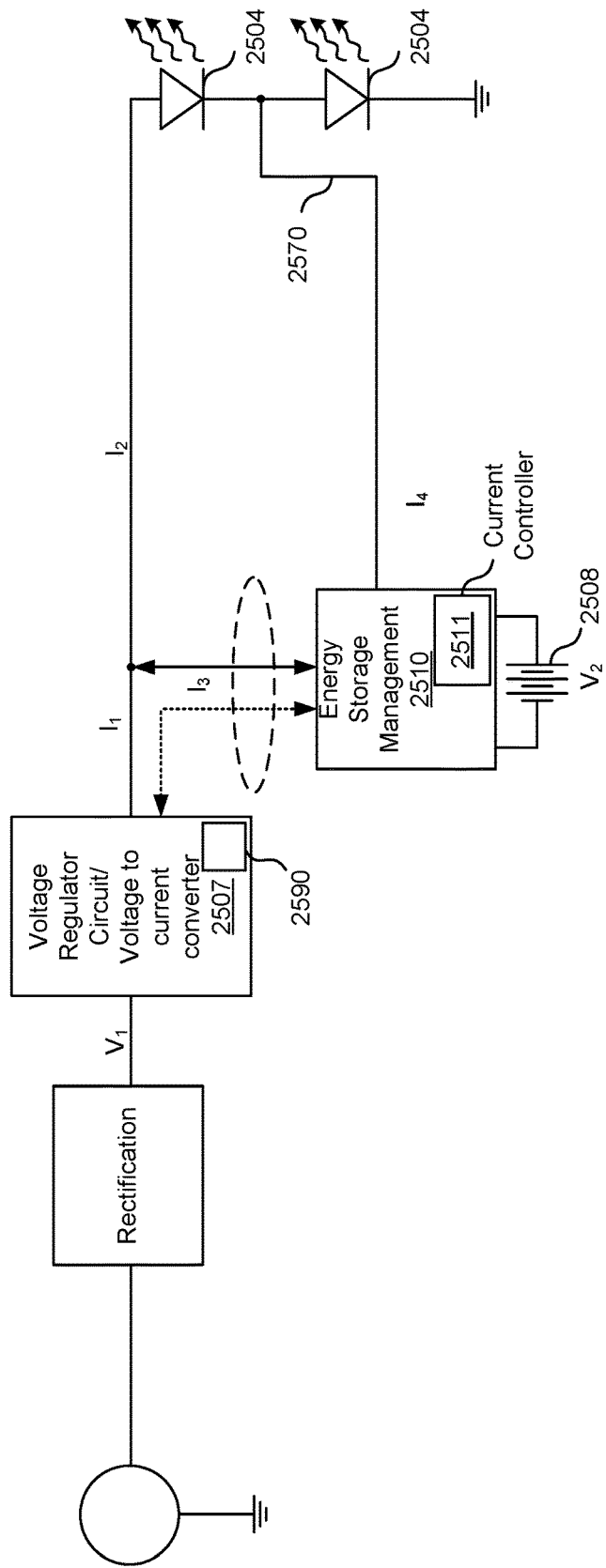
FIG. 25 illustrates another embodiment of a single-stage integrated dimming LED driver and battery backup system.

FIG. 25 illustrates another embodiment of a single-stage integrated dimming LED driver and battery backup system. This figure shows a single-stage variation of FIG. 24. Here, the voltage regulator circuit/voltage to current converter 2507 generates a first regulated current, $I_1$, from a rectified voltage, $V_1$, and this first regulated current, $I_1$, can be sent entirely to the two or more LEDs 2504 (e.g., $I_1=I_2$), or split between powering the two or more LEDs 2504 and charging the energy storage device 2508 (e.g., $I_1=I_2+I_3$). The stored energy in the energy storage device 2508 can be combined with $I_1$ to form $I_2$ in instances where AC mains 2505 power is available. Where AC mains 2505 power is lost, or in other situations where dimming of the two or more LEDs 2504 is acceptable, the master controller 2590 can instruct the energy storage management system 2510 to provide regulated current, $I_4$, to less than all of the two or more LEDs 2504 via secondary path 2570. The energy storage management system 2510 includes a current controller 2511 so that it can generate regulated currents.

Figure 26:
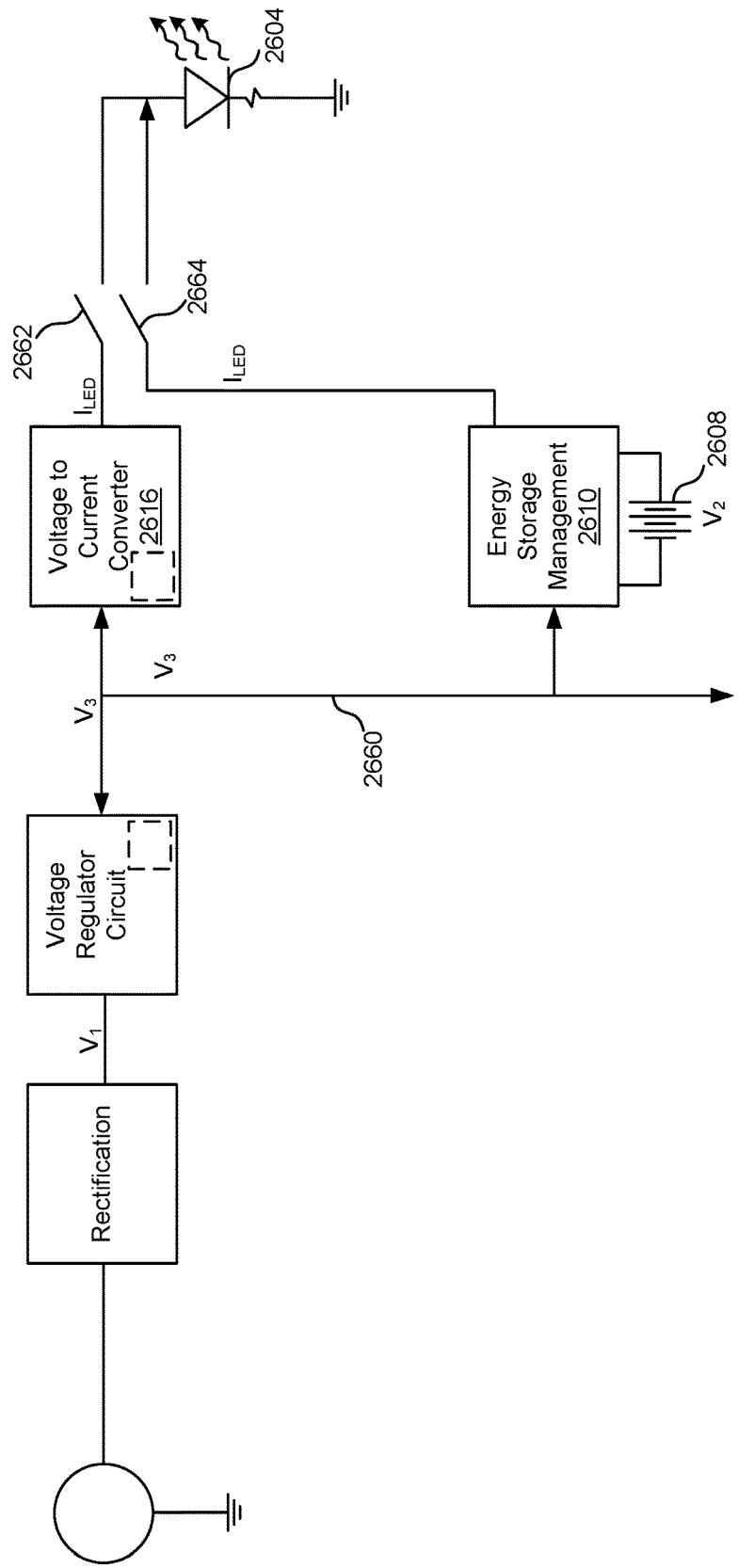
FIG. 26 illustrates another embodiment of a two-stage integrated dimming LED driver and battery backup system.

FIG. 26 illustrates another embodiment of a two-stage integrated dimming LED driver and battery backup system. Here, an energy storage management system 2610 can provide power to a bus 2660 and the voltage to current converter 2616 can convert a bus voltage, $V_3$, into first regulated LED current, $I_{LED}$, that can be used to drive one or more LEDs 2604 through a switch 2662 when closed. Alternatively, the energy storage management system 2610 can generate a second regulated LED current, $I_{LED}'$, that can be used to drive the one or more LEDs 2604 without first passing through the voltage to current converter 2616. This second regulated LED current, $I_{LED}'$, can pass through a second switch 2664 when closed. The master controller 2090 can control which of the two switches, 2662 and 2664, is closed, and thus passing regulated current, at a time.

Figure 27:
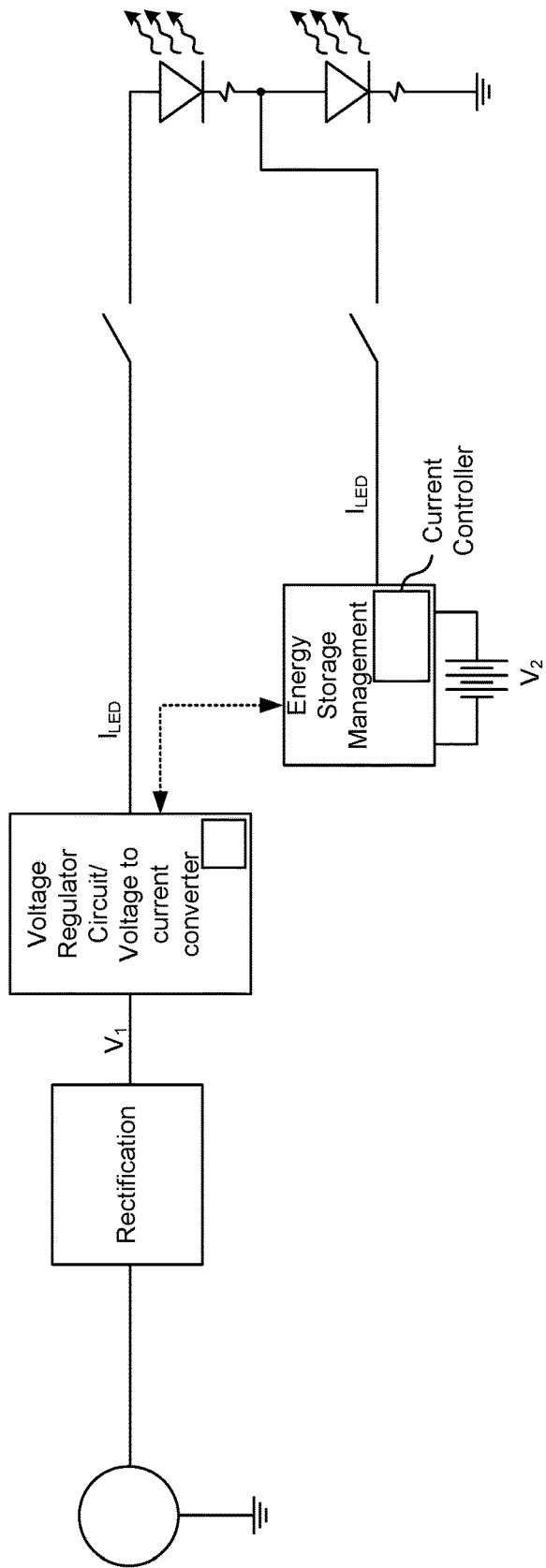
FIG. 27 illustrates another embodiment of a single-stage integrated dimming LED driver and battery backup system.

FIG. 27 illustrates another embodiment of a single-stage integrated dimming LED driver and battery backup system. This figure shows a single-stage variation of FIG. 26.

Figure 28:
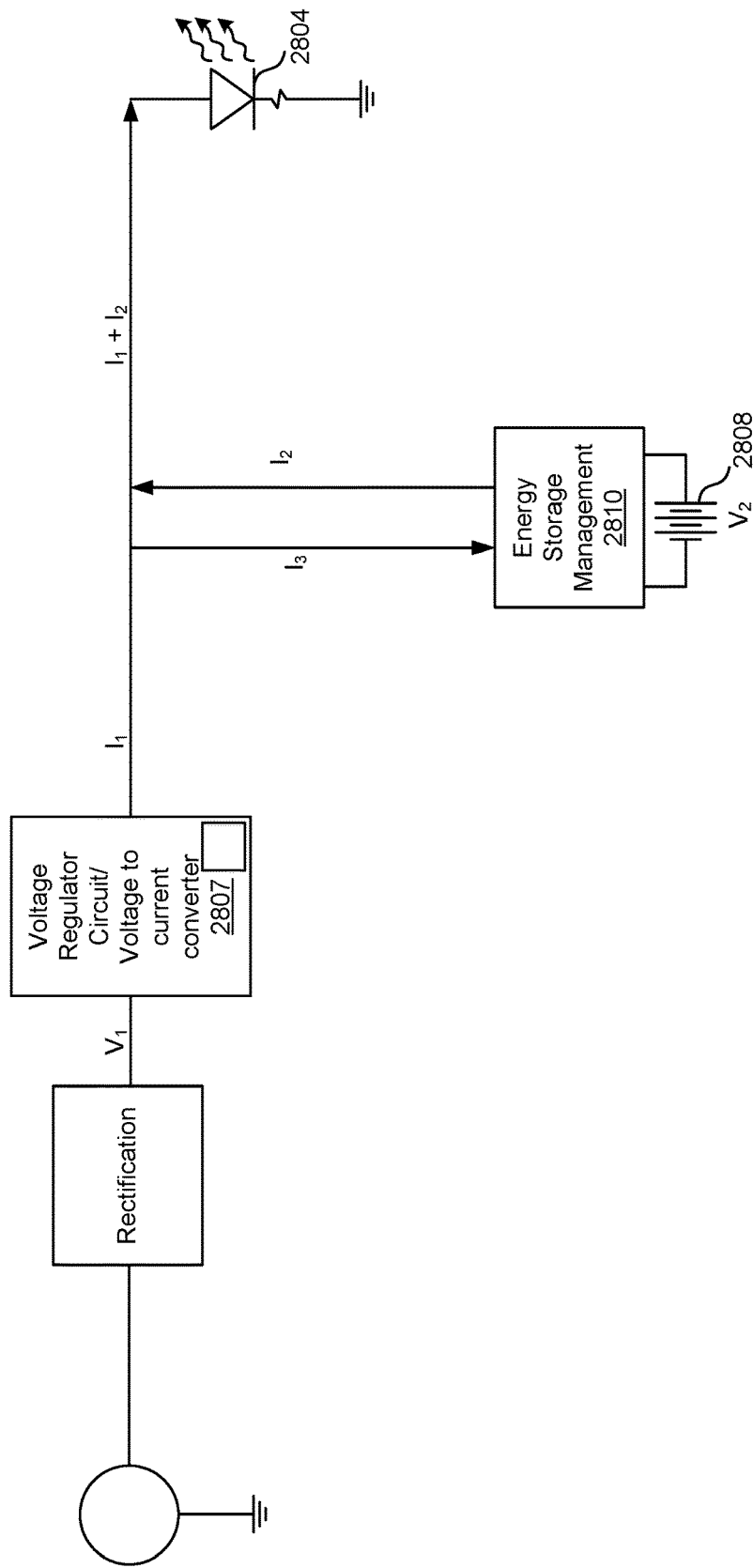
FIG. 28 illustrates another embodiment of a single-stage integrated dimming LED driver and battery backup system.

FIG. 28 illustrates another embodiment of a single-stage integrated dimming LED driver and power backup system.

Figure 29:
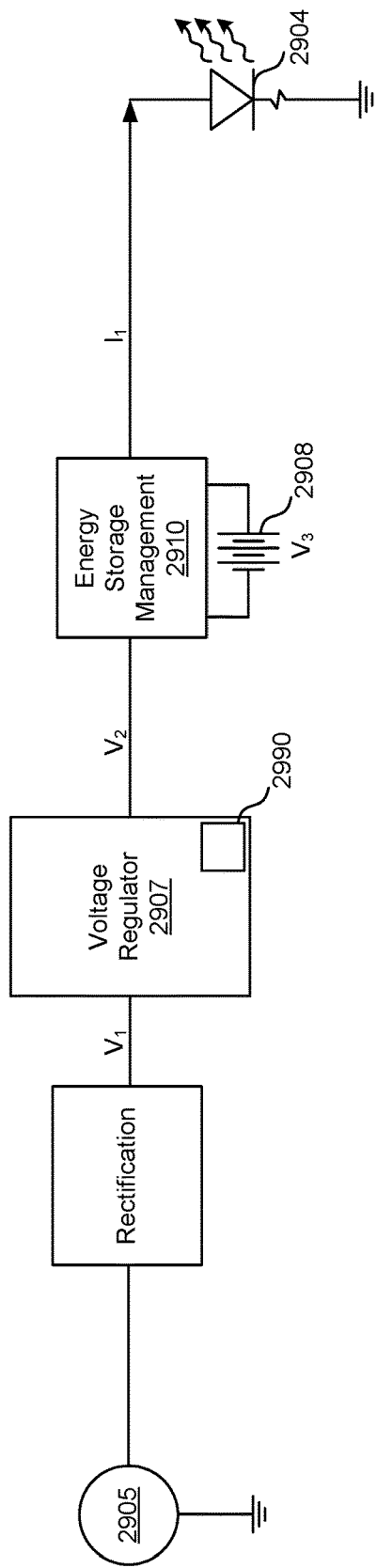
FIG. 29 illustrates another embodiment of a single-stage integrated dimming LED driver and battery backup system.

FIG. 29 illustrates another embodiment of a single-stage integrated dimming LED driver and battery backup system. Here, the energy storage management system 2910 is serially integrated between a voltage regulator 2907 and one or more LEDs 2904, as compared to previous embodiments, where a voltage regulator had a direct power connection to the one or more LEDs 2904. In this case, the energy storage management system 2910 can (1) receive regulated voltage, $V_2$, from the voltage regulator 2907 and convert this to a regulated LED current, $I_1$, (2) receive regulated voltage, $V_2$, from the voltage regulator 2907 and store the power in an energy storage device 2908, (3) receive regulated voltage, $V_2$, from the voltage regulator 2907 and convert part of this power to the regulated LED current, $I_1$, and use part of this power to charge the energy storage device 2908, (4) receive regulated voltage, $V_2$, from the voltage regulator 2907 and generate the regulated LED current, $I_1$, from both the regulated voltage, $V_2$, and energy stored in the energy storage device 2908, or (5) where no AC mains power is available, generate the regulated LED current, $I_1$, entirely from energy stored in the energy storage device 2908. All of these states, and any balancing that occurs within these states, can be controlled by a master controller 2990.

Figure 30:
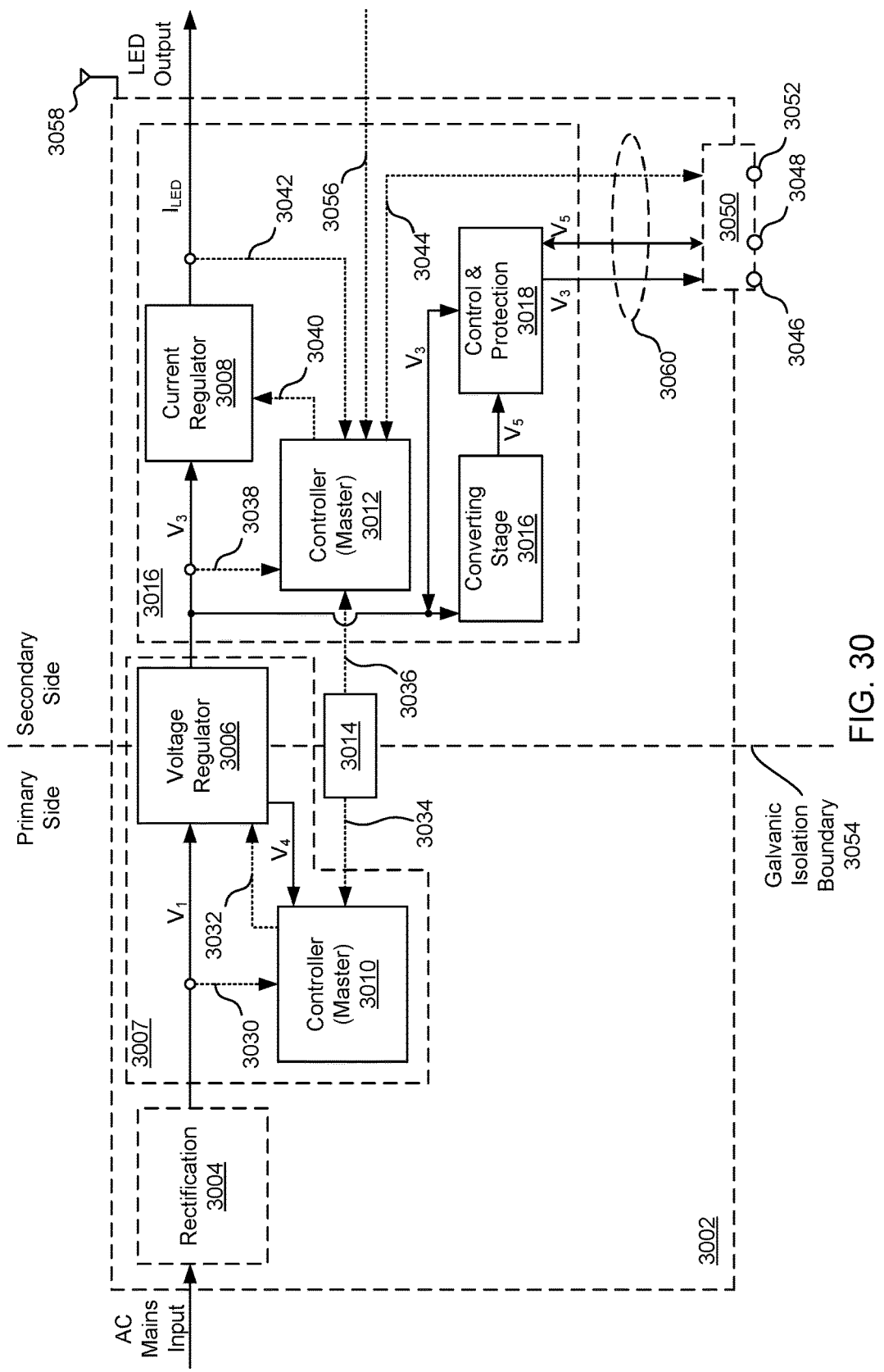
FIG. 30 in combination with either FIG. 31
Figure 31:
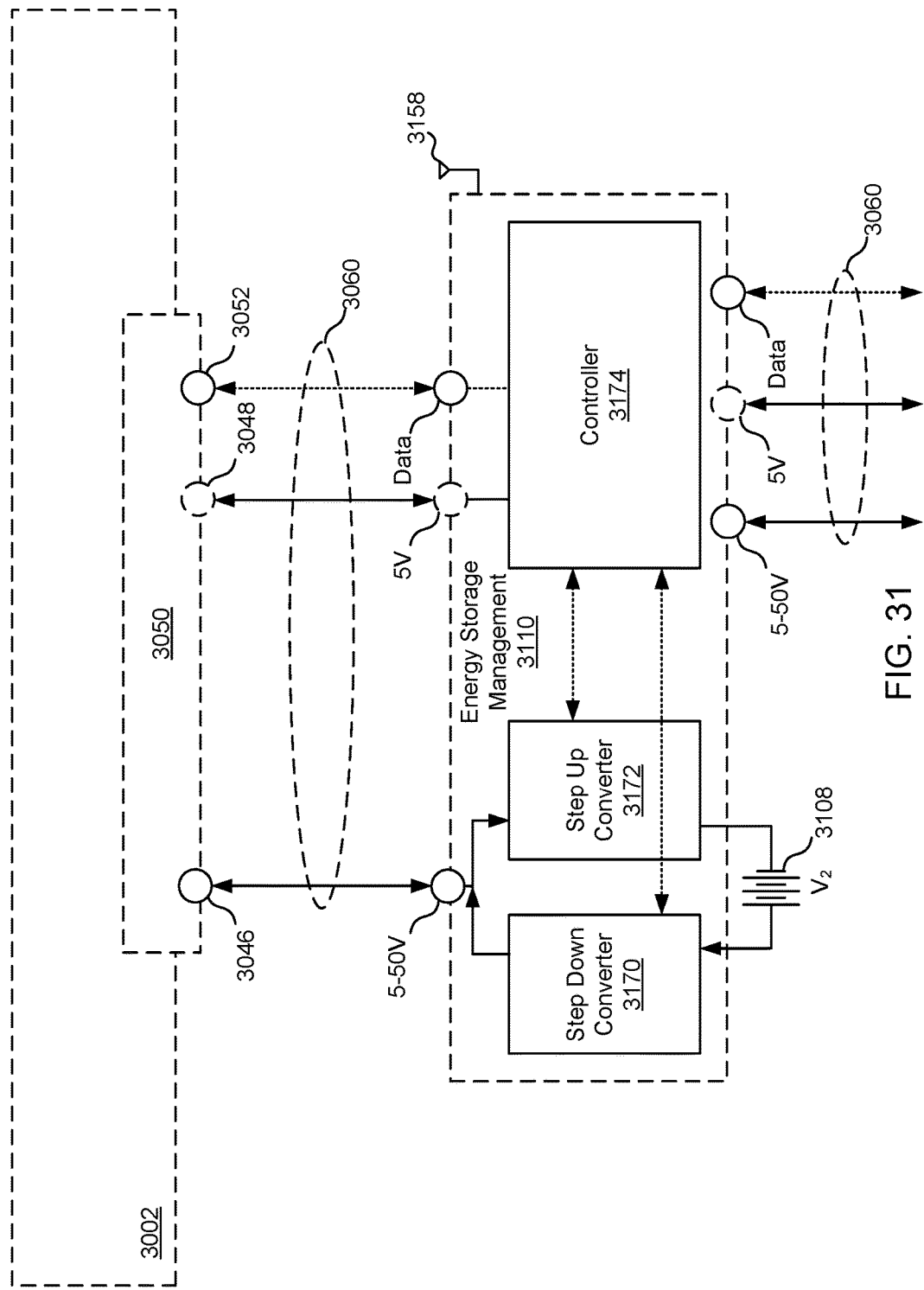
FIG. 31 shows further details of one embodiment of a control circuit.
Figure 32:
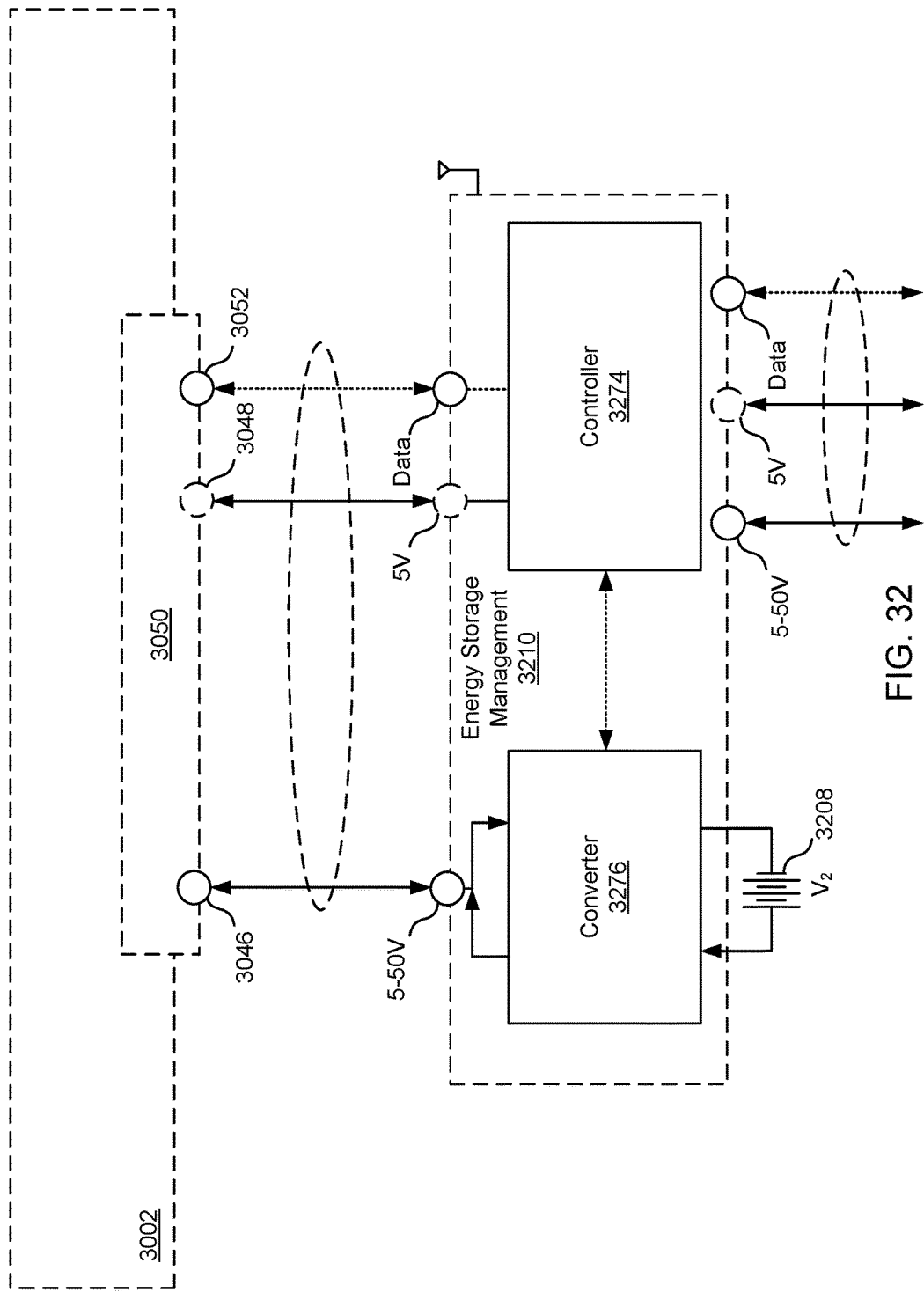
FIG. 32 illustrates a detailed view of an embodiment of a dual-stage integrated dimming LED driver and battery backup system.

FIG. 30 in combination with either FIG. 31 or FIG. 32 illustrates a detailed view of an embodiment of a dual-stage integrated dimming LED driver and battery backup system. An LED driver system 3002 can include an input from an AC mains that optionally is rectified by a rectification circuit 3004. In some instances, e.g., high power applications, the rectification circuit 3004 may not be needed. Rectified voltage, $V_1$, is received at a voltage regulator 3006, which is optionally part of a voltage regulator circuit 3007, such as the voltage regulator circuit 1607 and others described herein. The voltage regulator 3006, per instructions from a first controller 3010, that may be a master controller, converts the rectified voltage, $V_1$, to a regulated voltage, $V_3$, that is passed to a current regulator 3008 and also to a converting stage 3016 and a control and protection circuit 3018. The current regulator 3008 can, as controlled by a second controller 3012, generate a regulated LED current, $I_{LED}$, from the regulated voltage, $V_3$. The regulated LED current, ILEA, can be provided to an output of the system 3002 and used to drive one or more LEDs (not shown). The converting stage 3016 can buck or boost the regulated voltage, $V_3$, to a higher or lower voltage, $V_5$, or apply no conversion (e.g., $V_3=V_5$). For instance, the converting stage 3016 can downconvert the regulated voltage $V_3$, which can be called a high voltage, to a low voltage such as 5V, useful for powering common electronic accessories like wireless access points and temperature or motion sensors. The control and protection circuit 3018 can include circuits, logic, and/or processor executable code to protect the system 3002 against excessive current, voltage, and power on the bus 3060. The control and protection circuit 3018 can provide the high voltage or bus voltage, $V_3$, and the low voltage, $V_5$, to an optional port 3050. The current regulator 3008, the second controller 3012, the converting stage 3016, and the control and protection circuit 3018 can be optionally part of a voltage to current converter 3016, such as the voltage to current converter 1616 and others described herein. Along with a data channel 3044 from the second controller 3012 through the optional port 3050, the two power channels comprise a bus 3060. The optional port 3050 can connect this bus 3060 to accessories, such as the energy storage management system 3110 shown in FIG. 31, or the energy storage management system 3210 shown in FIG. 32.

The second controller 3012 can be the master controller where the first controller 3010 is not. The second controller 3012 can also sense the bus voltage, $V_3$, via sense channel 3038, and use this information to control the current regulator 3008. At the same time, this information can be passed to the first controller 3010. Where a galvanic isolation boundary 3054 is used, optionally passing through the voltage regulator 3006 such that the system 3002 has a primary and a secondary side, the information regarding bus voltage, $V_3$, can be passed across the galvanic isolation boundary 3054 via a non-contact transmission device 3014, such as an optical isolator, to the first controller 3010. The first controller 3010 can then use this feedback from the bus voltage, $V_3$, to control the voltage regulator 3006 (e.g., to regulate the output of the voltage regulator 3006). The second controller 3012 can regulate current based on feedback from its output, for instance via current sensing channel 3042. However, while both the first and second controllers 3010, 3012 use feedback to achieve a desired output, the desired output may be selected and controlled by a master controller, which may be the first or second controller 3010, 3012.

In FIG. 31, further details of one embodiment of an energy storage management system 3110, as described relative to various figures above, are described. The energy storage management system 3110 can include a step down converter 3170 (e.g., a buck converter) and a step up converter 3172 (e.g., a boost converter). The converters 3170 and 3172 can be connected to an energy storage device 3108 and can have circuitry for charging and discharging the energy storage device 3108. The energy storage management system 3110 can also include a controller 3174 that receives instructions from the master controller and controls the converters 3170, 3172. Importantly, the controller 3174 controls the step up and step down converters 3172, 3170. As such, the controller 3174 controls charging and discharging of the energy storage device 3108, and receives instructions from the master controller via the bus 3060. The controller 3174 also prevents the energy storage device 3108 from being depleted so much that health of the device 3108 would be unduly degraded. The energy storage management system 3110 charges the energy storage device 3108 via bus voltage, $V_3$, and discharges the energy storage device 3108 to provide bus voltage, $V_3$, or at least a portion of the bus voltage, $V_3$. It can be said that the master controller is in control of the bus 3060. The master controller also controls a balance of power drawn from the AC mains and the energy storage device 3108 and a balance of AC mains power used to drive the one or more LEDs and charge the energy storage device 3108.

The controller 3174 can also receive and send data via the bus 3060 and receive instructions from the master controller via the bus 3060. For instance, the controller 3174 can receive data via the bus 3060 indicating a state of the first controller 3010, a state of the second controller 3012, the bus voltage, $V_3$, and the regulated LED driving current. The controller 3174 can also receive data and instructions through an optional wireless network interface 3158 (e.g., demand response instructions from a utility company).

The controller 3174 can include circuitry for managing the energy storage device 3108, for instance monitoring a health of the energy storage device 3108, monitoring a charge level or voltage of the energy storage device 3108, and basing charging and discharging rates and charging and discharging modes on this monitoring. For instance, the charging mode may differ depending on the type of energy storage device 3108. The end goal, to absorb or discharge a certain power from or to the bus 3060 may be dictated by the master controller, but the specifics of achieving that goal (e.g., charging rate) may be controlled by the controller 3174.

The energy storage management system 3110 can include at least three inputs and optionally, a corresponding number of outputs. As illustrated, the energy storage management system 3110 includes a low voltage input and output, a high voltage input and output, and a data input and output. As such, the bus 3060 passes through the energy storage management system 3110 and can be accessed by other accessories that couple to the optional outputs of the energy storage management system 3110. In an embodiment, the controller 3174 can draw low voltage power from the low voltage channel of the bus 3060.

FIG. 32 illustrates a variation of the converters within the energy storage management system 3210, wherein both up and down conversion functionality is comprised within a single converter stage 3276.

The following discussion applies to the combination of FIGS. 30 and 31 or FIGS. 30 and 32. There are a number of states that the master controller can recognize, and instructions that it can provide to other components in the system based on these states. A first set of states assumes that the AC mains power is available to the 3002 system. This can be recognized either by a certain threshold voltage or power on the bus 3060 that the master controller recognizes as an indication of AC mains power, or via direct monitoring of the AC mains (e.g., see FIG. 22) or the rectified voltage, $V_1$, through sensing channel 3030 (which passes the rectified voltage, $V_1$, or an indication of the voltage, to the master controller via the bus 3060). Given, the AC mains is providing power, the master controller can decide to send all AC mains power to the one or more LEDs, send all AC mains power to charge the energy storage device 3108, 3208, split the AC mains power between driving the one or more LEDs and charging the energy storage device 3108, 3208, draw LED driving power from both the AC mains and the energy storage device 3108, 3208, or draw LED driving power exclusively from the energy storage device 3108, 3208.

A second set of states assumes that the AC mains power is not available (e.g., a power outage). The master controller can recognize this state by either seeing the bus voltage, $V_3$, fall below a threshold, via direct monitoring of the AC mains (e.g., see FIG. 22) or the rectified voltage, $V_1$ (e.g., through sensing channel 3030). Given, a lack of power from the AC mains, the master controller can decide to draw enough power from the energy storage device 3108, 3208 to keep the one or more LEDs operating at full luminosity, or draw less than this amount of power from the energy storage device 3108, 3208.

A third set of states assumes that a demand response instruction, or data triggering a demand response within the system 3002, is received by the system 3002 (e.g., a signal from a utility company via the wireless network interface 3158 instructing the system 3002 to reduce power). When this occurs, the master controller can decrease power draw from the AC mains and increase power draw from the energy storage device 3108, 3208.

Returning to the first set of states, where AC mains power is available, we first address the state where the master controller derives all LED driving power from the AC mains, and there is no draw from the energy storage device 3108, 3208 (State 1:1). Here the master controller instructs the first controller 3010 to control the voltage regulator 3006 to maintain a bus voltage, $V_3$, that is greater than a voltage needed to keep the one or more LEDs lit (e.g., for 12V LEDs, $V_3 > 12V$). The master controller also instructs the second controller 3012 to control the current regulator 3008 to convert the bus voltage, $V_3$, into a maximum regulated LED current, $I_{LED}$, as allowed by any dimming signals (not shown). These instructions can be sent via the bus 3060 to the controller 3012 and from there to the controller 3010 where data passage along data channels 3036, 3034, and passage through the non-contact transmission device 3014 can be considered to also be on the bus 3060.

We next address a state where all AC mains power is directed to charging the energy storage device 3108, 3208 and no AC mains or energy storage device 3108, 3208 power is used to light the one or more LEDs (State 1:2). Here, the master controller may direct the second controller 3012 to control the current regulator 3008 to stop drawing power from the bus 3060. It may instruct the first controller 3010 to continue generating the bus voltage, $V_3$, at the same voltage as at a previous time, or at a higher or lower voltage. For instance, since power is not being sent to the current regulator 3008, increased bus voltage, $V_3$, will not lead to increased waste in the current regulator 3008, but an increased bus voltage, $V_3$, may allow faster charging or an increased charge to be placed on the energy storage device 3108, 3208. Such a situation may arise, where the one or more LEDs do not need to be lit throughout the day, and where electricity costs are lower during periods when the one or more LEDs need not be lit. Accordingly, the energy storage device 3108, 3208 can be charged during periods when electricity prices are lower. Further, the rate of charging may be increased in order to maximize the amount of charging that can occur during a limited window of low electricity prices. The master controller can instruct the controller 3714 to have the step up converter 3172, or the controller 3274 to have the converter 3276 draw power from the bus 3060 and charge the energy storage device 3108, 3208. The master controller can instruct the controller 3174 to have step up converter 3172 or the controller 274 to have the converter 3276 upconvert or boost the bus voltage, $V_3$, so as to charge the energy storage device 3108, 3208 faster or to a higher voltage, $V_2$. The master controller can also instruct the controller 3174 to have the step up converter 3172 or controller 3274 to have the converter 3276 charge the energy storage device 3108, 3208 without conversion (i.e., at the bus voltage, $V_3$). In some instances, the inputs and outputs of the step up converter 3172 and the step down converter 3170 can be reversed, and the master controller can instruct the controller 3174 to have the step down converter 3170 draw power from the bus 3060, and charge the energy storage device 3108 with or to a voltage, $V_2$, lower than the bus voltage, $V_3$. In some cases, the master controller may instruct the controller 3174 and hence the step up converter 3172, or the controller 3274 and hence the converter 3276, to draw more or less current, or more or less power, from the bus 3060 in order to charge the energy storage device 3108, 3208 according to different goals.

Next we consider a state where the AC mains power is split between charging the energy storage device 3108, 3208 and powering the one or more LEDs (State 1:3). Here, the master controller can query the first controller 3010 to determine how much power the voltage regulator 3006 is making available on the bus 3060. It can also query the second controller 3012 to determine how much power the current regulator 3008 is drawing from the bus 3060 to drive the one or more LEDs. Given the power available, and the power being drawn, the master controller can select to use any remaining power on the bus 3060 to charge the energy storage device 3108, 3208. Or, it can use less than the remaining power to charge the energy storage device 3108, 3208. Either way, the master controller can instruct the controller 3174 and hence the step up converter 3172, or the controller 3274 and hence the converter 3276, to draw power from the bus 3060 and charge the energy storage device 3108, 3208. The master controller can instruct the controller 3174 and hence the step up converter 3172, or the controller 3274 and hence the converter 3276, to upconvert or boost the bus voltage, $V_3$, so as to charge the energy storage device 3108, 3208 faster or to a higher voltage, $V_2$. The master controller can also instruct the controller 3174 and hence the step up converter 3172, or the controller 3274 and hence the converter 3276, to charge the energy storage device 3108, 3208 without conversion (i.e., at the bus voltage, $V_3$). In some instances, the inputs and outputs of the step up converter 3172 and the step down converter 3170 can be reversed, and the master controller can instruct the controller 3174, and hence the step down converter 3170, to draw power from the bus 3060, and charge the energy storage device 3108 with or to a voltage, $V_2$, lower than the bus voltage, $V_3$. In some cases, the master controller may instruct the controller 3174 and hence the step up converter 3172, or the controller 3274 and hence the converter 3276, to draw more or less current, or more or less power, from the bus 3060 in order to charge the energy storage device 3108, 3208 according to different goals. In other situations, and given the supply and demand for power on the bus 3060, the master controller may instruct the second controller 3012 to reduce the power draw of the current regulator 3008. At the same time, the master controller may instruct the controller 3174 and hence the step up converter 3172, or the controller 3274 and hence the converter 3276, to draw more power from the bus 3060 in proportion to the decreased draw from the current regulator 3008.

We now consider a state where the one or more LEDs draw power from both the AC mains and the energy storage device 3108, 3208 (State 1:4). Here, the master controller can query the first controller 3010 to determine how much power the voltage regulator 3006 is making available on the bus 3060. It can also query the second controller 3012 to determine how much power the current regulator 3008 is drawing from the bus 3060 to drive the one or more LEDs. Given the power available, and the power being drawn, the master controller can instruct the first controller 3010 to scale back its output, and instruct the controller 3174, and hence the step up converter 3710, or the controller 3274, and hence the converter 3176, to begin or increase output to the bus 3060 derived from the energy storage device 3108, 3208. Alternatively, the master controller may determine that the voltage regulator 3006 is not producing enough power to keep the one or more LEDs lit to a desired luminosity, and may therefore instruct the controller 3174, 3274 to add power to the bus 3060 from the energy storage device 3108, 3208. In another instance, the master controller, detecting a drop in the luminosity output via optical sensor channel 3056, may select to increase power on the bus 3060 by instructing the controller 3174, 3274 to discharge the energy storage device 3108, 3208.

In the second set of states, where AC mains power is not available, a first of these states sees the one or more LEDs drawing full power from the energy storage device 3108, 3208, and no power from the AC mains (State 2:1). Here, the master controller may monitor the bus voltage, $V_3$, the regulated voltage, $V_1$, or the AC mains input, and thereby determine that a loss of AC mains power has occurred. In response, the master controller may instruct the first controller 3010 and thereby the voltage regulator 3006 to turn off, which may or may not be necessary depending on the voltage regulator 3006 topology. The master controller may maintain the current regulator 3008 at a pre-power-loss state, and instruct the controller 3174, and hence the step down converter 3170, or the controller 3274, and hence the converter 3277, to provide sufficient power to the bus 3060 to keep the one or more LEDs at full luminosity.

In a second of these states, the one or more LEDs can draw less than full power from the energy storage device 3108, 3208, and no power from the AC mains (State 2:2). The master controller may instruct the second controller 3012 to have the current regulator 3008 reduce current output, which may lead to dimming of the one or more LEDs, to allow the power in the energy storage device 3108, 3208 to last longer during the AC mains outage. In this case, the master controller could instruct the controller 3174, and hence the step down converter 3170, or the controller 3274, and hence the converter 3176, to provide the same bus voltage, $V_3$, but less current than was seen on the bus 3060 before the AC mains power loss.

Returning to the third set of states, where a demand response situation is encountered (e.g., a utility requests that power be reduced, or the cost of electricity is at a high enough level that drawing at least some power from the energy storage device can lead to cost savings), the one or more LEDs can draw power from a combination of the AC mains and the energy storage device 3108, 3208 (State 3:1). This state has similar characteristics to State 1:4 above, where the one or more LEDs are driven by a combination of AC mains power and charge from the energy storage device 3108, 3208. However, here an indication or instruction received via a wireless network interface (e.g., 3058 or 3158) triggers the start or increase in power drawn from the energy storage device 3108, 3208.

In a second of these states, the one or more LEDs can draw power solely from the energy storage device 3108, 3208 (State 3:2). In either State 3:1 or 3:2, the master controller can dictate the power flow and sourcing.

The third set of states can further be understood with reference to FIG. 12. The top of the chart illustrates an exemplary time-of-day cost of electricity from an electrical utility. At night the cost is relatively low owing to reduced demand, but increases during the day as the load on the electrical grid increases, reaching a peak in demand during the middle of the day. This peak owes to such factors as air conditioning. The system 3002 can reduce the cost to the consumer by offsetting power drawn from the power grid with power drawn from the energy storage device 3108, 3208 (e.g., a backup battery). This may be accomplished in at least two ways. In the first case, the master controller can receive a command via either wireless network interface 3058, 3158 from the electrical utility indicating a change in the cost of electricity, a required decrease in energy usage, or other information. In response, the master controller can instruct the current regulator 3008 to reduce its output, regulated LED current, $I_{LED}$, and thereby reduce power draw from the AC mains. The response in terms of light output is shown in the lower part of the chart by the dashed line 1206. The lower cost is indicated by the upper of the two dashed lines 1202 in the upper part of the chart.

To avoid a decrease in light output (e.g., line 1206), the master controller can offset the decrease in AC mains power with power drawn from that stored in the energy storage device 3108, 3208. In particular, the master controller can instruct the controller 3174, and hence the step down converter 3170, or the controller 3274, and hence the converter 3276, to provide power from the energy storage device 3108, 3208 to the bus 3060. In some embodiments, the step up converter 3172 in FIG. 31 can be used to discharge the energy storage device 3108 into the bus 3060. Typically, the step down converter 3170 or converter 3276 provides a regulated voltage output equal to the bus voltage, $V_3$, and allows the current output to the bus 3060 to vary in order to meet a draw needed by the current regulator 3008 to keep the one or more LEDs at a maximum desired luminosity. The solid line 1208 in the lower chart of FIG. 12 also shows the light output when a combination of AC mains power and power from the energy storage device 3108, 3208 are used in combination to drive the one or more LEDs.

This feature can be referred to as "battery assist." Battery assist, can generate (1) a constant luminosity output (line 1208), or (2) a reduction in the cost of power (line 1204), where even greater dimming is used in combination with power from the energy storage device 3108, 3208.

The controller 3010 may rely on data from the voltage sensing channel 3038 as feedback to regulate the output of the voltage regulator 3006, while the controller 3012 may rely on data from the current sensing channel 3042 as feedback to regulate the output of the current regulator 3008. However, other sources of feedback are also possible.

The system 3002 is drawn using a dashed line since sometimes components within the system 3002 may be arranged outside the system 3002. In other words various packaging variations for the system 3002 can be implemented without departing from the spirit and intent of this disclosure. In practice, the locations and couplings of the various components and subsystems illustrated in FIG. 30 can vary from the specifics shown in FIG. 30. For instance, the system 3002 can couple to the energy storage management system 3110 via the optional port 3050, directly couple to the energy storage management system 3110, or the energy storage management system 3110 can be part of the system 3002.

Rectification circuit 3004 is an optional circuit, and in some high power applications, a power factor correction topology for the voltage regulator 3006 may avoid the need for rectification prior to the voltage regulator 3006. In some embodiments, the rectification 3004 can occur after the voltage regulator 3006.

The voltage regulator 3006 includes circuitry that receives rectified voltage, $V_1$ at an input, and downconverts this to a regulated or bus voltage, $V_3$, at an output. Typically, the bus voltage, $V_3$, is equal to or greater than an LED voltage, $V_{LED}$—is sufficient to keep the one or more LEDs lit. $V_{LED}$ is specific to each set of LEDs, but 12V, 24V, and 50 are some common LED voltages. The voltage regulator 3006 can also generate a low voltage, $V_4$, and provide for powering the first the controller 3010. The voltage regulator 3006 can adjust the bus voltage, $V_3$, as dictated by control signals from the first controller 3010. The voltage regulator 3006 can include circuitry or control to enable power factor correction (PFC). In some embodiments, the voltage regulator 3006 may include a switch-mode power supply. In some embodiments, the voltage regulator 3006 may include one or more switches, and a duty cycle of these switches, as controlled by instructions or signals from the controller 3010, govern the bus voltage, $V_3$. Embodiments of details of the voltage regulator 3006 can be seen and are described relative to FIGS. 34 and 35.

The first controller 3010 can receive instructions and signals from the master controller, which may be the first controller 3010 or the second controller 3012, and can control an output of the voltage regulator 3006 in response. The first controller 3010 can use feedback from a rectified voltage channel 3030 and/or the bus voltage channel 3038 to control an output of the voltage regulator 3006. The first controller 3010 can also pass information about the rectified voltage, $V_1$, and raw information from the rectified voltage sensing channel 3030 to the master controller via the bus 3060 or via internal channels of the first controller 3010.

The current regulator 3008 receives the bus voltage, $V_3$, at an input and from this generates a regulated LED current, $I_{LED}$, at an output. The second controller 3012 can pass instructions or controls signals to the current regulator 3008 to control the regulated LED current, $I_{LED}$. The second controller 3012 can monitor the regulated LED current, $I_{LED}$, via a regulated current sensing channel 3042. The second controller 3012 can pass instructions or control signals to the current regulator 3008 via a control channel 3040. The second controller 3012 can also receive indications of the bus voltage, $V_3$, via a bus voltage channel 3038, and either use this data or pass it along to the first controller 3010 or the master controller 3174 via the data channel 3044 of the bus 3060.

Although the controllers 3010 and 3012 are described and illustrated as controlling regulated voltage and current devices, respectively, in some embodiments, they may control current controlled devices, voltage controlled devices, power controlled devices, or devices that have characteristics of some mixture of current, voltage, and power regulation. Further, each controller 3010 and 3012 has the ability to select between these different modes.

In an optional embodiment, the voltage regulator circuits described earlier can be embodied by optional voltage regulator circuit 3007, comprising the voltage regulator 3006 controlled by the first controller 3010. In some embodiments, the voltage to current converters described earlier can be embodied by optional current regulator circuit 3016, comprising the current regulator 3008, the second controller 3012, the converting stage 3016, and the protection and control 3018.

The converting stage 3016 can be coupled to the bus 3060, access the bus voltage, $V_3$, and can be up or down converting. The converting stage 3016 can buck or downconvert the bus voltage, $V_3$, to a low voltage, $V_5$, at an output of the converting stage 3016. The low voltage, $V_5$, may or may not be different from the low voltage, $V_4$, generated by the voltage controller 3006. The low voltage, $V_5$, can be useful for driving any number of electronics and controllers. For instance, the low voltage, $V_5$, can be used to power the second controller 3012. The low voltage, $V_5$, can also be provided to a low voltage channel of the bus 3060, and thereby passed to the energy storage management system 3110 and any accessories on the bus 3060. For instance, the low voltage, $V_5$, can be used to power the master controller 3174. The converting stage 3016 can have a buck topology. In embodiments, where the LED voltage, $V_{LED}$, is lower than a voltage that is useful for powering accessories, (e.g., $V_{LED}<5V$), the converting stage 3016 can upconvert the bus voltage, $V_3$, to a higher voltage, such as $V_5=5V$.

The control and protection circuit 3018 can include circuits, logic, and or processor executable code for short circuit, overcurrent, and overvoltage protection. Any one or more of these protections can be provided to the system 3002 in the event that a short circuit or other electrical transient occurs external to the optional port 3050 or at the optional port 3050. For instance, if an accessory plugged into the bus 3060 via the optional portion 3050 fails and short circuits, there is a desire to prevent this short circuit from causing damaging current within the system 3002. Such internal damage could cause the one or more LEDs to go out, which is highly undesirable and possibly presents code violations where the lights are required for emergency lighting. The control and protection circuit 3018 can include one or more shunt circuits to divert excess power away from sensitive circuits/components of the system 3002. Circuits and components to prevent static discharges from outside the system 3002 from affecting components within the system 3002 or electronic discharge protection (e.g., a Zener diode), may be included. The first and second controllers 3010, 3012 may include control and protection circuitry to prevent excessive current, voltage, or power from being discharged from their outputs and to prevent the same from entering their outputs in the reverse. Those of skill in the lighting arts likely would determine that such protection was sufficient and thus not consider the influences of accessories on the system 3002. Thus, the control and protection 3018 represents a novel and nonobvious addition to the system 3002 that protects against electrical discharge sources that are not typically encountered in the lighting arts.

Some electronics regulations require a galvanic isolation boundary 3054 to protect users from high voltages. Here, the galvanic isolation boundary passes through the voltage regulator 3006. In order to pass data and instructions across this boundary, a non-contact transmission device 3014 straddles the boundary. An optical isolator is one example of the non-contact transmission device 3014.

Sensing channels 3030, 3038, and 3042 can be leads going to sensors that are remote from the lines being monitored, or can provide data to controllers from sensors that are affixed to or relatively close to the lines being monitored. In FIG. 30 no visualization of the sensors is provided, as their location along the sensing channels 3030, 3038, and 3042 can be varied without departing from the scope of the disclosure.

Control channels 3032 and 3040 are illustrated as passing from controllers to regulators. However, these are functional representations only, not physical circuit representations. As such, these control channels 3032 and 3040 can be implemented in a variety of fashions. In some cases, wireless connections can be used (e.g., radio or optical), while in others, the controllers and regulators can be integrated such that no external leads pass between distinct components.

The system 3002 or the optional port 3050 can include at least three I/Os: a high voltage I/O 3046 (e.g., 5-50V), a low voltage I/O 3048 (e.g., 5V), and a data I/O 3052. These three I/Os can be part of the bus 3060. While the optional port 3050 is here shown with three channels, the optional port 3050 and the corresponding bus 3060 can also have two channels. However, these channels can be implemented with any number of physical arrangement of leads, wires, or electrical connections. For instance, a power channel and a data channel could be implemented on a single physical lead where the data was superimposed on the power signal. At the same time, a second physical lead may be needed to conduct the ground signal for the power lead. Alternatively, a power channel can be implemented as one, two, three, or more physical leads each carrying one or more different voltages (e.g., one carrying high and one carrying low voltage).

Figure 33:
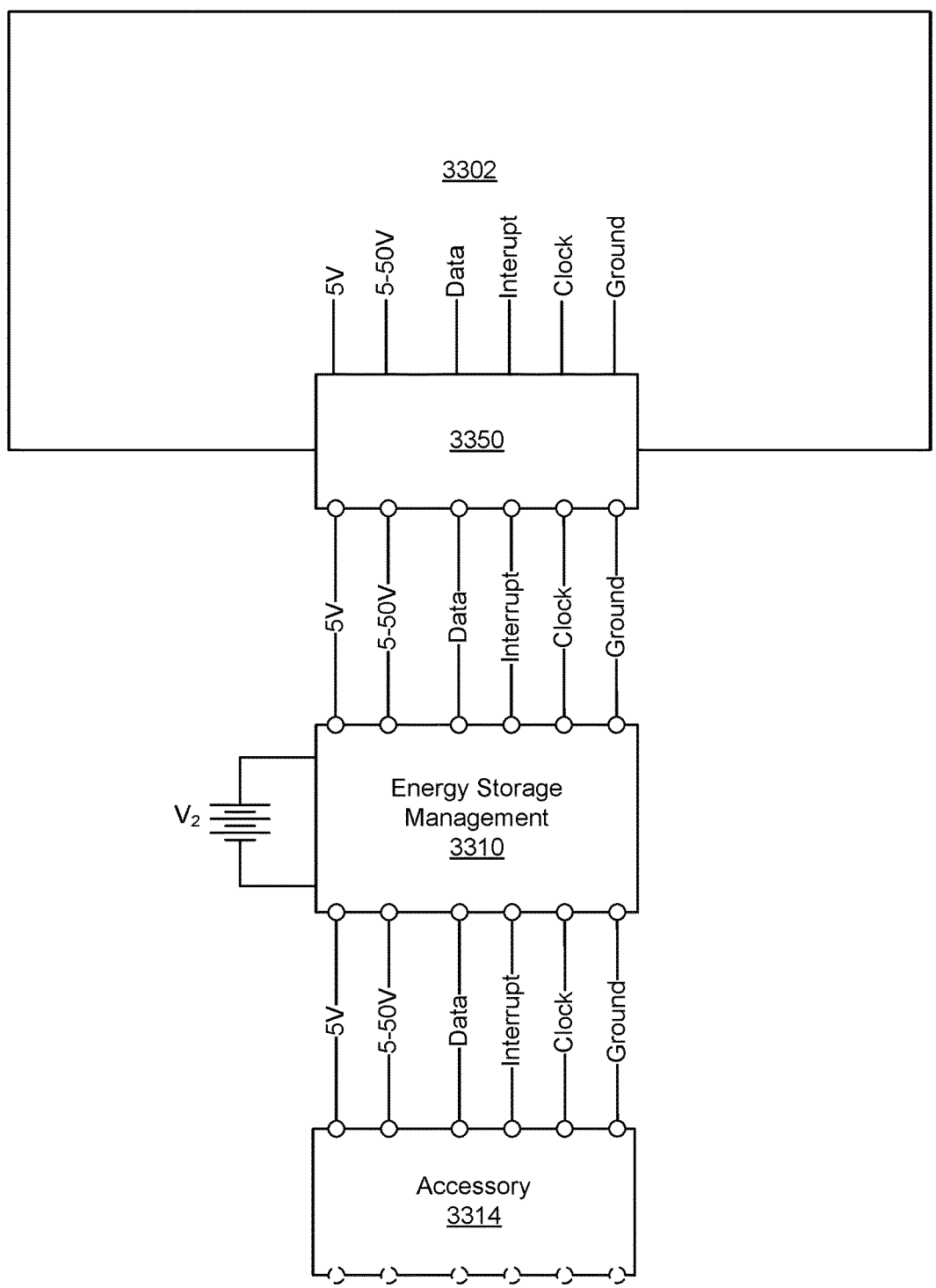
FIG. 33 illustrates one exemplary embodiment of the bus and control circuit. In this example, the bus comprises six channels: low voltage, high voltage, data, interrupt, clock, and ground.

FIG. 33 illustrates one exemplary embodiment of the bus and energy storage management system. In this example, the bus comprises six channels: low voltage (e.g., 5V), high voltage (e.g., 5V-50V), data, interrupt, clock, and ground. The optional port 3350 provides an interface between the system 3302 and regions of the bus external to the system 3302. However, in other embodiments, the port 3350 may not be needed, where the energy storage management system 3310 is part of the system 3302. The energy storage management system 3310 may include I/Os for the bus to continue on to an accessory 3314 (e.g., a WiFi access point, an environmental sensor, etc.).

Returning to FIGS. 30-32, the optical sensor channel 3056 carries data from an optical sensor. The optical sensor can be arranged to measure a luminosity output of the one or more LEDs, and can be arranged internal or external to the system 3002. While the optical sensor channel 3056 is shown in FIG. 30 as passing to the second controller 3012, which may be the master controller, alternatively, the second controller 3012 can pass data from the optical sensor channel 3056 to the first sensors 3010 via the bus 3060, where the first controller 3010 is the master controller. The optical sensor channel 3056 can also pass directly to the first controller 3010 in other embodiments.

The system 3014 can include a wireless network interface 3058, such as a WIFI, BLUETOOTH, or ENOCEAN wireless network interface, to name three non-limiting examples. The wireless network interface 3058 can be coupled to the system 3014 and provide direct access to wireless reception and transmission for either or both of the first and second controllers 3010, 3012. Alternatively, the wireless network interface 3158 can be coupled to the energy storage management system 3110.

The bus 3060 is shown as having three channels, although these can be implemented in various physical configurations. For instance, two power lines and a single data line could be implemented, or two power lines, where the data channel was superimposed on one of the power lines. The bus 3060 can include power and data connections between the system 3002 and the energy storage management system 3110, although in other cases the bus 3060 can provide power and data connections between the first controller 3010, the second controller 3012, and the controller 3174m 3274 without regard to where or what the system 3002 and the energy storage management system 3110 are. The bus 3060 can also include power and data connections to one or more accessories beyond the energy storage management system 3110.

The energy storage management system 3110 can include circuits for charging and discharging the energy storage device 3108 as well as for monitoring and controlling other aspects of the system. For instance, the energy storage management system 3110 can include a controller 3174 for monitoring charging, discharging, type, and health of the energy storage device 3108. The energy storage management system 3210 can work with a converter 3276, the energy storage management system 3110 can work with a pair of converters 3170, 3172 to charge and discharge the energy storage device 3108. The energy storage management system 3110 may include the energy storage device 3108, although the energy storage device 3108 may alternatively be external to and configured for coupling to the energy storage management system 3110. The energy storage management system 3110 can include I/Os for coupling to the bus 3060, and can include I/Os for extending the bus 3060 to other accessories. While the energy storage management system 3110 is shown as having three I/Os for coupling to the system 3002, and three I/Os for coupling to another accessory, in some cases, three I/Os can perform both functions.

The step down converter 3170, can have a buck topology, as one example, or any downconverting topology. In some cases, the step down converter 3170 has a single input and output, while in others, the input and output can be configured by the master controller 3174 (e.g., where the energy storage management system 3110 needs to decrease a voltage of power from the bus 3060 being used to charge the energy storage device 3108). Similarly, the step up converter 3172 can have a boost topology, as one example, or any upconverting topology. In some cases the step up converter 3172 has a single input and output, while in others, the input and output can be configured by the master controller 3174 (e.g., where power provided to the bus 3060 from the energy storage device 3108 needs to be boosted rather than bucked). The functions of these two separate converters 3170, 3172 can be combined into a single converter in some instances as shown by the converter 3276 in FIG. 32.

The energy storage device 3108 can include any number of different devices, such as a battery, capacitor, fuel cell, etc. The energy storage device 3108 may include a circuit or indicator (e.g., barcode, flashing LED, etc.) that provides an indication of the energy storage device 3108 type and identification to the energy storage management system 3110. In other instances, the energy storage management system 3110 can determine a type and identify of the energy storage device 3108 via electrical characteristics of the energy storage device 3108 once coupled to the energy storage management system 3110. The controller 3174, 3274 may be programmed or hardwired to control the converters 3170, 3172, 3176 in different charge and discharge modes depending on the type and identification of the energy storage device 3108. The polarity of the energy storage device 3108 is shown as providing a positive voltage to the step down converter 3170 in FIG. 31, however, it could also be oriented to provide a positive voltage to the step up converter 3172, or the coupling to the converters 3170, 3172 could be electronically or mechanically selectable such that the polarity of the energy storage device 3108 relative to the converters 3170 and 3172 is selectable.

The inputs and outputs of the converters 3170, 3172, and 3276 are shown as individual links for a given direction of power. However, this is a functional visualization only, and does not represent specific physical implementations. In some cases, a single I/O can couple the converters 3170, 3172, and 3276 to the bus 3060. In some cases, a single I/O can couple the converters 3170, 3172, and 3276 to the energy storage device 3108, 3208. In other embodiments, two or more physical leads can be used in the I/O interfaces to the bus 3060 and/or the energy storage device 3108, 3208.

While specific voltage and current sensing channels have been shown, in some embodiments, additional channels may be implemented, for instance, where a power measurement as compared to a mere voltage measurement, is desired.

Figure 34:
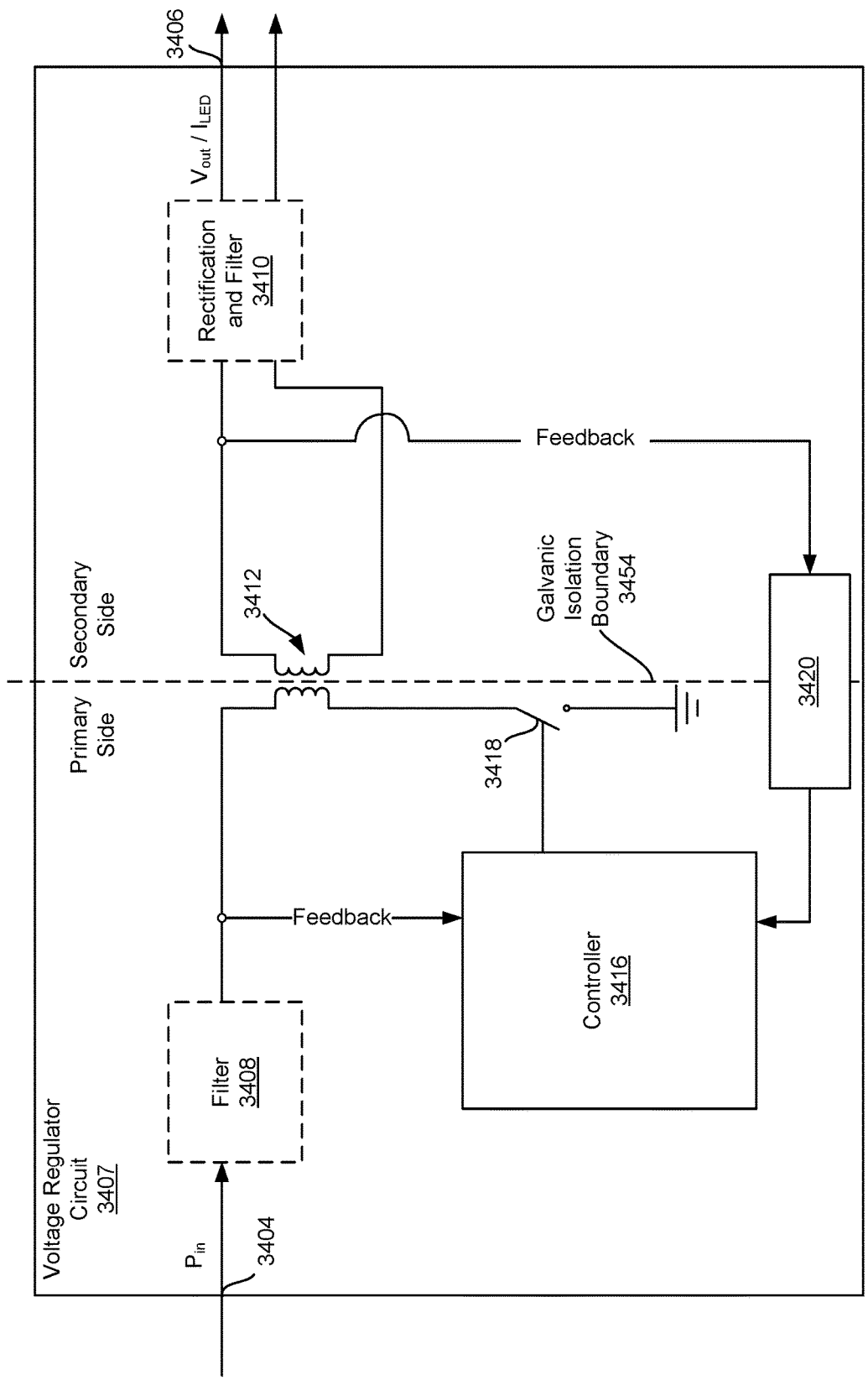
FIG. 34 illustrates one embodiment of details of a voltage regulator circuit, such as the voltage regulator circuit.

FIG. 34 illustrates one embodiment of details of a voltage regulator circuit 3407, such as the voltage regulator circuit 1607. The voltage regulator circuit 3407 can optionally include a filter 3408 on a primary side of a transformer 3412 or an optional rectification and filter 3410 on a secondary side of the transformer 3412. The voltage regulator circuit 3407 can receive power, $P_{in}$, from an input 3404 that is configured for coupling to an AC mains. The primary side of the transformer 3412 can have a ground connection that passes through a switch 3418 (e.g., BJT, mechanical relay, MOSFET, etc.), whose switching is controlled by a controller 3416 such as first controller 3010 in FIG. 30. The controller 3416 can control switching of the switch 3418 to thereby control a voltage on the secondary side of the transformer 3412, $V_{out}$. Alternatively, the secondary side can include circuitry (e.g., a series inductor and current feedback to the controller 3416) to generate a regulated current, $I_{LED}$, thereby avoiding the need for a two-stage driver system (i.e., a system that also includes a current regulator between the voltage regulator circuit 3407 and the one or more LEDs). The voltage regulator circuit 3407 can include feedback from the secondary side (e.g., voltage, current, or power) that crosses the galvanic isolation boundary 3454 via a non-contact data transfer device 3420, such as an opto-isolator, and passes this feedback to the controller 3416. The controller 3416 can use this feedback to regulate the output on the secondary side via a duty cycle of the switch 3416. The voltage regulator circuit 3407 can provide the regulated voltage, $V_{out}$, or regulated current, $I_{LED}$, via output 3406. In some embodiments, the controller 3416 can cause the switch 3418 to turn off for entire half cycles of a signal entering the transformer circuit 3412, and in this way decrease a power output of the voltage regulator circuit 3407 without decreasing an instantaneous input current to the voltage regulator circuit 3407. This can provide enhanced THD and power factor correction over step-down converters known in the art, where duty cycle of the switch 3418 alone is decreased in order to reduce output power.

Figure 35:
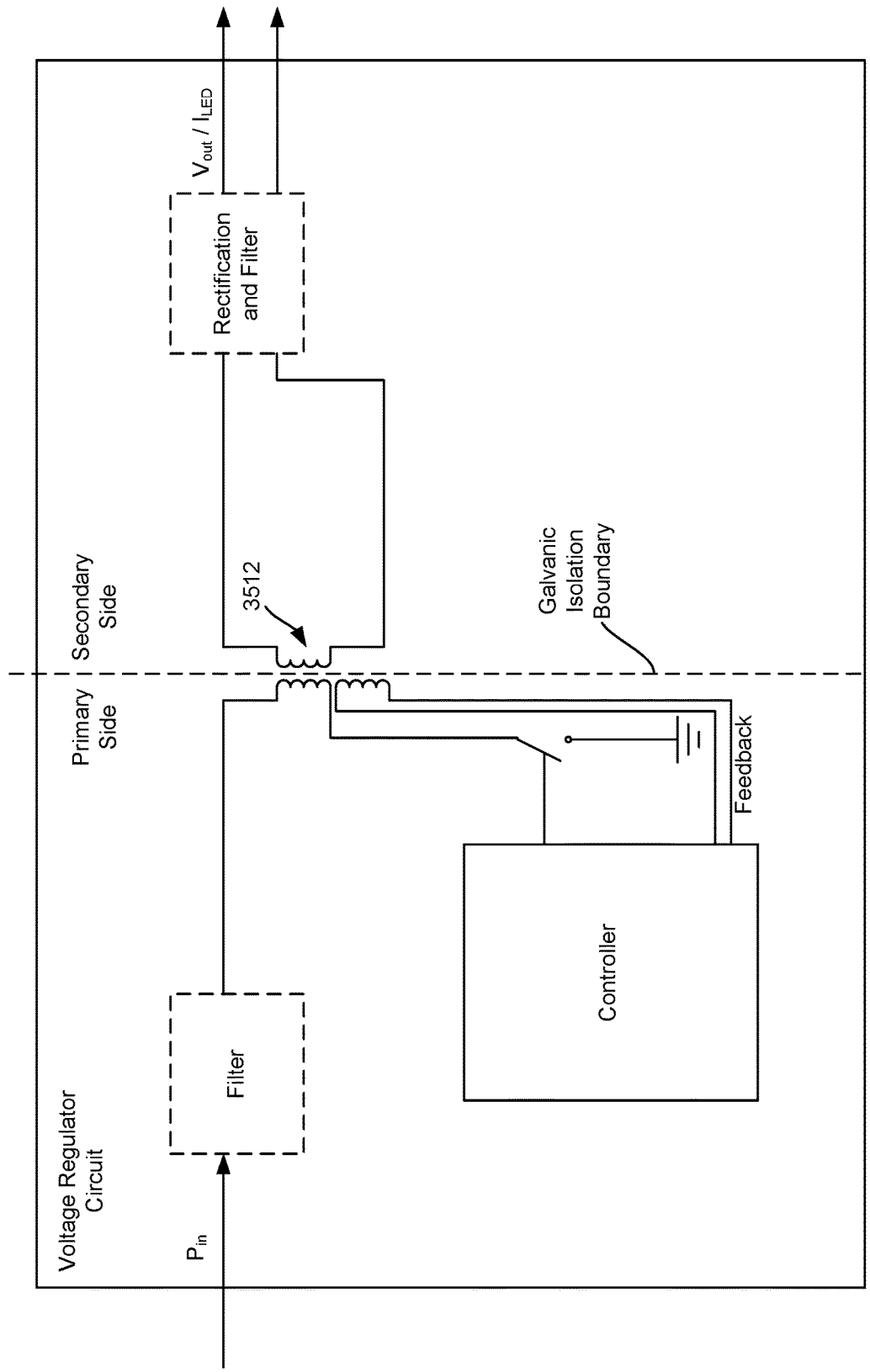
FIG. 35 illustrates a variation of FIG. 34, where the feedback is provided via a second coil of the transformer on the primary side.

FIG. 35 illustrates a variation of FIG. 34, where the feedback is provided via a second coil of the transformer 3512 on the primary side.

In many buildings, it would be valuable to be able to keep track of where specific equipment is located. A classic example is hospital wheel chairs. We are told that hospital staff often spend a disproportionate amount of time looking for wheel chairs when they are needed. This is just one of many applications.

Many of the herein disclosed embodiments suggest that a wireless network interface provides wireless connectivity to an LED driver. Embodiments also included an auxiliary port where accessories could couple to bus providing power and data from an LED driver, and sometimes returning data to the LED driver from an accessory. In an embodiment, an accessory for coupling to the auxiliary port or to an auxiliary port of an energy storage management system, can be an RFID sensor. The RFID sensor could receive low voltage power from the bus, and scan its surroundings for RFID tags. When a tag is identified, the RFID sensor can pass an ID of the RFID tag through the bus to the master controller which can then wirelessly transmit this ID via the wireless network interface to a gateway. When a user is interested in finding an object that has an included RFID tag (e.g., a hospital wheelchair), the user can access a server, the server can store data received through the gateway, and the server can identify any received RFID tags associated with the object that the user is looking for. If a positive ID match is found, the server can return a location of the LED driver whose accessory RFID sensor sensed the matching RFID tag, and optionally a time stamp. Another query to the server could ask which LED driver having an RFID sensor accessory last sensed the matching RFID tag, thus giving an approximate location of the desired object. Such a system assumes that the server is aware of the locations of each LED driver providing RFID tag sensed indicators. The RFID sensors could be directional such that only one or two sensors detect an RFID tag at a time.

In an alternative embodiment, the RFID sensor may not be needed, where the RFID tags are active, and a wireless network interface (e.g., a radio) of the LED drivers is used to detect active RFID tags. In an embodiment, active RFID tags can be "movement sensors," meaning that movement of the sensor causes a radio message with an ID for the tag to be transmitted. In other words, the RFID tags are active rather than passive, but only transmit when the object to which they are attached moves or is shaken. For instance, movement of the tag could cause a magnet to move through a coil creating a current to transmit a message. Such active RFID tags could replace the passive RFID tags discussed in the previous paragraph. RFID transmission strength could be used to locate an RFID tag.

Figure 37:
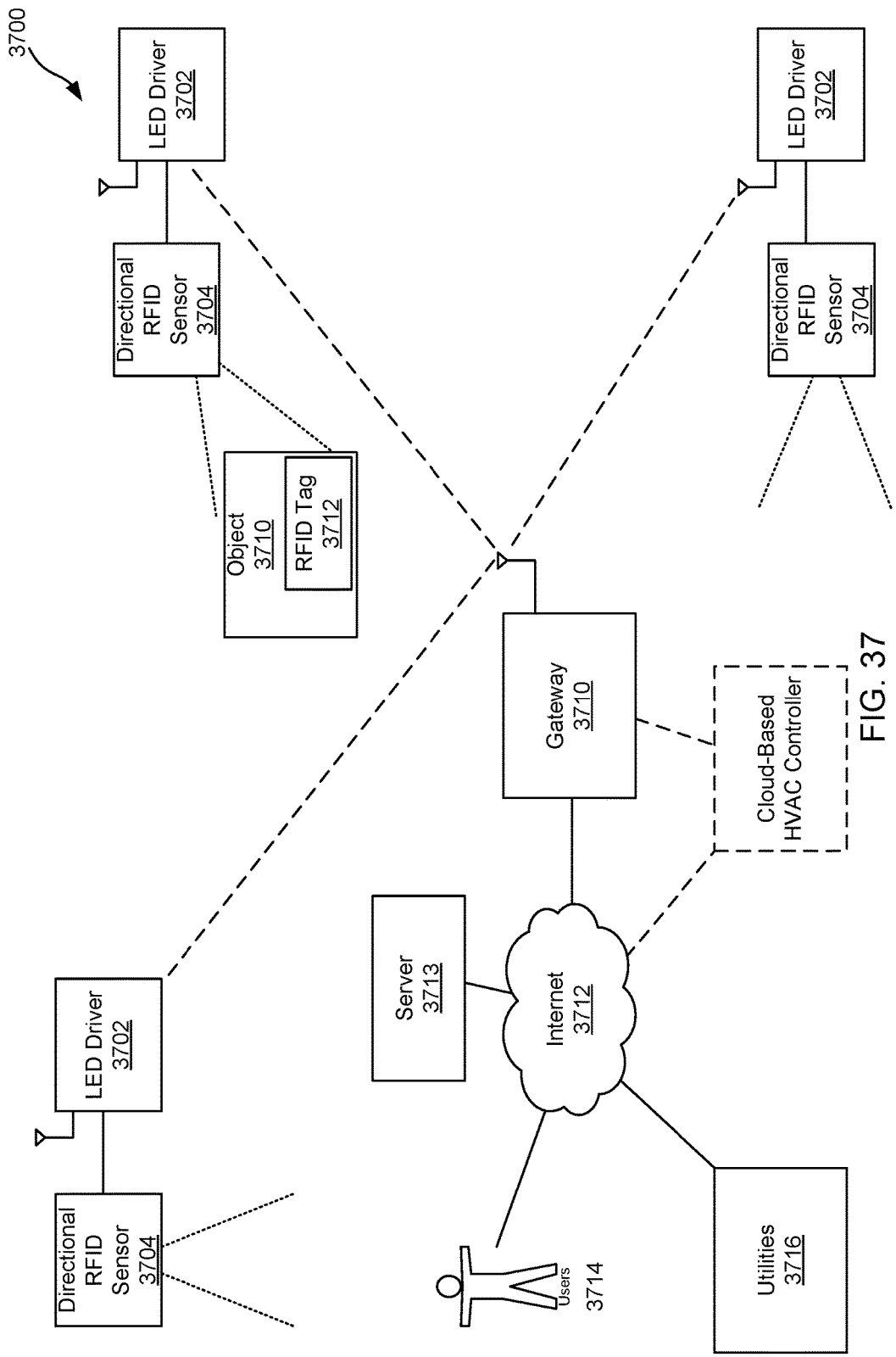
FIG. 37 illustrates a system of LED drivers that can wirelessly interface with users and utilities, via a gateway and the internet.

FIG. 37 illustrates a system of LED drivers that can wirelessly interface with users 3714 and utilities 3716, via a gateway 3710 and the internet 3712. Each LED driver 3702 can include a bus connecting a directional RFID sensor 3704 to the LED driver 3702. The directional RFID sensor 3704 of each LED driver 3702 can be oriented to cover a large area or volume of a room or space without much or any overlap between the fields of the sensors. In this way, one, and possibly a few sensors 3704 can detect an active or passive RFID tag 3712 on an object 3710 (e.g., a wheelchair, laptop, mobile phone, etc.) and provide a rough location of the object 3710 to a user 3714 via the gateway 3710. Where multiple sensors 3704 detect the RFID tag 3712, the data can be passed to a server 3713 via the gateway 3710 and the Internet 3712, and the server 3713 can compare signal strengths from the different sensors 3704 and thereby determine a rough location of the object 3710. This rough location can then be passed to the user 3714.

Additionally, the systems shown throughout this disclosure enable a future method for meeting UL emergency battery backup health test requirements. In particular, the UL requirements state that the backup system, not just the lights, must be shown to be operational. The systems shown herein can wirelessly and thus remotely turn off the entire system via wireless instruction and transfer power to the backup energy storage system, and provide feedback that the system is offline. For instance, the feedback sensors described throughout this disclosure can show where voltage, current, and power exist, or do not exist within the system. Thus, these feedback loops can actually provide data providing that the AC mains power is not being fed to the system, and also that a certain luminosity is being generated by the LEDs despite the lack of AC mains power (i.e., that the backup power is operational).

Figure 38:
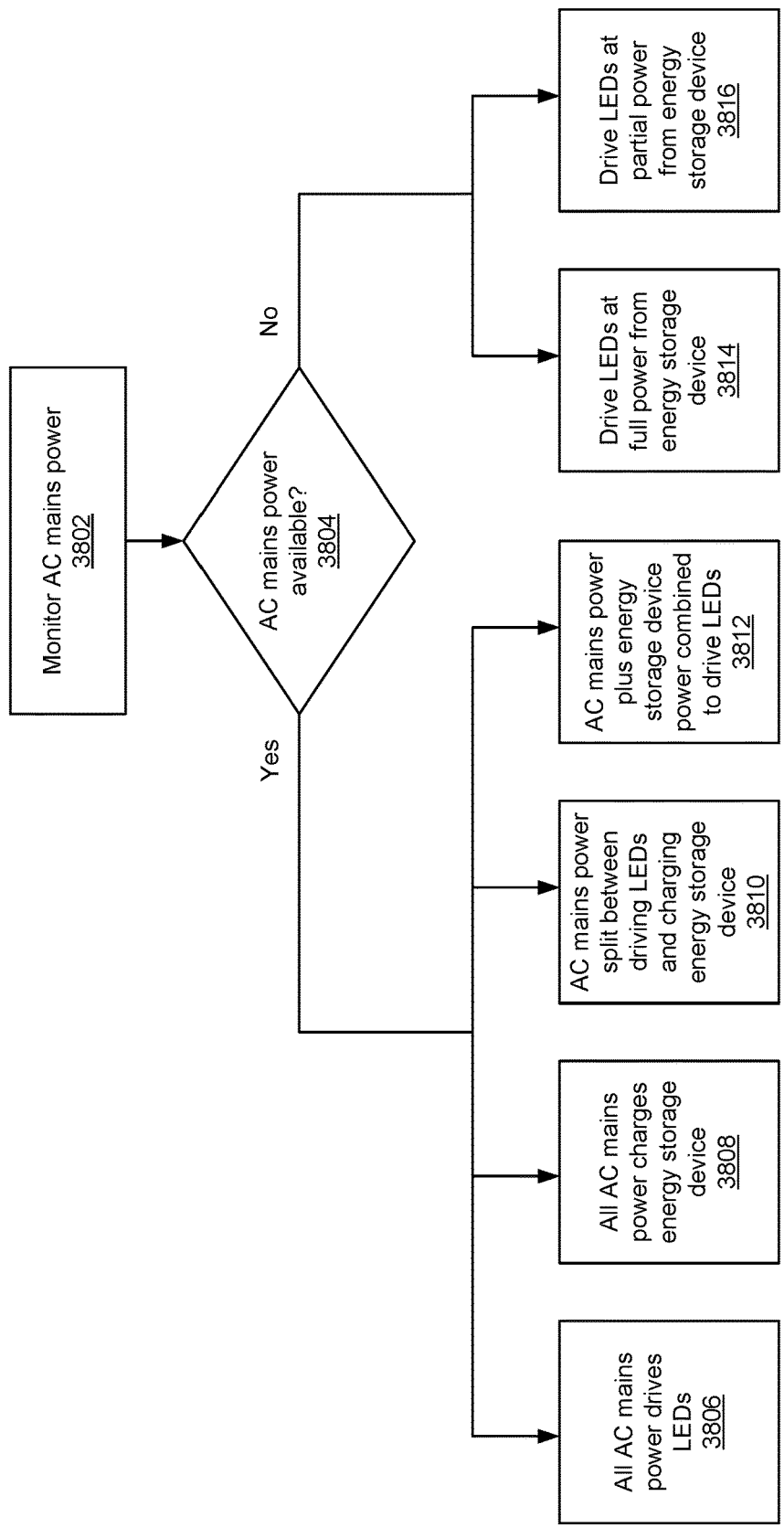
FIG. 38 illustrates a method of controlling the LED driver systems herein disclosed when AC mains power is available.

FIG. 38 illustrates a method of controlling the LED driver systems herein disclosed for both situations where AC mains power is available and not available. The method 3800 can monitor AC mains power to determine if AC mains power is available (e.g., is there a power outage?) (Block 3802 and Decision 3804). If AC mains power is available, then the method 3800 has one of four states that can be entered: (1) All AC mains power can be used to drive the one or more LEDs (Block 3806); (2) all AC mains power can be directed to an energy storage device and used to charge the energy storage device (Block 3808); (3) AC mains power can be split between driving the one or more LEDs and charging the energy storage device (Block 3810); and (4) AC mains power plus energy drawn from the energy storage device can be used in combination to drive the one or more LEDs (Block 3812).

If AC mains power is not available (Decision 3804), then the method 3800 has two states that can be entered: (1) the one or more LEDs can be driven at full power (i.e., whatever power is being dictated by a dimmer setting) entirely from energy stored in the energy storage device (Block 3814); or (2) the one or more LEDs can be driven at less than full power, but more than 0 power, entirely from energy stored in the energy storage device (Block 3816).

Figure 39:
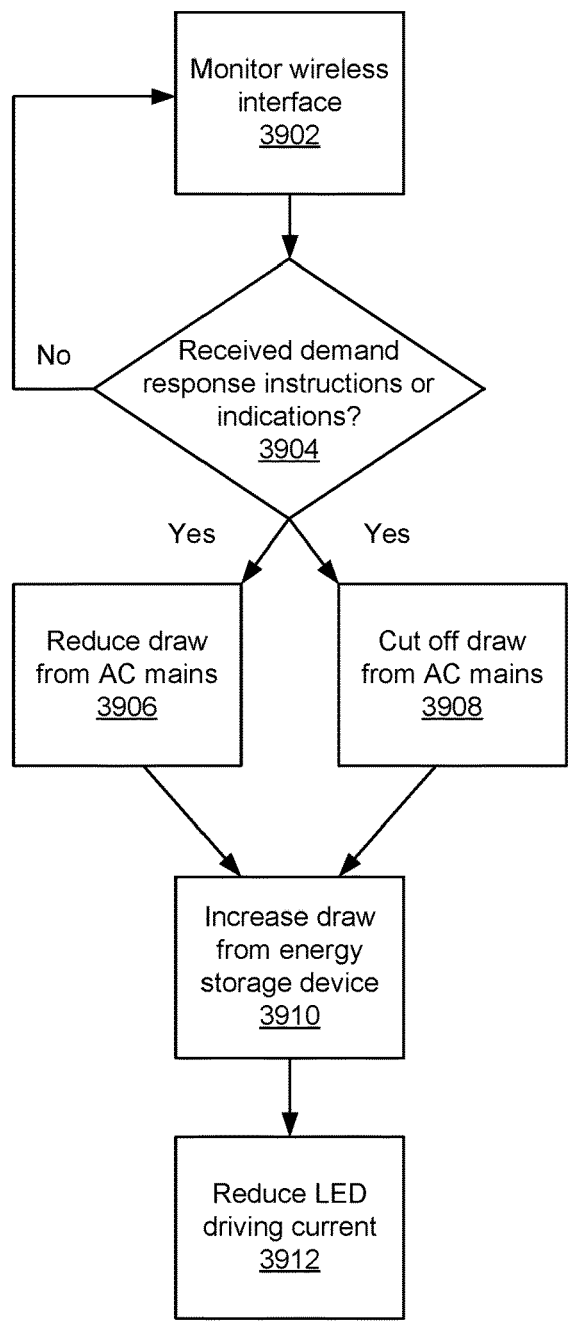
FIG. 39 illustrates a method of controlling the LED driver systems herein disclosed when a demand response signal is received.

FIG. 39 illustrates a method of controlling the LED driver systems herein disclosed when a demand response signal is received. The method 3900 can begin with monitoring a wireless network interface (e.g., 1620a or 1620b) for instructions to reduce power consumption or an indication that electrical prices have changed or will change (Block 3902). If any are received (Decision 3904), then, based on the instruction or indication received, the method 3900 can reduce (Block 3906) or cut off (Block 3908) use of AC mains power. To make up for the decreased AC mains draw, the method 3900 can begin drawing from an energy storage device to drive the one or more LEDs (Block 3910). At the same time, the total current driving the one or more LEDs, or the number of LEDs being driven, can optionally be reduced (Block 3912).

Figure 40:
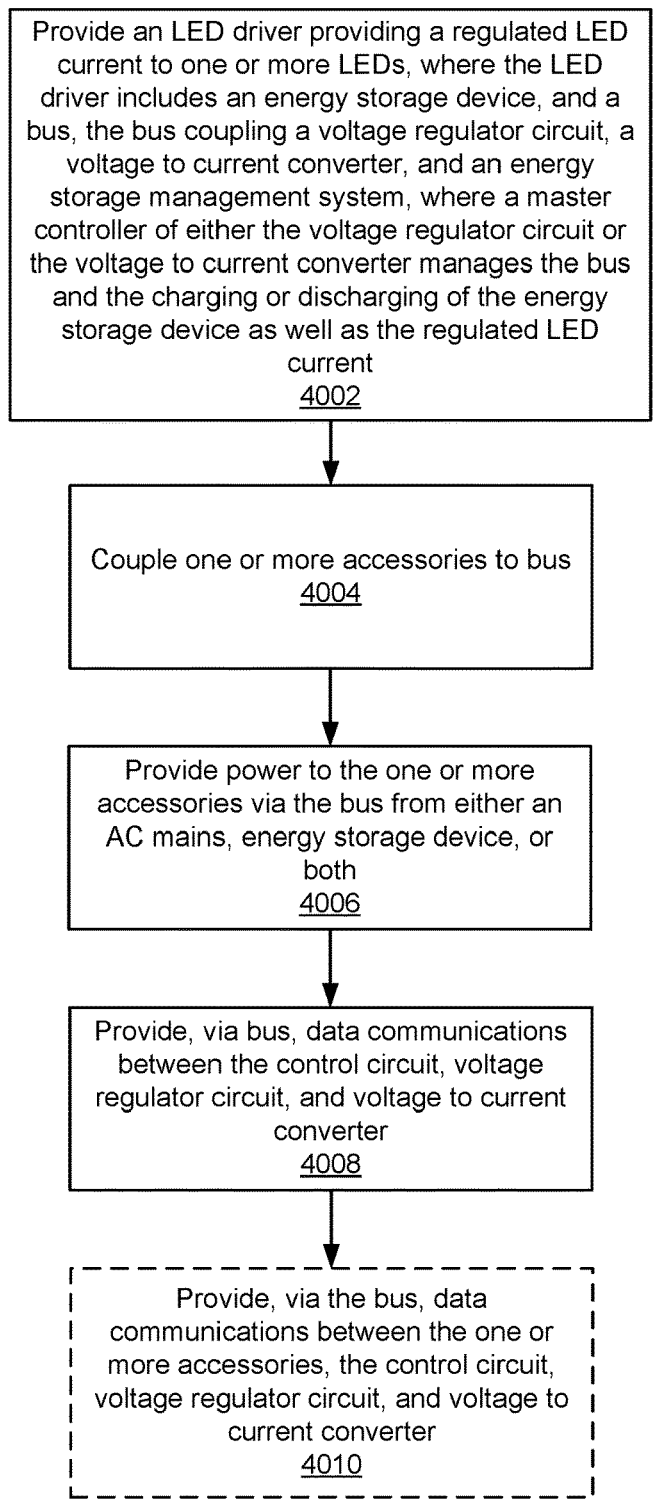
FIG. 40 illustrates a method of controlling the LED driver systems herein disclosed to control and/or power accessories via a bus and/or optional port.

FIG. 40 illustrates a method of controlling the LED driver systems herein disclosed to control and/or power accessories via a bus and/or optional port. The method 4000 can include providing an LED driver providing a regulated LED current to one or more LEDs, where the LED driver includes an energy storage device, and a bus, the bus coupling a voltage regulator circuit, a voltage to current converter, and an energy storage management system, where a master controller of either the voltage regulator circuit, or the voltage to current converter controls the bus (Block 4002). The master controller can also control charging and discharging of the energy storage device through the energy storage management system (Block 4002). The master controller can also control regulated LED current via control of the voltage to current converter (Block 4002). The method 4000 further including coupling one or more accessories to the bus (Block 4004), and providing power (low voltage, high voltage, or both) to the one or more accessories via the bus from either an AC mains, the energy storage device, or both (Block 4006). The bus can also provide data communications between the energy storage management system, the voltage regulator circuit, and the voltage to current converter (Block 4008), while optionally also providing data communications between the one or more accessories, the energy storage management system, the voltage regulator circuit, and the voltage to current converter (Block 4010).

Figure 41:
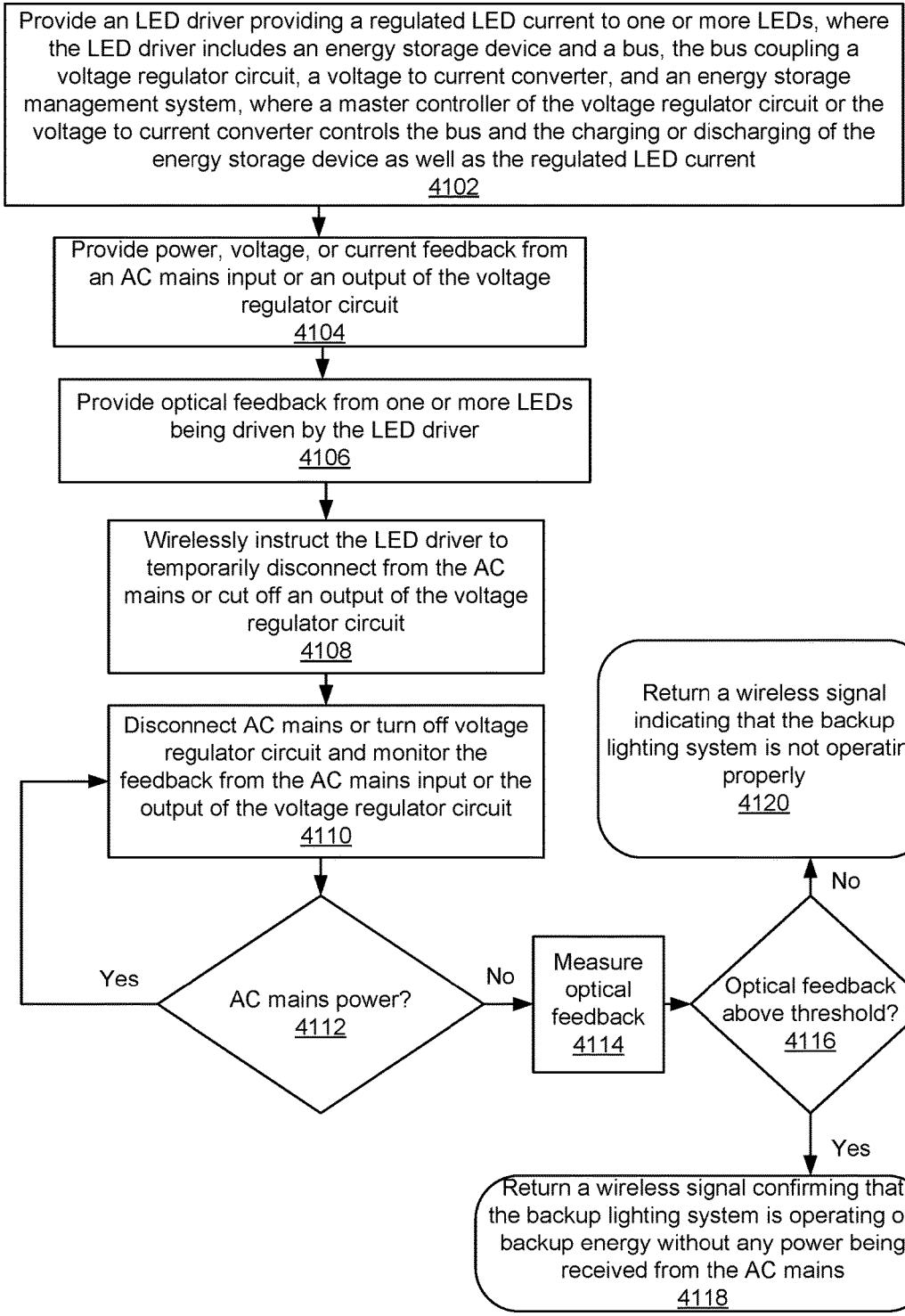
FIG. 41 illustrates a method of controlling the LED driver systems herein disclosed to remotely check the health of emergency backup battery functionality.

FIG. 41 illustrates a method of controlling the LED driver systems herein disclosed to remotely check the health of emergency backup battery functionality. The method 4100 can include providing an LED driver providing a regulated LED current to one or more LEDs, where the LED driver includes an energy storage device, and a bus, the bus coupling a voltage regulator circuit, a voltage to current converter, and an energy storage management system, where a master controller of the voltage regulator circuit or the voltage to current converter, controls the bus and the charging or discharging of the energy storage device as well as the regulated LED current (Block 4102). The method 4100 can also include providing power, voltage, or current feedback from an AC mains input or an output of the voltage regulator circuit (Block 4104). The method 4100 can also include providing optical feedback from one or more LEDs being driven by the LED driver (Block 4106). The method 4100 can also include wirelessly instructing the LED driver to temporarily disconnect from the AC mains or cut off an output of the voltage regulator circuit (Block 4108). The method 4100 can then monitor the feedback from the AC mains input or the output of the voltage regulator circuit (Block 4110). If this feedback indicates that the AC mains power is still reaching the LED driver or no longer being used to generate an output from the voltage regulator circuit (Decision 4112), then the method 4100 can again attempt to temporarily disconnect from the AC mains or cut off an output of the voltage regulator circuit (Block 4108). If the feedback indicates that the AC mains power is no longer reaching the LED driver or no longer being used to generate an output from the voltage regulator circuit (Decision 4112), then the method can measure the optical feedback from the one or more LEDs (Block 4114). If the optical feedback is above a threshold (Decision 4116), then the method can return a wireless signal confirming that the backup lighting system is operating on backup energy without any power being received from the AC mains (i.e., that the emergency backup lighting system is operational) (Block 4118). If the optical feedback is below the threshold (Decision 4116), then the method 4100 can return a wireless signal indicating that the backup lighting system is not operating properly (Block 4120).

The master controller described throughout this disclose can also take into consideration energy storage device health. This means that rates of charging and discharging may not only be based on the price of electricity and indications or instructions from utility companies, but can also be tailored to increase a lifetime of the energy storage device. For instance, energy storage device life may benefit from preventing a charge on the energy storage device from falling below 10%. In such an example, even where high electricity prices would call for continued depletion of the energy storage device, the energy storage management system may instead determine that preserving the life of the energy storage device is a priority and thereby cut off or reduce additional power draw from the energy storage device to maintain the charge at greater than 10%. Given the information stored in the processor or provided from outside sources, the complex tradeoffs between battery cost and longevity, cost of power and potential savings and other factors could be calculated via suitable algorithms to arrive at the required drive power of the various components. The master controller can make these decisions alone, can query the energy storage management system for feedback on battery health and best practices, or provide general instructions to the energy storage management system and allow that system to implement specific actions to maintain energy storage device health.

Similarly, regulatory considerations may be taken into account. For instance, there may be a requirement that the energy storage device be able to provide at least two hours of illumination time for the LEDs when the AC mains is not working. The master controller may therefore avoid depleting the energy storage device beyond a point at which two hours of backup power is no longer available.

One of skill in the art will appreciate that even though this disclosure has largely focused on driving LEDs, this same system could also be used with other power-drawing devices such as kitchen appliances, HVAC units, and home theatre equipment to name a few. For instance, instead of LED drivers and a battery backup for LED lighting, the drivers and battery backup could drive a retail audio or PA system that is in near constant use. To avoid decreases in volume or complete shutdown of the audio or PA system, drivers and a battery backup could work together to maintain a constant audio output, for instance, either via a constant drive current or feedback from an audio sensor.

Those of skill in the art will appreciate that although rectification was shown throughout this disclosure as being arranged before step down conversion, in some embodiments, the rectification can occur after the voltage has been stepped down. As one non-limiting example, in FIG. 20, the rectification could be arranged to the right of the voltage regulator circuit/voltage to current converter 2007.

While many discussions focused on two-stage drivers (a step-down converter followed by a current regulating stage), those of skill in the art are capable of applying these systems and methods to single-stage drivers (where the step-down converter also regulates current output).

Figure 42:
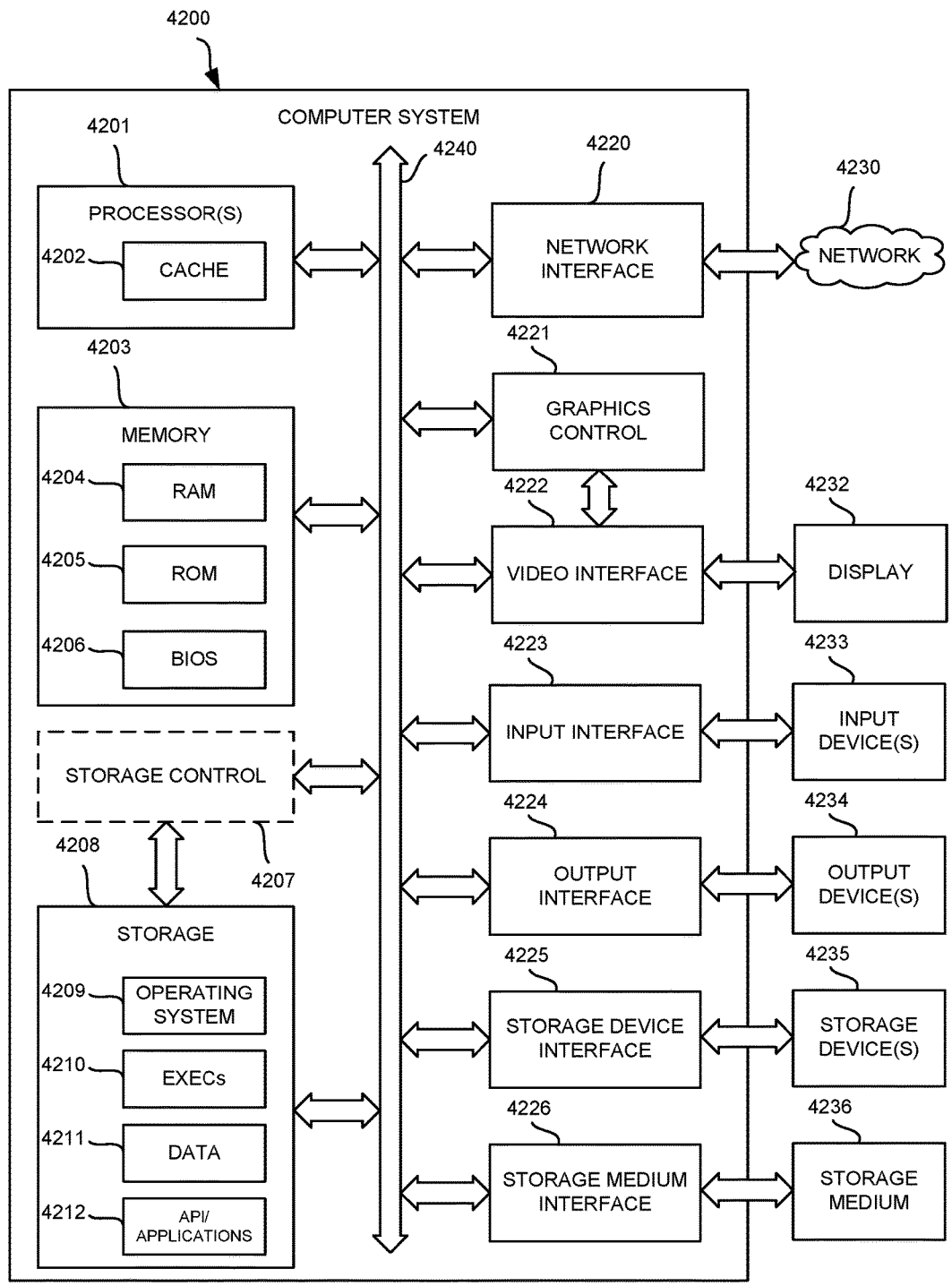
FIG. 42 shows a diagrammatic representation of one embodiment of a computer system within which a set of instructions can execute for causing a device to perform or execute any one or more of the aspects and/or methodologies of the present disclosure.

The systems and methods described herein can be implemented in a computer system in addition to the specific physical devices described herein. FIG. 42 shows a diagrammatic representation of one embodiment of a computer system 4200 within which a set of instructions can execute for causing a device to perform or execute any one or more of the aspects and/or methodologies of the present disclosure. Energy storage management system 310 in FIG. 3 is one implementation of the computer system 4200. The components in FIG. 42 are examples only and do not limit the scope of use or functionality of any hardware, software, firmware, embedded logic component, or a combination of two or more such components implementing particular embodiments of this disclosure. Some or all of the illustrated components can be part of the computer system 4200. For instance, the computer system 4200 can be a general purpose computer (e.g., a laptop computer) or an embedded logic device (e.g., an FPGA or microcontroller), to name just two non-limiting examples.

Computer system 4200 includes at least a processor 4201 such as a central processing unit (CPU), an FPGA, or a microcontroller to name three non-limiting examples. Energy storage management system 310 in FIG. 3 is one implementation of the processor 4201. The computer system 4200 may also comprise a memory 4203 and a storage 4208, both communicating with each other, and with other components, via a bus 4240. The bus 4240 may also link a display 4232, one or more input devices 4233 (which may, for example, include a keypad, a keyboard, a mouse, a stylus, etc.), one or more output devices 4234, one or more storage devices 4235, and various non-transitory, tangible computer-readable storage media 4236 with each other and with one or more of the processor 4201, the memory 4203, and the storage 4208. For instance, in FIG. 3, the energy storage management system 310 may communicate with the rectification circuit 302, the charging circuit 306, and the voltage to current converter 316 via a bus (not illustrated). All of these elements may interface directly or via one or more interfaces or adaptors to the bus 4240. For instance, the various non-transitory, tangible computer-readable storage media 4236 can interface with the bus 4240 via storage medium interface 4226. Computer system 4200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 4201 (or central processing unit(s) (CPU(s))) optionally contains a cache memory unit 4202 for temporary local storage of instructions, data, or computer addresses. Processor(s) 4201 are configured to assist in execution of computer-readable instructions stored on at least one non-transitory, tangible computer-readable storage medium. Computer system 4200 may provide functionality as a result of the processor(s) 4201 executing software embodied in one or more non-transitory, tangible computer-readable storage media, such as memory 4203, storage 4208, storage devices 4235, and/or storage medium 4236 (e.g., read only memory (ROM)). For instance, the energy storage management system 310 can include non-transitory, tangible computer readable storage media. The non-transitory, tangible computer-readable storage media may store software that implements particular embodiments, such as methods for demand-based dimming of the one or more LEDs 304 or a hybrid driving of the one or more LEDs 304 from the dimming LED driver 318, at a reduced current output, and the battery backup 314, discharging some portion of charge on the energy storage device 308. Memory 4203 may read the software from one or more other non-transitory, tangible computer-readable storage media (such as mass storage device(s) 4235, 4236) or from one or more other sources through a suitable interface, such as network interface 4220. The energy storage management system 310 can include an embodiment of the network interface 4220 which can send and receive data via the wireless radio 320. The software may cause processor(s) 4201 to carry out one or more processes or one or more steps of one or more processes described or illustrated herein. Carrying out such processes or steps may include defining data structures stored in memory 4203 and modifying the data structures as directed by the software. In some embodiments, an FPGA can store instructions for carrying out functionality as described in this disclosure (e.g., methods for demand-based dimming of LEDs). In other embodiments, firmware includes instructions for carrying out functionality as described in this disclosure (e.g., methods for demand-based dimming of LEDs).

The memory 4203 may include various components (e.g., non-transitory, tangible computer-readable storage media) including, but not limited to, a random access memory component (e.g., RAM 4204) (e.g., a static RAM "SRAM", a dynamic RAM "DRAM, etc.), a read-only component (e.g., ROM 4205), and any combinations thereof. ROM 4205 may act to communicate data and instructions unidirectionally to processor(s) 4201, and RAM 4204 may act to communicate data and instructions bidirectionally with processor(s) 4201. ROM 4205 and RAM 4204 may include any suitable non-transitory, tangible computer-readable storage media described below. In some instances, ROM 4205 and RAM 4204 include non-transitory, tangible computer-readable storage media for carrying out the methods described herein. In one example, a basic input/output system 4206 (BIOS), including basic routines that help to transfer information between elements within computer system 4200, such as during start-up, may be stored in the memory 4203.

Fixed storage 4208 is connected bidirectionally to processor(s) 4201, optionally through storage control unit 4207. Fixed storage 4208 provides additional data storage capacity and may also include any suitable non-transitory, tangible computer-readable media described herein. Storage 4208 may be used to store operating system 4209, EXECs 4210 (executables), data 4211, API applications 4212 (application programs), and the like. For instance, the storage 4208 could be implemented for storage of electricity prices as a function of time as described in FIG. 12, or tables of battery lifetime as a function of charging rate or charging levels. Often, although not always, storage 4208 is a secondary storage medium (such as a hard disk) that is slower than primary storage (e.g., memory 4203). Storage 4208 can also include an optical disk drive, a solid-state memory device (e.g., flash-based systems), or a combination of any of the above. Information in storage 4208 may, in appropriate cases, be incorporated as virtual memory in memory 4203. The storage 4208 can be updated via a USB port, a wired connection to the Internet, or a wireless connection to the Internet (e.g., for updating electricity prices).

In one example, storage device(s) 4235 may be removably interfaced with computer system 4200 (e.g., via an external port connector (not shown)) via a storage device interface 4225. Particularly, storage device(s) 4235 and an associated machine-readable medium may provide nonvolatile and/or volatile storage of machine-readable instructions, data structures, program modules, and/or other data for the computer system 4200. In one example, software may reside, completely or partially, within a machine-readable medium on storage device(s) 4235. In another example, software may reside, completely or partially, within processor(s) 4201.

Bus 4240 connects a wide variety of subsystems. Herein, reference to a bus may encompass one or more digital signal lines serving a common function, where appropriate. Bus 4240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 4200 may also include an input device 4233. In one example, a user of computer system 4200 may enter commands and/or other information into computer system 4200 via input device(s) 4233. Examples of an input device(s) 4233 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 4233 may be interfaced to bus 4240 via any of a variety of input interfaces 4223 (e.g., input interface 4223) including, but not limited to, serial, parallel, game port, USB, FIREWIRE, THUNDERBOLT, or any combination of the above.

In particular embodiments, when computer system 4200 is connected to network 4230 (such as the Internet or a direct channel to a utility company), computer system 4200 may communicate with other devices, such as mobile devices and enterprise systems, connected to network 4230. Communications to and from computer system 4200 may be sent through network interface 4220. For example, network interface 4220 may receive incoming communications (such as requests or responses from other devices) in the form of one or more packets (such as Internet Protocol (IP) packets) from network 4230, and computer system 4200 may store the incoming communications in memory 4203 for processing. For instance, energy storage management system 310 can receive instructions from a utility company to reduce AC mains 305 current draw, and in response can command the dimming LED driver 318 to reduce its output, while simultaneously instructing the battery backup 314 to begin, or increase, current output to the one or more LEDs 304. Computer system 4200 may similarly store outgoing communications (such as requests or responses to other devices) in the form of one or more packets in memory 4203 and communicated to network 4230 from network interface 4220. Processor(s) 4201 may access these communication packets stored in memory 4203 for processing.

Examples of the network interface 4220 include, but are not limited to, a network interface card, a modem, and any combination thereof. Examples of a network 4230 or network segment 4230 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 4230, may employ a wired and/or a wireless mode of communication. In general, any network topology may be used.

Information and data can be displayed through a display 4232. Examples of a display 4232 include, but are not limited to, a liquid crystal display (LCD), an organic liquid crystal display (OLED), a cathode ray tube (CRT), a plasma display, and any combinations thereof. The display 4232 can interface to the processor(s) 4201, memory 4203, and fixed storage 4208, as well as other devices, such as input device(s) 4233, via the bus 4240. The display 4232 is linked to the bus 4240 via a video interface 4222, and transport of data between the display 4232 and the bus 4240 can be controlled via the graphics control 4221.

In addition to a display 4232, computer system 4200 may include one or more other peripheral output devices 4234 including, but not limited to, an audio speaker, a printer, and any combinations thereof. Such peripheral output devices may be connected to the bus 4240 via an output interface 4224. Examples of an output interface 4224 include, but are not limited to, a serial port, a parallel connection, a USB port, a FIREWIRE port, a THUNDERBOLT port, and any combinations thereof.

In addition or as an alternative, computer system 4200 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software embodied in hardware. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., methods for demand-based dimming) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An LED driver system having a backup energy source, the system comprising:
    a first AC mains input configured for coupling to an AC mains power source;
    a voltage regulation circuit coupled to the AC mains input and receiving AC or rectified AC power, the voltage regulation circuit having one or more bus coupling I/Os;
    a voltage to current converter circuit having one or more bus coupling I/Os and a regulated current output configured to drive a light source comprising one or more light emitting diodes;
    an energy storage management system coupled to a removable energy storage device and having one or more bus coupling I/Os, the energy storage management system comprising:
        a converter controlling a voltage on the energy storage device and charging and discharging rates of the energy storage device; and a controller controlling the converter, the controller also receiving feedback from the converter, wherein the voltage regulator circuit and the voltage to current converter circuit each comprise a controller, and wherein the combination of these two controllers is programmed, coded, or wired to receive AC power from the AC mains power source and convert this to a regulated current for driving the light source when the energy storage management system is decoupled from the system;

a bus having at least data and power channels, wherein the energy storage management system, the voltage regulator circuit, and the voltage to current converter circuit are all coupled to the bus; wherein the voltage regulation circuit or the voltage to current converter circuit comprises a master controller and the master controller controls the controller of the energy storage management system as well as a controller of whichever of the voltage regulation circuit or the voltage to current converter does not comprise the master controller; and wherein the master controller is programmed, coded, or wired to control:

driving the light source from a simultaneous combination of the energy storage device and the AC mains power source;

simultaneous charging the energy storage device and driving the light source from the AC mains power source; and driving the light source from the energy storage device when the AC mains power source is not available.

2. The system of claim 1, wherein the bus includes a data channel, a low voltage channel, and a high voltage channel, where the data channel transfers instructions from the master controller to the controller of the energy storage management system as well as a controller of whichever of the voltage regulation circuit or the voltage to current converter does not comprise the master controller, where the high voltage channel is regulated to between 20V-50V, and wherein the low voltage channel is regulated to below 20V.

3. The system of claim 1, wherein the master controller includes a wireless network interface and a network connection to an electrical power company.

4. The system of claim 3, wherein the master controller adjusts a balance of power sourced from the AC mains power source and the energy storage device, or a balance of power AC mains power distribution between charging the energy storage device and driving the light source, the adjusting being in response to data from the electrical power company.

5. The system of claim 4, wherein the data is electricity pricing.

6. The system of claim 1, further comprising an optical sensor arranged proximal to the light source and coupled to the master controller to provide luminosity feedback from the light source or maintaining a consistent light source output.

7. The system of claim 1, wherein one of the two controllers is the master controller.

8. The system of claim 1, further comprising an accessory coupled to the bus and receiving power from the bus.

9. The system of claim 8, wherein the accessory also receives instructions from the master controller via the bus.

10. The system of claim 9, wherein the accessory includes a sensor and provides sensor data from the sensor to the master controller via the bus.

11. A method of operating a light emitting diode (LED) driver system comprising:

providing an LED driver generating a regulated LED current to a light source comprising one or more LEDs, where the LED driver includes an energy storage device, and a bus, the bus coupling a voltage regulator circuit, a voltage to current converter, and an energy storage management system, where a master controller of either the voltage regulator circuit or the voltage to current converter, controls (1) the bus, (2) the charging or discharging of the energy storage device, and (3) the regulated LED current;

monitoring power from an AC mains power source;

monitoring wireless signals from an electrical power company; and when the AC mains power source is available:

driving the light source with power simultaneously derived from the energy storage device and the AC mains power source; or driving the light source and charging the energy storage device, both simultaneously derived from the AC mains power source; and when the AC mains power source is not available:

driving the light source with power derived entirely from the energy storage device.

12. The method of claim 11, wherein the master controller performs the first and second monitoring and the first, second, and third driving.

13. The method of claim 11, wherein the energy storage management system charges and discharges the energy storage device so as to improve a lifetime of the energy storage device while also reducing a power draw from the AC mains power source, as instructed by the master controller, when electricity pricing is higher than a threshold or higher than an average.

14. The method of claim 11, further comprising monitoring optical feedback from an optical sensor arranged proximal to the light source and adjusting the ratio of power drawn from the AC mains power source and the energy storage device to maintain a constant luminosity from the light source.

15. The method of claim 11, further comprising coupling an accessory to the bus and powering the accessory via a low voltage channel of the bus.

16. The method of claim 15, further comprising passing instructions from the master controller to the accessory via a data channel of the bus.

17. The method of claim 16, further comprising passing sensor data from the accessory to the master controller via the data channel of the bus.

18. A light emitting diode (LED) driver system having a backup energy source, the system comprising:

a voltage regulation circuit configured to convert DC power to a regulated bus voltage and having one or more bus coupling I/Os;

a voltage to current converter circuit having one or more bus coupling I/Os and a regulated current output, and configured to convert the bus voltage to a regulated current, the regulated current output configured to couple to a light source comprising one or more LEDs, the regulated current configured to drive the light source;

a master controller coupled to the voltage to current converter, the voltage regulation circuit, or both;

an energy storage management system coupled to a removable energy storage device and having one or more bus coupling I/Os, the energy storage management system comprising:
- a converter coupled between the one or more bus coupling I/Os of the energy storage management system and the energy storage device; and
- a controller controlling the converter;

a bus having at least data and power channels, the energy storage management system, the voltage regulator circuit, and the voltage to current converter circuit all coupled to the bus; and the master controller programmed, coded, or wired to control:
- driving of the light source derived from a simultaneous combination of the energy storage device and the AC mains power source;
- simultaneous charging of the energy storage device and driving of the light source from the AC mains power source; and
- driving of the light source derived entirely from the energy storage device when the AC mains power source is not available.

\* \* \* \* \*